(12) United States Patent
Nakajima

(10) Patent No.: US 10,911,618 B2
(45) Date of Patent: Feb. 2, 2021

(54) IMAGE PROCESSING DEVICE FOR RECEIVING AN OPERATION INSTRUCTION BY A VOICE, METHOD FOR CONTROLLING IMAGE PROCESSING DEVICE, AND PROGRAM

(71) Applicant: Konica Minolta Inc., Tokyo (JP)

(72) Inventor: Hozuma Nakajima, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/740,629

(22) Filed: Jan. 13, 2020

(65) Prior Publication Data

US 2020/0220987 A1    Jul. 9, 2020

Related U.S. Application Data

(63) Continuation of application No. 16/272,360, filed on Feb. 11, 2019, now Pat. No. 10,567,600.

(30) Foreign Application Priority Data

Feb. 19, 2018    (JP) .................................. 2018-027205

(51) Int. Cl.
*H04N 1/00* (2006.01)
*G06K 9/34* (2006.01)
(Continued)

(52) U.S. Cl.
CPC ......... *H04N 1/00403* (2013.01); *G06F 3/167* (2013.01); *G06K 9/344* (2013.01);
(Continued)

(58) Field of Classification Search
CPC ........... H04N 1/00403; H04N 1/00474; H04N 1/0097; H04N 1/00915; H04N 1/00411;
(Continued)

(56) References Cited

U.S. PATENT DOCUMENTS

| | | |
|---|---|---|
| 10,235,130 B2 | 3/2019 | Bai et al. |
| 2016/0132291 A1 | 5/2016 | Bai et al. |
| 2019/0260884 A1 | 8/2019 | Nakajima |

FOREIGN PATENT DOCUMENTS

| | | |
|---|---|---|
| CN | 102957827 | 3/2013 |
| CN | 103714816 | 4/2014 |
| | (Continued) | |

OTHER PUBLICATIONS

First Office Action issued in corresponding Chinese Patent Application No. 201910113397.8, dated Jul. 23, 2020 (16 pages).

(Continued)

*Primary Examiner* — Thierry L Pham
(74) *Attorney, Agent, or Firm* — Buchanan Ingersoll & Rooney PC

(57) ABSTRACT

An image processing device includes a displayer; and a hardware processor that obtains voice recognition data that is a voice recognition result related to a voice vocalized in a state in which at least one operation screen is displayed in the displayer, determines a search target character string on the basis of the voice recognition data, executes search processing of searching for one voice operation command that agrees with the search target character string among a plurality of voice operation commands including a voice operation command group related to a first screen related to the image processing device, and a voice operation command group related to a second screen displayed according to user's operation for the first screen, and executes processing corresponding to the one voice operation command that has been searched for by the hardware processor.

20 Claims, 51 Drawing Sheets

(51) Int. Cl.
   *G10L 15/22* (2006.01)
   *G06F 3/16* (2006.01)
(52) U.S. Cl.
   CPC ........... *G10L 15/22* (2013.01); *H04N 1/0097* (2013.01); *H04N 1/00411* (2013.01); *H04N 1/00413* (2013.01); *H04N 1/00474* (2013.01); *H04N 1/00482* (2013.01); *H04N 1/00514* (2013.01); *H04N 1/00915* (2013.01); *G10L 2015/223* (2013.01); *G10L 2015/228* (2013.01)
(58) Field of Classification Search
   CPC ........... H04N 1/00514; H04N 1/00482; H04N 1/00413; H04N 1/00397; H04N 1/00405; G06F 3/167; G10L 15/22; G10L 2015/228; G10L 2015/223; G10L 15/26; G06K 9/344
   See application file for complete search history.

(56) References Cited

FOREIGN PATENT DOCUMENTS

| | | |
|---|---|---|
| CN | 103945250 | 7/2014 |
| EP | 2144140 A2 | 1/2010 |
| EP | 2713366 A1 | 4/2014 |
| JP | 2011049705 A | 3/2011 |

OTHER PUBLICATIONS

Extended European Search Report issued in corresponding European Patent Application No. EP19158045.5-1207, dated Jul. 23, 2019 (7 pages).

| SCREEN | GROUP IN SCREEN | OPERATION KEY | VOICE OPERATION COMMAND |
|---|---|---|---|
| COPY BASIC | BASE SCREEN AREA | ORIGINAL-DOCUMENT IMAGE QUALITY | "GENKO GASHITSU" |
| COPY BASIC | BASE SCREEN AREA | COLOR | "KARA" |
| COPY BASIC | BASE SCREEN AREA | DENSITY | "NODO" |
| COPY BASIC | BASE SCREEN AREA | PAPER | "YOSHI" |
| COPY BASIC | BASE SCREEN AREA | MAGNIFICATION RATIO | "BAIRITSU" |
| COPY BASIC | BASE SCREEN AREA | DOUBLE-SIDE/PAGE AGGREGATION | "RYOMEN"/"PEJI SYUYAKU" |
| COPY BASIC | BASE SCREEN AREA | FINISH | "SHIAGARI" |
| COPY BASIC | BASE SCREEN AREA | ORIGINAL-DOCUMENT IMAGE QUALITY | "MOJI SYASHIN" |
| COPY BASIC | BASE SCREEN AREA | COLOR | "OTO KARA" |
| COPY BASIC | BASE SCREEN AREA | DENSITY | "FUTSU" |
| COPY BASIC | BASE SCREEN AREA | PAPER | "JIDO" |
| COPY BASIC | BASE SCREEN AREA | MAGNIFICATION RATIO | "HYAKU PASENTO" |
| COPY BASIC | BASE SCREEN AREA | DOUBLE-SIDE/PAGE AGGREGATION | "KATAMEN KATAMEN" |
| COPY BASIC | BASE SCREEN AREA | FINISH | "SUTEPURU SHINAI" |

| SCREEN | GROUP IN SCREEN | OPERATION KEY | VOICE OPERATION COMMAND |
|---|---|---|---|
| COPY MAGNIFICATION RATIO | BASE SCREEN AREA | AUTO | "JIDO" |
| COPY MAGNIFICATION RATIO | BASE SCREEN AREA | SMALLISH | "CHISAME" |
| COPY MAGNIFICATION RATIO | BASE SCREEN AREA | PLUS | "PURASU" |
| COPY MAGNIFICATION RATIO | BASE SCREEN AREA | MINUS | "MAINASU" |
| COPY MAGNIFICATION RATIO | BASE SCREEN AREA | 50% | "GOJYU PASENTO" |
| COPY MAGNIFICATION RATIO | BASE SCREEN AREA | 70.7% | "NANAJYUTTEN NANA PASENTO" |
| COPY MAGNIFICATION RATIO | BASE SCREEN AREA | 81.6% | "HACHIJYUICHITEN ROKU PASENTO" |
| COPY MAGNIFICATION RATIO | BASE SCREEN AREA | 86.6% | "HACHIJYUROKUTEN ROKU PASENTO" |
| COPY MAGNIFICATION RATIO | BASE SCREEN AREA | 100.0% | "HYAKU PASENTO/TOUBAI" |
| COPY MAGNIFICATION RATIO | BASE SCREEN AREA | ... | ... |
| COPY MAGNIFICATION RATIO | BASE SCREEN AREA | MAGNIFICATION RATIO REGISTRATION | "BAIRITSU TOROKU" |
| COPY MAGNIFICATION RATIO | BASE SCREEN AREA | CANCEL | "CHUSHI" |
| COPY MAGNIFICATION RATIO | BASE SCREEN AREA | OK | "OKE" |

| VOICE OPERATION COMMAND | OPERATION KEY |
|---|---|
| "GENKO GASHITSU" | ORIGINAL-DOCUMENT IMAGE QUALITY |
| "KARA" | COLOR |
| "NODO" | DENSITY |
| "YOSHI" | PAPER |
| "BAIRITSU" | MAGNIFICATION RATIO |
| ... | ... |

FIG. 11

| VOICE OPERATION COMMAND | PRESSED COORDINATES |
|---|---|
| "GENKO GASHITSU" | (50, 400) |
| "KARA" | (150, 400) |
| "NODO" | (250, 400) |
| "YOSHI" | (350, 400) |
| "BAIRITSU" | (450, 400) |
| ... | ... |

FIG. 13

| SCREEN | GROUP IN SCREEN | OPERATION KEY | VOICE OPERATION COMMAND |
|---|---|---|---|
| COPY BASIC | BASE SCREEN AREA | ORIGINAL-DOCUMENT IMAGE QUALITY | "GENKO GASHITSU" |
| COPY BASIC | BASE SCREEN AREA | COLOR | "KARA" |
| ⋮ | ⋮ | ⋮ | ⋮ |
| COPY BASIC | BASE SCREEN AREA | FINISH | "SHIAGARI" |
| COPY BASIC | BASE SCREEN AREA | CHARACTER/PHOTO | "MOJI SYASHIN" |
| ⋮ | ⋮ | ⋮ | ⋮ |
| COPY BASIC | NUMERIC KEYPAD | 1 | "ICHI" |
| COPY BASIC | NUMERIC KEYPAD | 2 | "NI" |
| ⋮ | ⋮ | ⋮ | ⋮ |
| COPY BASIC | NUMERIC KEYPAD | CLOSE | "TOJIRU" |

| SCREEN | GROUP IN SCREEN | OPERATION KEY | VOICE OPERATION COMMAND |
|---|---|---|---|
| COPY BASIC | NUMERIC KEYPAD | 1 | "ICHI" |
| COPY BASIC | NUMERIC KEYPAD | 2 | "NI" |
| ... | ... | ... | ... |
| COPY BASIC | NUMERIC KEYPAD | CLOSE | "TOJIRU" |

| SCREEN | GROUP IN SCREEN | OPERATION KEY | VOICE OPERATION COMMAND |
|---|---|---|---|
| PDF DETAIL SETTING | BASE SCREEN AREA | ENCRYPTION | "ANGOKA" |
| PDF DETAIL SETTING | BASE SCREEN AREA | SIGNATURE | "SYOMEI" |
| PDF DETAIL SETTING | BASE SCREEN AREA | STAMP SYNTHESIS METHOD | "SUTANPU GOSEI HOHO" |
| PDF DETAIL SETTING | BASE SCREEN AREA | OUTLINE PDF | "AUTORAIN PIDIEFU" |
| ... | ... | ... | ... |
| PDF DETAIL SETTING | BASE SCREEN AREA | PROPERTY OF PDF DOCUMENT | "PUROPATEI" |
| PDF DETAIL SETTING | BASE SCREEN AREA | CANCEL | "CYUSHI" |
| PDF DETAIL SETTING | BASE SCREEN AREA | OK | "OKE" |
| ... | ... | ... | ... |
| PDF DETAIL SETTING | PULL-DOWN AREA (STAMP SYNTHESIS) | IMAGE | "GAZO" |
| PDF DETAIL SETTING | PULL-DOWN AREA (STAMP SYNTHESIS) | CHARACTER | "MOJI" |
| ... | ... | ... | ... |

| SCREEN | GROUP IN SCREEN | OPERATION KEY | VOICE OPERATION COMMAND |
|---|---|---|---|
| PDF DETAIL SETTING | PULL-DOWN AREA (STAMP SYNTHESIS) | IMAGE | "GAZO" |
| PDF DETAIL SETTING | PULL-DOWN AREA (STAMP SYNTHESIS) | CHARACTER | "MOJI" |

| SCREEN | GROUP IN SCREEN | OPERATION KEY | VOICE OPERATION COMMAND |
|---|---|---|---|
| COPY BASIC | BASE SCREEN AREA | ORIGINAL-DOCUMENT IMAGE QUALITY | "GENKO GASHITSU" |
| COPY BASIC | BASE SCREEN AREA | COLOR | "KARA" |
| ... | ... | ... | ... |
| COPY BASIC | BASE SCREEN AREA | FINISH | "SHIAGARI" |
| COPY BASIC | BASE SCREEN AREA | CHARACTER/PHOTO | "MOJI SYASHIN" |
| ... | ... | ... | ... |
| COPY BASIC | WARNING | GUIDANCE | "GAIDANSU" |

| X-COORDINATE RANGE | OPERATION KEY | VOICE OPERATION COMMAND | |
|---|---|---|---|
| 750-840 | ORIGINAL DOCUMENT SETTING | "GENKO SETTEI" | ⎫ |
| 850-940 | BOOK ORIGINAL DOCUMENT | "BUKKU GENKO" | ⎬ 820 (=M2) |
| 950-1040 | CONSECUTIVE READING | "RENZOKU YOMIKOMI" | |
| 1050-1140 | AUTOMATIC IMAGE ROTATION | "JIDO GAZO KAITEN" | |
| 1150-1240 | BOOKLET | "SYOSASSHI" | |
| 1250-1340 | BINDING MARGIN | "TOJISHIRO" | |
| 1350-1440 | IMAGE SHIFT | "GAZO SHIFUTO" | |
| 1450-1540 | MIRROR IMAGE | "KYOZO" | ⎭ |
| 1550-1640 | REPEAT | "RIPITO" | ⎫ |
| 1650-1740 | ENLARGED CONSECUTIVE PHOTOGRAPHING | "KAKUDAI RENSYA" | |
| 1750-1840 | OHP SLIP SHEET | "OEICHIPI GOSHI" | |
| 1850-1940 | COVER SHEET | "KABA SHITO" | ⎬ 830 (=M1) |
| 1950-2040 | INTER-SHEET | "INTA SHITO" | |
| 2050-2140 | PLUG-IN PAGE | "SASHIKOMI PEJI" | |
| 2150-2240 | SURFACE PREPARATION | "SHITAJI CYOSEI" | |
| 2250-2340 | CHARACTER REPRODUCTION | "MOJI SAIGEN" | |
| ... | ... | ... | ⎭ |

| X-COORDINATE RANGE | OPERATION KEY | VOICE OPERATION COMMAND | |
|---|---|---|---|
| 750-840 | ORIGINAL DOCUMENT SETTING | "GENKO SETTEI" | ⎫ |
| 850-940 | BOOK ORIGINAL DOCUMENT | "BUKKU GENKO" | |
| 950-1040 | CONSECUTIVE READING | "RENZOKU YOMIKOMI" | |
| 1050-1140 | AUTOMATIC IMAGE ROTATION | "JIDO GAZO KAITEN" | 820 (=M2) |
| 1150-1240 | BOOKLET | "SYOSASSHI" | |
| 1250-1340 | BINDING MARGIN | "TOJISHIRO" | |
| 1350-1440 | IMAGE SHIFT | "GAZO SHIFUTO" | |
| 1450-1540 | MIRROR IMAGE | "KYOZO" | ⎭ |
| 1550-1640 | REPEAT | "RIPITO" | ⎫ |
| 1650-1740 | ENLARGED CONSECUTIVE PHOTOGRAPHING | "KAKUDAI RENSYA" | |
| 1750-1840 | OHP SLIP SHEET | "OEICHIPI GOSHI" | |
| 1850-1940 | COVER SHEET | "KABA SHITO" | |
| 1950-2040 | INTER-SHEET | "INTA SHITO" | 830 (=M1) |
| 2050-2140 | PLUG-IN PAGE | "SASHIKOMI PEJI" | |
| 2150-2240 | SURFACE PREPARATION | "SHITAJI CYOSEI" | |
| 2250-2340 | CHARACTER REPRODUCTION | "MOJI SAIGEN" | ⎭ |
| ... | ... | ... | |

| GROUP IN SCREEN | OPERATION KEY | VOICE OPERATION COMMAND | |
|---|---|---|---|
| ORIGINAL DOCUMENT | ORIGINAL DOCUMENT SETTING | "GENKO SETTEI" | ⎫ |
| ORIGINAL DOCUMENT | BOOK ORIGINAL DOCUMENT | "BUKKU GENKO" | |
| ORIGINAL DOCUMENT | CONSECUTIVE READING | "RENZOKU YOMIKOMI" | |
| ORIGINAL DOCUMENT | AUTOMATIC IMAGE ROTATION | "JIDO GAZO KAITEN" | ⎬ 870 (=M2) |
| LAYOUT | BOOKLET | "SYOSASSHI" | |
| LAYOUT | BINDING MARGIN | "TOJISHIRO" | |
| LAYOUT | IMAGE SHIFT | "GAZO SHIFUTO" | |
| LAYOUT | MIRROR IMAGE | "KYOZO" | ⎭ |
| LAYOUT | REPEAT | "RIPITO" | ⎫ 880 (=M1) |
| LAYOUT | ENLARGED CONSECUTIVE PHOTOGRAPHING | "KAKUDAI RENSYA" | ⎭ |
| ... | ... | ... | |

| GROUP IN SCREEN | OPERATION KEY | VOICE OPERATION COMMAND | |
|---|---|---|---|
| ORIGINAL DOCUMENT | ORIGINAL DOCUMENT SETTING | "GENKO SETTEI" | |
| ORIGINAL DOCUMENT | BOOK ORIGINAL DOCUMENT | "BUKKU GENKO" | |
| ORIGINAL DOCUMENT | CONSECUTIVE READING | "RENZOKU YOMIKOMI" | |
| ORIGINAL DOCUMENT | AUTOMATIC IMAGE ROTATION | "JIDO GAZO KAITEN" | 870 (=M2) |
| LAYOUT | BOOKLET | "SYOSASSHI" | |
| LAYOUT | BINDING MARGIN | "TOJISHIRO" | |
| LAYOUT | IMAGE SHIFT | "GAZO SHIFUTO" | |
| LAYOUT | MIRROR IMAGE | "KYOZO" | |
| LAYOUT | REPEAT | "RIPITO" | 880 (=M1) |
| LAYOUT | ENLARGED CONSECUTIVE PHOTOGRAPHING | "KAKUDAI RENSYA" | |
| ... | ... | ... | |

FIG. 32

| JOB STATE | OPERATION KEY | VOICE OPERATION COMMAND |
|---|---|---|
| ALL STATES | RESET BUTTON | "RISETTO" |
| ALL STATES | HOME BUTTON | "HOMU" |
| JOB ACCEPTABLE | START BUTTON | "SUTATO" |
| JOB EXECUTING | STOP BUTTON | "SUTOPPU" |
| ... | ... | ... |

EXTRACTION

⟨TEXT DICTIONARY AFTER EXCLUSION OF "SUTATO"⟩

| JOB STATE | OPERATION KEY | VOICE OPERATION COMMAND |
|---|---|---|
| ALL STATES | RESET BUTTON | "RISETTO" |
| ALL STATES | HOME BUTTON | "HOMU" |
| JOB EXECUTING | STOP BUTTON | "SUTOPPU" |
| ... | ... | ... |

FIG. 33

| JOB STATE | OPERATION KEY | VOICE OPERATION COMMAND |
|---|---|---|
| ALL STATES | RESET BUTTON | "RISETTO" |
| ALL STATES | HOME BUTTON | "HOMU" |
| JOB ACCEPTABLE | START BUTTON | "SUTATO" |
| JOB EXECUTING | STOP BUTTON | "SUTOPPU" |
| ... | ... | ... |

EXTRACTION

<TEXT DICTIONARY AFTER EXCLUSION OF "SUTOPPU">

| JOB STATE | OPERATION KEY | VOICE OPERATION COMMAND |
|---|---|---|
| ALL STATES | RESET BUTTON | "RISETTO" |
| ALL STATES | HOME BUTTON | "HOMU" |
| JOB ACCEPTABLE | START BUTTON | "SUTATO" |
| ... | ... | ... |

FIG. 34

| USER AUTHENTICATION STATE | OPERATION KEY | VOICE OPERATION COMMAND |
|---|---|---|
| USABLE EVEN BY PUBLIC USER | PUBLIC BOX | "PABURIKKU BOKKUSU" |
| USABLE ONLY AFTER USER AUTHENTICATION | USER BOX | "UZA BOKKUSU" |
| ... | ... | ... |

EXTRACTION

<TEXT DICTIONARY AFTER EXCLUSION OF "YUZA BOKKUSU">

| USER AUTHENTICATION STATE | OPERATION KEY | VOICE OPERATION COMMAND |
|---|---|---|
| USABLE EVEN BY PUBLIC USER | PUBLIC BOX | "PABURIKKU BOKKUSU" |
| ... | ... | ... |

<PRIORITY TABLE>

| JOB STATE | PRIORITY (COEFFICIENT) |
|---|---|
| JOB EXECUTING | 1.0 |
| JOB ACCEPTABLE | 0.9 |
| ALL STATES | 0.5 |
| ... | ... |

SORT

<TEXT DICTIONARY>

| JOB STATE | OPERATION KEY | VOICE OPERATION COMMAND | PRIORITY |
|---|---|---|---|
| JOB EXECUTING | STOP BUTTON | "SUTOPPU" | 1.0 |
| JOB ACCEPTABLE | START BUTTON | "SUTATO" | 0.9 |
| ALL STATES | RESET BUTTON | "RISETTO" | 0.5 |
| ALL STATES | HOME BUTTON | "HOMU" | 0.5 |
| ... | ... | ... | ... |

<PRIORITY TABLE>

| USER AUTHENTICATION STATE | PRIORITY |
|---|---|
| USABLE ONLY AFTER USER AUTHENTICATION | 1.0 |
| USABLE EVEN BY PUBLIC USER | 0.5 |

SORT

<TEXT DICTIONARY>

| USER AUTHENTICATION STATE | OPERATION KEY | VOICE OPERATION COMMAND | PRIORITY |
|---|---|---|---|
| USABLE ONLY AFTER USER AUTHENTICATION | USER BOX | "UZA BOKKUSU" | 1.0 |
| USABLE EVEN BY PUBLIC USER | PUBLIC BOX | "PABURIKKU BOKKUSU" | 0.5 |
| ... | ... | ... | ... |

FIG. 38

| JOB STATE | OPERATION KEY | VOICE OPERATION COMMAND |
|---|---|---|
| ALL STATES | RESET BUTTON | "RISETTO" |
| ALL STATES | HOME BUTTON | "HOMU" |
| JOB ACCEPTABLE | START BUTTON | "SUTATO" |
| JOB EXECUTING | STOP BUTTON | "SUTOPPU" |
| ... | ... | ... |

(IN CASE OF JOB EXECUTION) 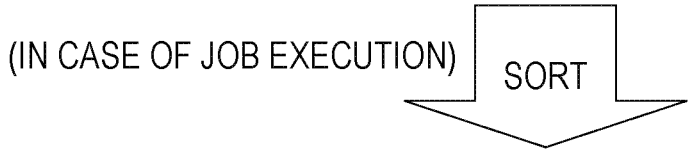 SORT

| JOB STATE | OPERATION KEY | VOICE OPERATION COMMAND |
|---|---|---|
| JOB EXECUTING | STOP BUTTON | "SUTOPPU" |
| ALL STATES | RESET BUTTON | "RISETTO" |
| ALL STATES | HOME BUTTON | "HOMU" |
| JOB ACCEPTABLE | START BUTTON | "SUTATO" |
| ... | ... | ... |

FIG. 39

| USER AUTHENTICATION STATE | OPERATION KEY | VOICE OPERATION COMMAND |
|---|---|---|
| USABLE EVEN BY PUBLIC USER | PUBLIC BOX | "PABURIKKU BOKKUSU" |
| USABLE ONLY AFTER USER AUTHENTICATION | USER BOX | "UZA BOKKUSU" |
| ... | ... | ... |

(AFTER COMPLETION OF USER AUTHENTICATION) SORT

| USER AUTHENTICATION STATE | OPERATION KEY | VOICE OPERATION COMMAND |
|---|---|---|
| USABLE ONLY AFTER USER AUTHENTICATION | USER BOX | "UZA BOKKUSU" |
| USABLE EVEN BY PUBLIC USER | PUBLIC BOX | "PABURIKKU BOKKUSU" |
| ... | ... | ... |

<USE HISTORY TABLE>

| VOICE OPERATION COMMAND | USE COUNT |
|---|---|
| "GENKO GASHITSU" | 10 |
| "KARA" | 10 |
| "NODO" | 0 |
| "BAIRITSU" | 5 |
| ... | ... |

"COLOR" IN DICTIONARY IS HIT

<USE HISTORY TABLE>

| VOICE OPERATION COMMAND | USE COUNT |
|---|---|
| "GENKO GASHITSU" | 10 |
| "KARA" | 11 |
| "NODO" | 0 |
| "BAIRITSU" | 5 |
| ... | ... |

<(i-TH) TEXT DICTIONARY>

| PRIORITY | VOICE OPERATION COMMAND | OPERATION KEY |
|---|---|---|
| 1.0 | "SUTOPPU" | STOP KEY |
| 0.6 | "PUROGURAMU" | PROGRAM CALL |
| 0.4 | "KARA" | COLOR |
| 0.3 | "BAIRITSU" | MAGNIFICATION RATIO |
| ... | ... | ... |

TH1

(EXCLUSION)

FIG. 44

| GROUP IN SCREEN | VOICE OPERATION COMMAND | PRESSED COORDINATES | |
|---|---|---|---|
| AREA A | "GENKO GASHITSU" | (50, 400) | |
| AREA A | "KARA" | (150, 400) | |
| ... | ... | ... | 610 |
| AREA A | "BAIRITSU" | (450, 400) | |
| AREA A | "RYOMEN"/"PEJI SYUYAKU" | (550, 400) | |
| AREA A | "SHIAGARI" | (650, 400) | |

FIG. 45

| GROUP IN SCREEN | VOICE OPERATION COMMAND | PRESSED COORDINATES | | |
|---|---|---|---|---|
| AREA A | "GENKO GASHITSU" | (50, 400) | | |
| AREA A | "KARA" | (150, 400) | | |
| ... | ... | ... | 610 | |
| AREA A | "BAIRITSU" | (450, 400) | | |
| AREA A | "RYOMEN"/"PEJI SYUYAKU" | (550, 400) | | 602 |
| AREA A | "SHIAGARI" | (650, 400) | | |
| AREA B | "ICHI" | (520, 200) | | |
| AREA B | "NI" | (600, 200) | 650 | |
| ... | ... | ... | | |
| AREA B | "TOJIRU" | (640, 400) | | |

IMAGE PROCESSING DEVICE FOR RECEIVING AN OPERATION INSTRUCTION BY A VOICE, METHOD FOR CONTROLLING IMAGE PROCESSING DEVICE, AND PROGRAM

This application is a continuation of U.S. patent application Ser. No. 16/272,360, filed on Feb. 11, 2019, which claims the priority of Japanese Patent Application No. 2018-027205, filed on Feb. 19, 2018. The subject matter of U.S. patent application Ser. No. 16/272,360 and Japanese Patent Application No. 2018-027205 is incorporated herein.

BACKGROUND

Technological Field

The present invention relates to an image processing device such as a multi-functional peripheral (MFP), and a technology related thereto.

Description of the Related Art

There exists a technology in which an operation instruction is given by a voice in a MFP or the like. Specifically, when a voice of an operator is input as audio data, voice recognition processing for the audio data is executed, and voice recognition data (data obtained by converting the voice into text data) is obtained as a processing result of the voice recognition processing. In addition, after it has been checked that the voice recognition data (text data) agrees with one voice operation command among a plurality of voice operation commands (text data) registered beforehand, operation corresponding to the one voice operation command (in other words, operation assigned to the one voice operation command beforehand) is executed. As such a technology, for example, the technology disclosed in JP 2011-049705 A exists.

In the technology disclosed in JP 2011-049705 A, by using, as a search range, a keyword group (voice operation command group) predetermined corresponding to a screen of a current layer, processing of searching for voice recognition data pertaining to a result of recognizing voice data within the search range is executed.

Incidentally, with respect to an image processing device such as an MFP, there is, for example, a case where a screen of a current layer is displayed together with another screen serving as a caller of the screen of the current layer (also referred to as a screen serving as a caller) (in other words, a screen that has been most recently called is displayed so as to be superimposed on a screen serving as a caller of the most recently called screen).

However, with respect to the technology disclosed in JP 2011-049705 A, in a case such as that described above, a search range of voice recognition data is only a keyword group (voice operation command group) predetermined corresponding to the screen of the current layer. Therefore, an instruction of an operation button in a screen (the screen serving as the caller) other than the screen of the current layer cannot be given. In other words, the search range of the voice recognition data is always fixed to the voice operation command group related to one layer screen (here, the current layer screen) between two operation screens. Therefore, a voice operation command related to the other layer screen between the two operation screens cannot be detected.

SUMMARY

Accordingly, an object of the present invention is to provide a technology that enables to properly detect one voice operation command corresponding to user's voice input from among a plurality of voice operation commands related to a plurality of operation screens.

To achieve the abovementioned object, according to an aspect of the present invention, an image processing device reflecting one aspect of the present invention comprises: a displayer; and a hardware processor that obtains voice recognition data that is a voice recognition result related to a voice vocalized in a state in which at least one operation screen is displayed in the displayer, determines a search target character string on the basis of the voice recognition data, executes search processing of searching for one voice operation command that agrees with the search target character string among a plurality of voice operation commands including a voice operation command group related to a first screen related to the image processing device, and a voice operation command group related to a second screen displayed according to user's operation for the first screen, and executes processing corresponding to the one voice operation command that has been searched for by the hardware processor, wherein the hardware processor executes first search processing in which a search range is a first command group to which first search priority order is given, among the plurality of voice operation commands, in a case where the search target character string is not detected by the first search processing in which the search range is the first command group, executes second search processing in which a search range is a second command group to which second search priority order is given, among the plurality of voice operation commands, the first command group is a voice operation command group related to a first priority screen between two operation screens that are the first screen and the second screen, the first priority screen being a screen that is being displayed when the voice has been vocalized, and that has been most recently called before the voice is vocalized, and the second command group is a voice operation command group related to a second priority screen between the two operation screens, the second priority screen being different from the first priority screen.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 8 is a diagram illustrating a voice operation command group related to the basic menu screen;

FIG. 9 is a diagram illustrating a voice operation command group related to the magnification ratio setting screen;

FIG. 10 is a diagram illustrating a state in which each voice operation command is registered with the voice operation command associated with an operation key (ID of the operation key);

FIG. 11 is a diagram illustrating a state in which each voice operation command is registered with the voice operation command associated with position information (coordinate values and the like) of an operation key;

FIG. 13 is a diagram illustrating a voice operation command group related to two operation screens (including a numeric keypad screen);

FIG. 14 is a diagram illustrating a voice operation command group related to the numeric keypad screen;

FIG. 17 is a diagram illustrating a voice operation command group related to two operation screens (including a pull-down list screen);

FIG. 20 is a diagram illustrating a voice operation command group related to two operation screens (including the warning screen);

FIG. 24 is a diagram illustrating a voice operation command group related to two operation screens in the map-type display mode;

FIG. 25 is a diagram illustrating a voice operation command group related to two operation screens in the map-type display mode;

FIG. 28 is a diagram illustrating a voice operation command group related to two operation screens in the map-type display mode;

FIG. 29 is a diagram illustrating a voice operation command group related to two operation screens in the map-type display mode;

FIG. 32 is a diagram illustrating exclusion processing (fourth embodiment);

FIG. 33 is a diagram illustrating another exclusion processing;

FIG. 34 is a diagram illustrating still another exclusion processing;

FIG. 38 is a diagram illustrating a state in which voice operation commands in a certain layer are rearranged on the basis of being during job execution;

FIG. 39 is a diagram illustrating a state in which voice operation commands in a certain layer are rearranged on the basis of being after user authentication;

FIG. 44 is a diagram illustrating a text dictionary that is automatically generated on the basis of, for example, OCR processing for the basic menu screen;

FIG. 45 is a diagram illustrating a text dictionary that is automatically generated on the basis of, for example, OCR processing for a difference image (numeric keypad screen) as well;

DETAILED DESCRIPTION OF EMBODIMENTS

Hereinafter, one or more embodiments of the present invention will be described with reference to the drawings. However, the scope of the invention is not limited to the disclosed embodiments.

1. First Embodiment

1-1. Configuration of MFP 10

Figure 1:
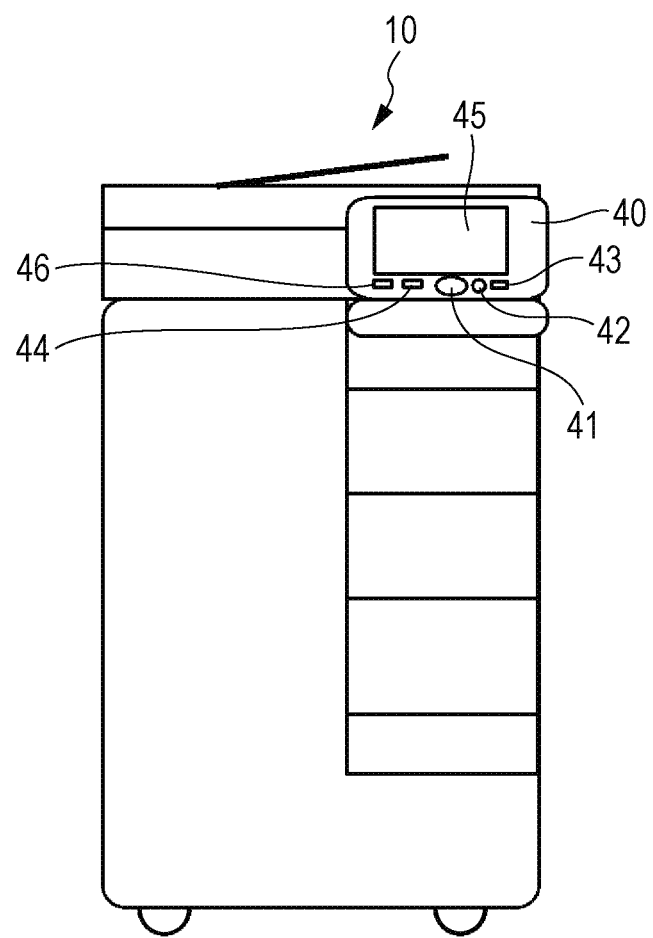
FIG. 1 is a front view illustrating an external appearance of an MFP (image processing device)

FIG. 1 is a front view illustrating an external appearance of an image processing device according to a first embodiment of the present invention. Here, an MFP 10 is presented as the image processing device.

Figure 2:
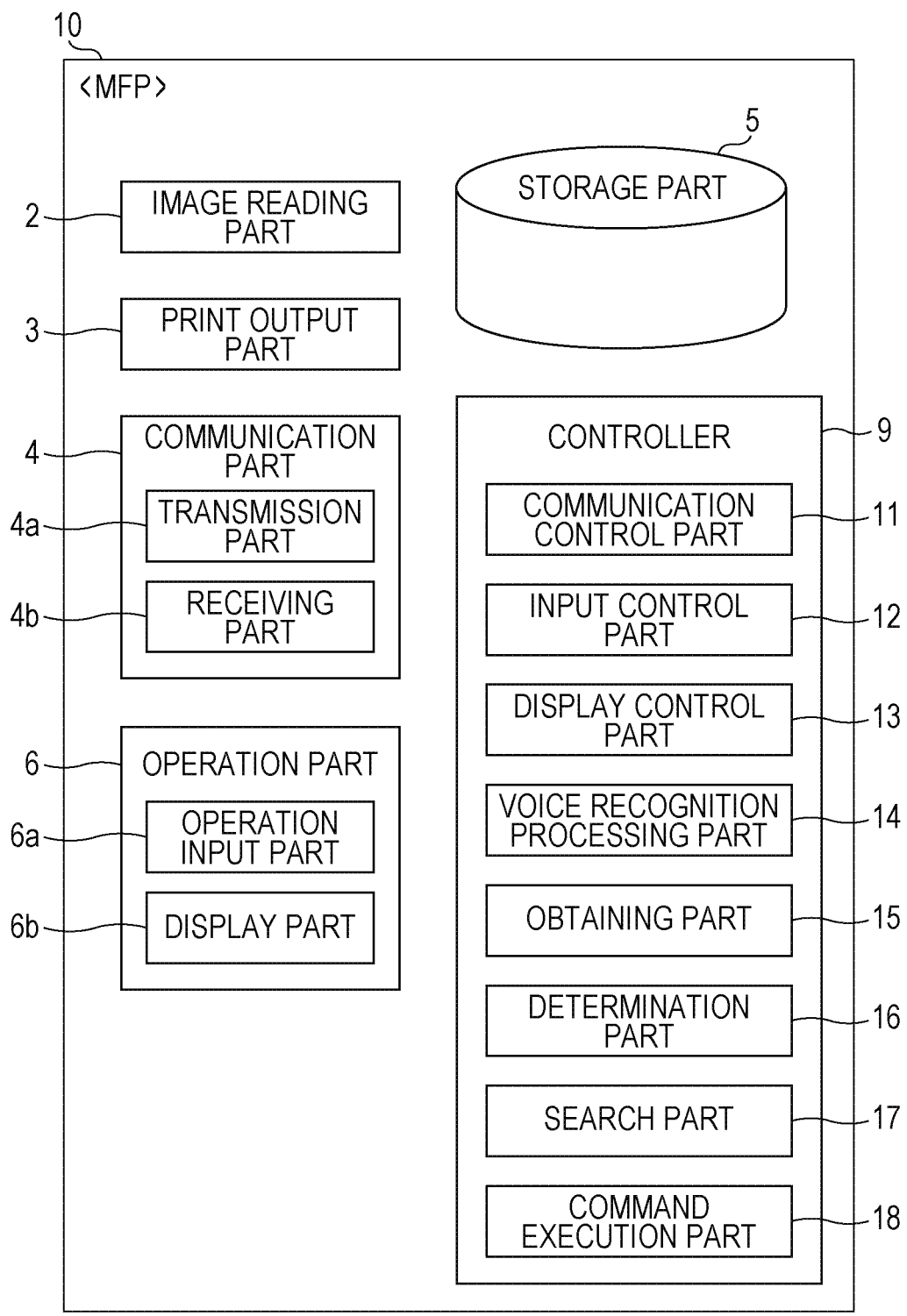
FIG. 2 is a diagram illustrating functional blocks of the multi-functional peripheral (MFP)

FIG. 2 is a diagram illustrating functional blocks of the multi-functional peripheral (MFP) 10.

The MFP 10 is a device (also referred to as "complex machine") that is provided with a scanning function, a copy function, a facsimile function, a box storing function, and the like. Specifically, as shown in a functional block diagram of FIG. 2, the MFP 10 is provided with an image reading part 2, a print output part 3, a communication part 4, a storage part 5, an operation part 6, a controller 9, and the like. The MFP 10 realizes various functions by causing each of these parts to operate in a multiple manner. It should be noted that the MFP 10 is also expressed as an image forming device or the like.

The image reading part 2 is a processing part that optically reads (that is to say, scans) an original document placed at a predetermined position of the MFP 10, and generates image data of the original document (also referred to as "original document image" or "scanned image"). This image reading part 2 is also referred to as a scanning part.

The print output part 3 is an output part that prints out an image to various media such as paper on the basis of data related to a print target. This MFP 10 also serves as an electrophotographic printer (full-color printer). The print output part 3 includes various hardware mechanisms (also referred to as "image forming mechanism" or "printout mechanism") such as an exposure part, a development part, a transfer part, and a fixing part.

The communication part 4 is a processing part that is capable of performing facsimile communication through a public line or the like. Moreover, the communication part 4 is also capable of performing network communication through a network. This network communication uses various protocols such as, for example, Transmission Control Protocol/Internet Protocol (TCP/IP). Using the network communication enables the MFP 10 to give and receive various data to/from a desired destination. The communication part 4 includes: a transmission part 4a that transmits various data; and a receiving part 4b that receives various data.

The storage part 5 is formed by a storage device such as a hard disk drive (HDD).

The operation part 6 is provided with: an operation input part 6a that accepts operation input for the MFP 10; and a display part 6b that performs display output of various kinds of information. This MFP 10 is provided with a substantially plate-like operation panel part 40 (refer to FIG. 1). The operation panel part 40 has a touch panel 45 (refer to FIG. 1) on the front side thereof. The touch panel (operation panel) 45 is formed by embedding a piezoelectric sensor or the like in a liquid crystal display panel. The touch panel 45 is capable of displaying various kinds of information, and is capable of accepting operation input from an operator (operation input by operator's fingers). For example, various screens (including button images) such as a menu screen are displayed on the touch panel 45. The operator is allowed to change various setting contents of the MFP 10 by pressing buttons that are virtually arranged in the touch panel 45 (buttons expressed by button images (also referred to as "software buttons" or "software keys")). The touch panel 45 functions as a part of the operation input part 6a, and also functions as a part of the display part 6b. In addition, the operation panel part 40 is also provided with hardware keys (hardware buttons) 41 to 44, and 46.

The controller (control part) 9 is a control device that is built into the MFP 10, and that controls the MFP 10 in a unified manner. The controller 9 is formed as a computer system that is provided with a CPU, various semiconductor memories (an RAM and a ROM), and the like. The controller 9 realizes various processing parts by executing, in a CPU, a predetermined software program (also referred to as merely a "program") stored in a ROM (for example, an EEPROM®). It should be noted that the program (in detail, a program module group) may be recorded on a portable recording medium such as a USB memory so as to be read from the recording medium, and then so as to be installed in the MFP 10. Alternatively, the program may be downloaded via a network or the like so as to be installed in the MFP 10.

Specifically, as shown in FIG. 2, the controller 9 executes the program to realize various processing parts including a communication control part 11, an input control part 12, a display control part 13, a voice recognition processing part 14, an obtaining part 15, a determination part 16, a search part 17, and a command execution part 18.

The communication control part 11 is a processing part that controls communication operation with other devices.

The input control part 12 is a control part that controls operation input operation for the operation input part 6a. For example, the input control part 12 controls operation of accepting operation input into an operation screen (also referred to as "operation screen area").

The display control part 13 is a processing part that controls display operation in the display part 6b. The display control part 13 causes the display part 6b to display, for example, an operation screen for operating the MFP 10.

The voice recognition processing part 14 is a processing part that executes voice recognition processing related to a voice (voice input) vocalized by a user. It should be noted that the voice recognition processing part 14 operates as a part of the operation part 6.

The obtaining part 15 is a processing part that obtains voice recognition data (text data) that is a voice recognition result related to the voice input. The obtaining part 15 obtains a result of the voice recognition or the like by the voice recognition processing part 14.

The determination part 16 is a processing part that determines a search target character string on the basis of voice recognition data.

The search part 17 is a processing part that executes search processing of searching for one voice operation command (text data) that agrees with the search target character string from among a plurality of voice operation commands The command execution part 18 is a processing part that executes processing (various setting processing and/or job execution processing, and the like) according to the one voice operation command searched for by the search part 17.

For example, the search part 17 gives the priority order to each of a plurality of command groups that include the first command group M1 and the second command group M2, selected from among a plurality of voice operation commands, and executes search processing in which a search range is each command group according to the priority order given to the corresponding command group.

The search processing is executed, for example, in two stages. Specifically, first of all, the search part 17 executes first search processing in which a search range is a first command group M1 (also referred to as "first operation command group") that has been narrowed down from among a plurality of voice operation commands (for example, a plurality of voice operation commands related to a plurality of operation screens that are currently being displayed) according to a predetermined criterion. After that, in a case where the search target character string is not detected by the first search processing in which the search range is the first command group M1, the search part 17 executes second search processing in which a search range is a second command group M2 (also referred to as "second operation command group") selected from among the plurality of voice operation commands The first command group M1 is also expressed as a voice operation command group to which the first search priority order has been given; and the second command group M2 is also expressed as a voice operation command group to which the second search priority order has been given.

It should be noted that as described later, the plurality of voice operation commands related to an operation screen (210 and the like) that is currently being displayed can include not only commands corresponding to operation by software keys (keys displayed on the touch panel 45) in the operation screen, but also commands (start job execution/stop job execution and the like) corresponding to operation by hardware keys (a start key/a stop key and the like).

1-2. Voice Operation Command

In this embodiment, it is assumed that a voice operation command group related to each screen is set (registered) beforehand by being associated with the each screen. For example, it is assumed that a plurality of voice operation commands such as that shown in FIG. 8 are registered beforehand as a voice operation command group 610 related to the basic menu screen 210 (refer to FIG. 5), and that a plurality of voice operation commands such as that shown in FIG. 9 are registered beforehand as a voice operation command group 630 related to a magnification ratio setting screen 230 (refer to FIG. 7). Specifically, it is assumed that a command dictionary (text dictionary) in which the voice operation command groups 610, 630, and the like are registered beforehand is stored in the storage part 5 beforehand Specifically, as shown in FIG. 8, as the voice operation command group 610 related to the basic menu screen 210 (refer to FIG. 5), a plurality of voice operation commands including "GENKO GASHITSU (original-document image quality)", "KARA (color)", "NODO (density)", "YOSHI (paper)", "BAIRITSU (magnification ratio)", "RYOMEN/PEJI SYUYAKU (double-sided/page aggregation)", "SHIAGARI (finish)", "MOJI SYASHIN (character photo)", "OTO KARA (auto color)", "FUTSU (ordinary)", "JIDO (automatic)", and "HYAKU PASENTO (100%)" are registered. Each voice operation command is expressed as text data indicating each operation instruction.

In addition, these voice operation commands are registered by being associated with operation keys 211 to 217 and the like (also refer to FIG. 5) related to the basic menu screen 210.

For example, the voice operation commands "GENKO GASHITSU (original-document image quality)" and "MOJI SYASHIN (character photo)" are each associated with an operation key "original-document image quality" (software key 211) in a "copy base" screen (the basic menu screen 210) (in detail, a "base screen area" group of the basic menu screen 210).

In addition, the voice operation commands "YOSHI (paper)" and "JIDO (automatic)" are each associated with an operation key "paper" (software key 214) in the "copy basic" screen (the basic menu screen 210) (in detail, the "base screen area" group of the basic menu screen 210).

The voice operation commands "BAIRITSU (magnification ratio)" and "HYAKU PASENTO (100%)" are associated with an operation key "magnification ratio" (software key 215) in the "copy basic" screen (the basic menu screen 210) (in detail, the "base screen area" group of the basic menu screen 210).

Similarly, each of the other voice operation commands is also associated with any of the other operation keys (212, 213, 216, 217, and the like).

In addition, as shown in FIG. 9, as the voice operation command group 630 related to the magnification ratio setting screen 230 (refer to FIGS. 6 and 7), a plurality of voice operation commands including "JIDO (automatic)", "CHISAME (smallish)", "PURASU (plus)", "MAINASU (minus)", "GOJYU PASENTO (50%)", "NANAJYUTTEN NANA PASENTO (70.7%)", "HACHIJYUICHITEN ROKU PASENTO (81.6%)", "HACHIJYUROKUTEN ROKU PASENTO (86.6%)", and "HYAKU PASENTO/TOUBAI (100%/non-magnified)" are registered.

In addition, these voice operation commands are registered by being associated with, for example, operation keys 231 to 237 and 241 to 249 (software keys) related to the magnification ratio setting screen 230.

For example, the voice operation command "JIDO (automatic)" is associated with an operation key "automatic" (the software key 231) in the "copy magnification ratio" screen (the magnification ratio setting screen 230) (in detail, the "base screen area" group of the magnification ratio setting screen 230).

Similarly, each of the other voice operation commands is also associated with any of the operation keys 232 to 237, 241 to 249, and the like.

As described later, when each voice operation command (voice input) is accepted, the MFP 10 executes operation similar to that executed when each operation key corresponding to the each voice operation command is pressed. Specifically, the MFP 10 (spuriously) generates the same operation event (internal event) as that generated when the each operation key is pressed, and realizes operation similar to that executed when the each operation key is pressed.

It should be noted that each voice operation command may be registered by being associated with an ID of the operation key (refer to FIG. 10), or may be registered by being associated with position information of the operation key (for example, coordinate values, in a screen, of a representative position of the operation key) (refer to FIG. 11). In other words, each operation key may be identified by an ID (identifier) that has been given thereto beforehand, or may be identified by coordinate values in the screen. In addition, after one voice operation command corresponding to an input voice is searched for, when processing corresponding to the one voice operation command is executed, the MFP 10 may execute processing that is identified by the ID of the operation key (for example, application programming interface (API) execution processing associated with the ID of the operation key), or may execute processing assuming that pressing operation for representative coordinate values of the operation key has been given.

In addition, the voice operation commands related to the basic menu screen 210 may include not only the voice operation commands registered by being associated with the software keys (software buttons) displayed on the basic menu screen 210, but also voice operation commands registered by being associated with hardware keys (hardware buttons) (41, 42, 43, 44, 46) (refer to FIG. 1) provided on the operation panel part 40. For example, in addition to the registered contents of FIG. 8, a voice operation command "SUTATO (start)" may be further registered by being associated with the start key (start button) 41, and a voice operation command "SUTOPPU (stop)" may be further registered by being associated with the stop key (stop button) 42 (refer to FIG. 32). Further, a voice operation command "RISETTO (reset)" may be registered by being associated with the reset key (reset button) 43; and a voice operation command "HOMU (home)" may be registered by being associated with a home key (home button) 44. Moreover, a voice operation command " TENKI (numeric keypad)" may be registered by being associated with a numeric keypad call button 46.

With respect to the magnification ratio setting screen 230 as well, voice operation commands related to the magnification ratio setting screen 230 may include those registered by being associated with the hardware keys (41, 42, 43, 44, 46, and the like) in a similar manner.

1-3. Outline of Operation

Next, the operation according to the first embodiment will be outlined. In this first embodiment, in a case where a sub-screen (230 and the like) called from a main screen (210 and the like) is displayed on the touch panel 45 together with the main screen (refer to FIG. 6 and the like), a mode in which two-stage search processing is executed (refer to FIG. 3 and the like) will be mainly described.

Figure 3:
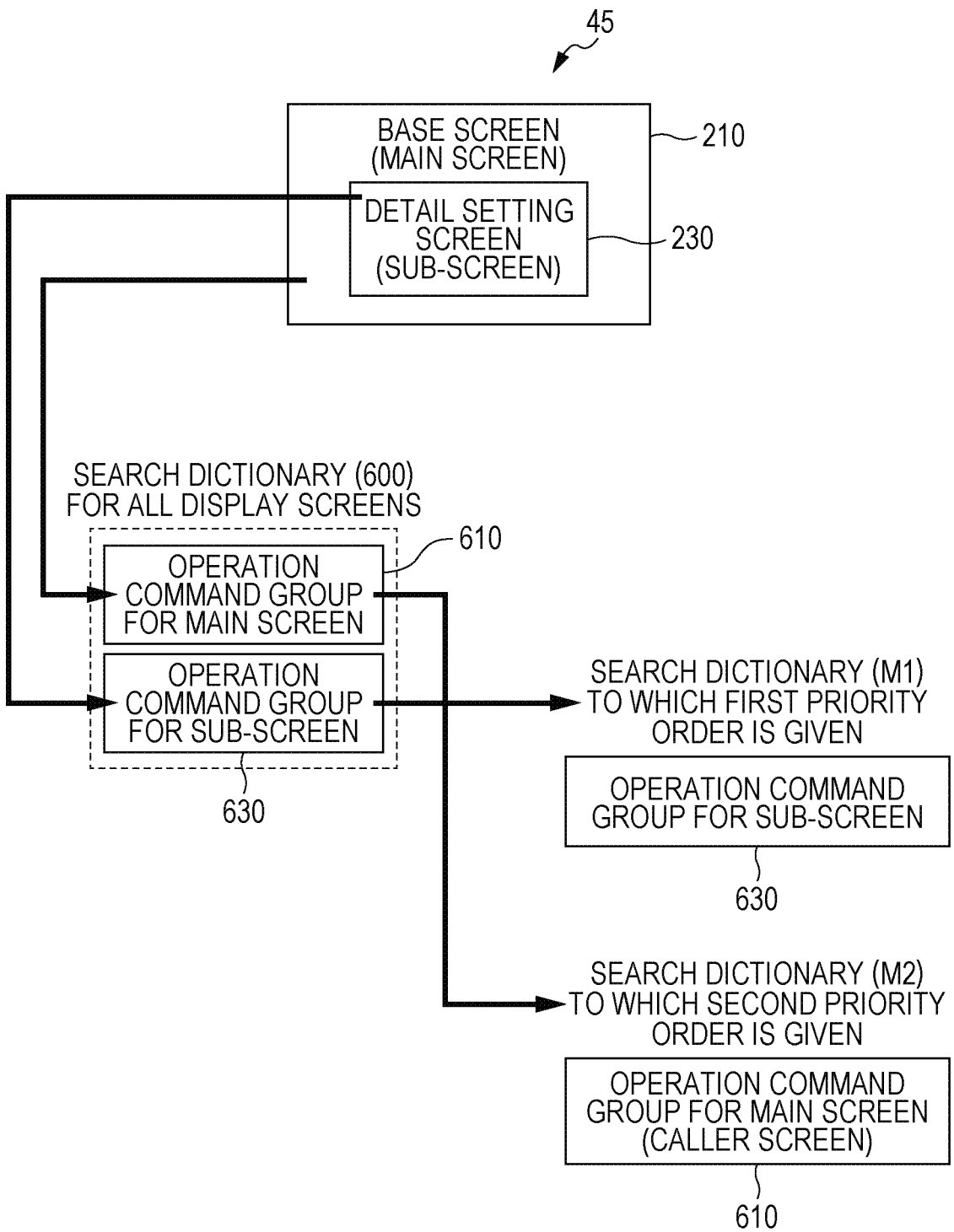
FIG. 3 is a conceptual diagram illustrating an outline of operation according to a first embodiment.
Figure 4:
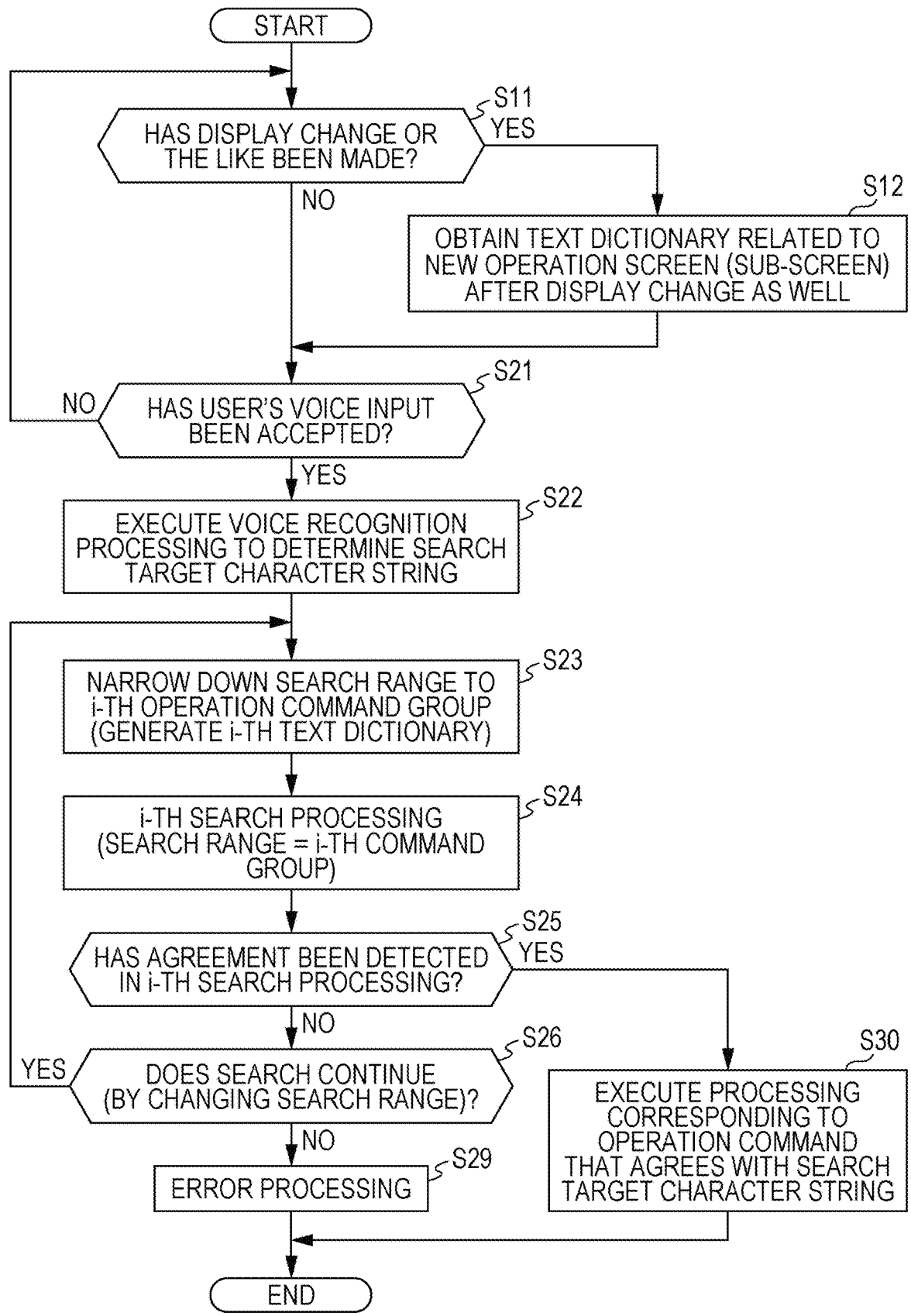
FIG. 4 is a flowchart illustrating operation according to the first embodiment.
Figure 5:
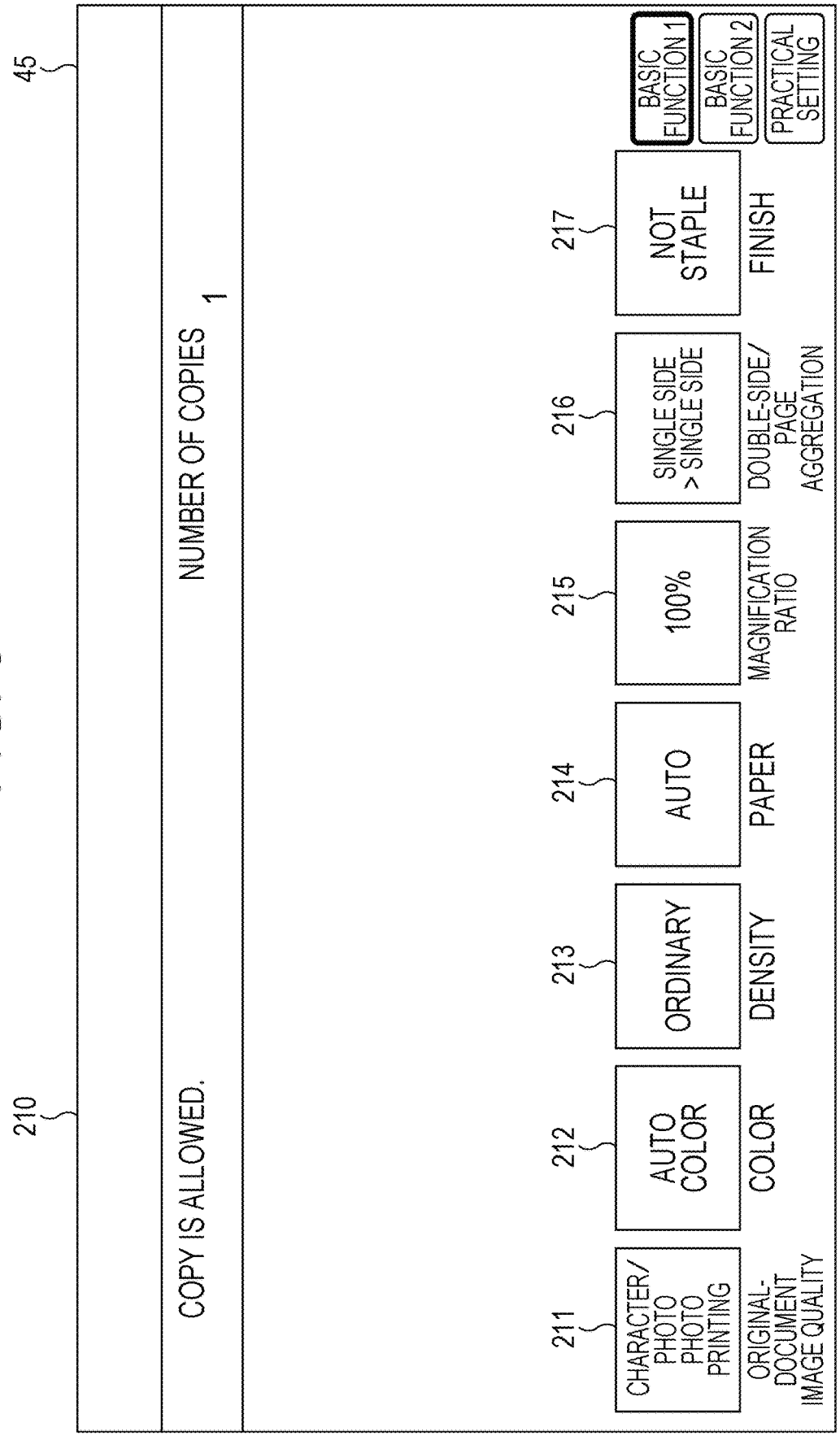
FIG. 5 is a diagram illustrating a basic menu screen related to a copy job.
Figure 6:
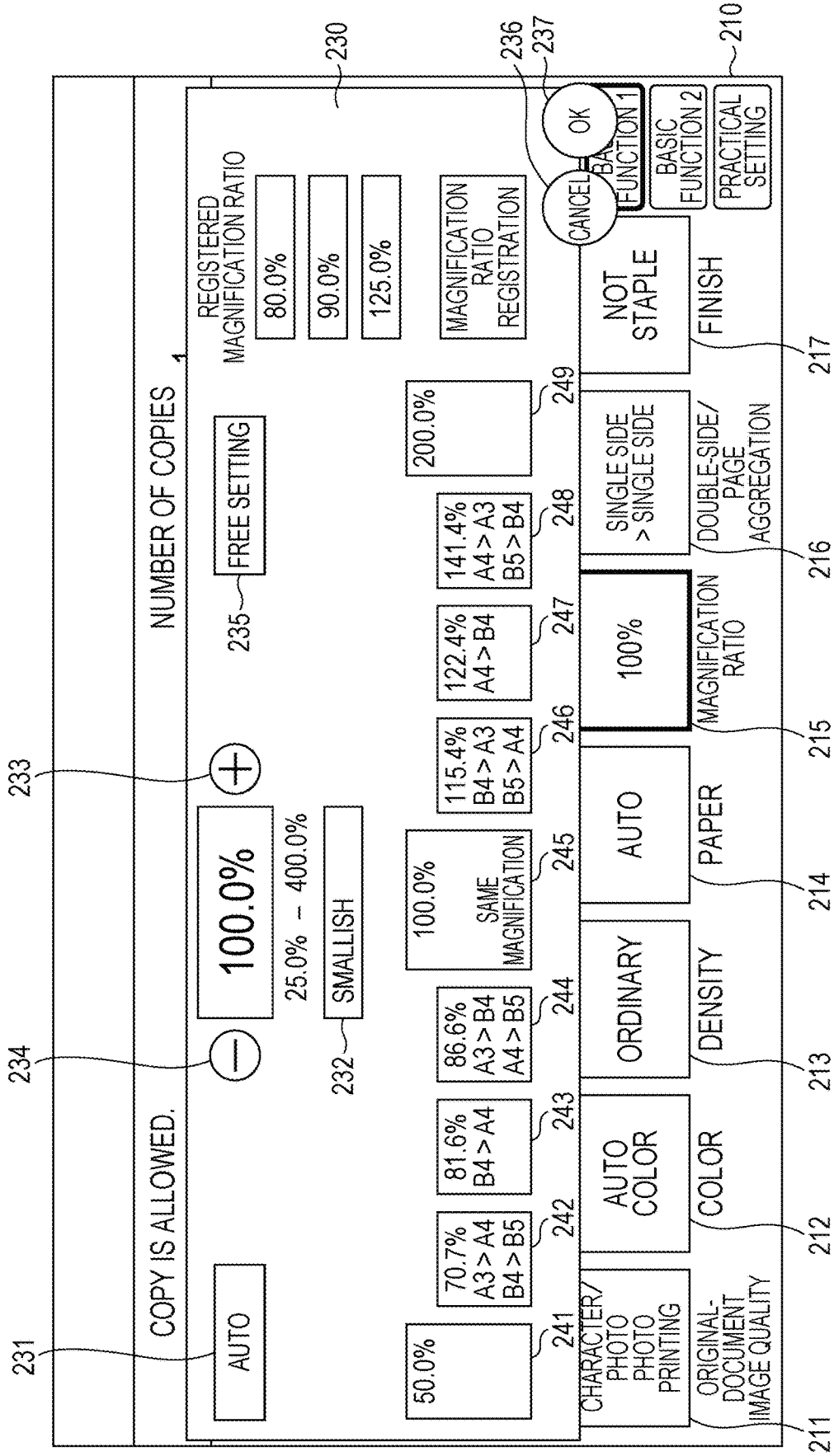
FIG. 6 is a diagram illustrating a state in which a magnification ratio setting screen is displayed so as to be superimposed on the basic menu screen.
Figure 7:
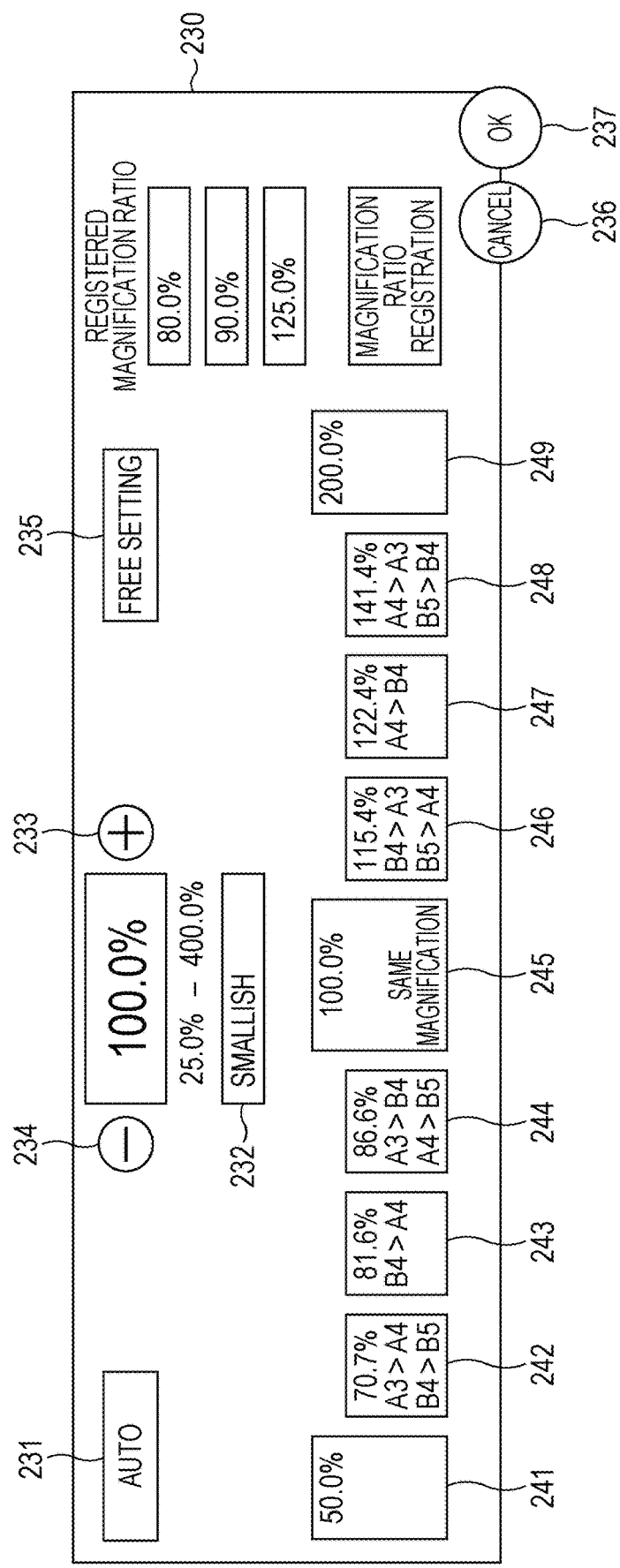
FIG. 7 is a diagram illustrating only the magnification ratio setting screen.

FIG. 3 is a conceptual diagram illustrating an outline of the operation according to the first embodiment; and FIG. 4 is a flowchart illustrating the operation according to the first embodiment. In addition, FIG. 5 is a diagram illustrating the basic menu screen 210 related to a copy job; and FIG. 6 is a diagram illustrating a state in which the detail setting screen 230 (also referred to as "magnification ratio setting screen") related to the copy magnification ratio is displayed so as to be superimposed on the basic menu screen 210. Moreover, FIG. 7 is a diagram that extracts and illustrates only the magnification ratio setting screen 230. The magnification ratio setting screen 230 is a detail setting screen that is displayed according to user's operation for the basic menu screen 210 (for example, pressing of a magnification-ratio setting button 215 in the basic menu screen 210). It should be noted that as shown in FIGS. 5 and 6, the plurality of operation keys 211 to 217 (software keys) are displayed in the basic menu screen 210, and the plurality of operation keys 231 to 237, 241 to 249 (software keys), and the like are displayed in the magnification ratio setting screen 230.

Incidentally, in a case where only the basic menu screen 210 (refer to FIG. 5) is displayed on the touch panel 45, search processing (processing of searching for a voice recognition result of a user) in which a search range is only the voice operation command group 610 is executed. Specifically, the voice recognition result of the user is searched for from among the voice operation command group 610 that is registered by being associated with the basic menu screen 210.

Meanwhile, for example, in a state in which the basic menu screen 210 (FIG. 5) is displayed, when the magnification-ratio setting button 215 in the basic menu screen 210 is pressed, a display state of the touch panel 45 changes to a state such as that shown in FIG. 6. In FIG. 6, the magnification ratio setting screen 230 (sub-screen) called from the basic menu screen 210 (main screen) is displayed on the touch panel 45 together with the basic menu screen 210. In other words, in FIG. 6, both of the two operation screens 210 and 230 that differ in layer from each other are displayed on the touch panel 45.

In such a display state, supposing that a search range of voice recognition data is always fixed to a voice operation command group related to one layer screen (for example, the current layer screen 230) between two operation screens as described above (refer to JP 2011-049705 A), it is not possible to accept a voice operation command related to the other layer screen 210 between the two operation screens.

For example, although each voice operation command ("JIDO (automatic)" and the like) related to the sub-screen (the magnification ratio setting screen 230) can be searched for, a voice operation command that is associated with each button in the main screen (the basic menu screen 210) (for example, the voice operation command "GENKO GASHITSU (original-document image quality)" or the like that is associated with the button 211 for setting the original-document image quality in the basic menu screen 210) cannot be searched for.

Accordingly, in the first embodiment, operation, the search target of which is a voice operation command group related to both of the two operation screens 230 and 210, is executed.

Specifically, first search processing in which a search range is the voice operation command group 630 related to the sub-screen 230 is performed, and subsequently, second search processing in which a search range is the voice operation command group 610 related to the main screen 210 is performed. More specifically, in a case where a search target character string is not detected within the first search range by the first search processing, the second search processing in which a search range is the voice operation command group 610 related to the operation screen 210 serving as a caller is executed.

This enables even a voice operation command (for example, "GENKO GASHITSU (original-document image quality)") that agrees with any of voice operation commands of the voice operation command group 610 related to the operation screen (the operation screen serving as a caller) 210 other than the operation screen 230 that has been most recently called to be searched for. Therefore, one voice operation command corresponding to a user's voice for operation can be properly detected from among the plurality of voice operation commands related to the plurality of operation screens.

In more detail, the following operation is executed in the first embodiment.

First of all, first search processing in which a search range is a first command group M1 that has been narrowed down from among voice operation commands of the plurality of voice operation command groups 610 and 630 according to a predetermined criterion (described next) is executed (also refer to FIG. 3). Here, what is employed as the predetermined criterion is whether or not it is a voice operation command group related to a screen (logically, a screen of the lowest layer) that has been most recently (lastly) called (until a voice for voice operation is vocalized) among at least one operation screen that is currently (in detail, at the time of vocalizing the voice for voice operation) displayed. Specifically, the voice operation command group 630 related to the screen 230 that has been most recently called (most recently displayed) between the two operation screens 210 and 230 that are currently displayed is determined as the first command group M1. In other words, the first priority order is given to the voice operation command group 630 (the first command group M1), and search processing for the first command group M1 (630) to which the first priority order has been given is first executed. It should be noted that the operation screen 230 is a screen that is displayed most frontward between the two operation screens, and is also designated as a screen displayed as the highest layer. In addition, since the operation screen 230 is a screen corresponding to the voice operation command group 630 to which the first priority order has been given, the operation screen 230 is also designated as a first priority screen.

Subsequently, in a case where one voice operation command that agrees with the search target character string (voice recognition data) has been detected by the first search processing, processing corresponding to the one voice operation command (search target character string) is executed.

For example, in a case where one voice operation command "JIDO (automatic)" that agrees with the search target character string "JIDO (automatic)" is detected by the first search processing in which a search range (also referred to as "first search range") is the voice operation command group 630, processing corresponding to the one voice operation command "JIDO (automatic)" is executed. Specifically, setting processing of setting a copy magnification ratio at "automatic" (processing corresponding to operation of pressing the button 231 in the magnification ratio setting screen 230) is executed.

Alternatively, in a case where one voice operation command "GOJYU PASENTO (50%)" that agrees with the search target character string "GOJYU PASENTO (50%)" has been detected by the first search processing, processing corresponding to the one voice operation command "GOJYU PASENTO (50%)" is executed. Specifically, setting processing of setting a copy magnification ratio at "50%" (processing corresponding to operation of pressing the button 241 in the magnification ratio setting screen 230) is executed.

Meanwhile, in a case where one voice operation command that agrees with the search target character string (voice recognition data) has not been detected by the first search processing, the voice operation command group 610 other than the first command group M1 between the plurality of voice operation command groups 610 and 630 is determined as the second command group M2, and second search processing in which a search range (also referred to as "second search range") is the second command group M2 is executed. In other words, the second priority order is given to the voice operation command group 610 (the second command group M2), and search processing for the second command group M2 (610) to which the second priority order has been given is executed. Incidentally, since the operation screen 210 is a screen corresponding to the voice operation command group 610 to which the second priority order has been given, the operation screen 210 is also designated as a second priority screen.

For example, in a case where one voice operation command "GENKO GASHITSU (original-document image quality)" that agrees with the search target character string "GENKO GASHITSU (original-document image quality)" is detected by the second search processing in which a search range is the voice operation command group 610, processing corresponding to the one voice operation command "GENKO GASHITSU (original-document image quality)" is executed. Specifically, processing corresponding to operation of pressing the button 211 in the basic menu screen 210 is executed. More specifically, processing of displaying a detail setting screen 220 (not illustrated) related to the original-document image quality so as to be superimposed on the basic menu screen 210 is executed.

As described above, such operation enables even a voice operation command (for example, "GENKO GASHITSU (original-document image quality)") that agrees with any of voice operation commands of the voice operation command group 610 related to the operation screen (the operation screen serving as a caller) 210 other than the operation screen 230 that has been most recently called to be searched for. Therefore, one voice operation command corresponding to a user's voice for operation can be properly detected from among the plurality of voice operation commands related to the plurality of operation screens.

In addition, since the search processing related to the two operation screens 210 and 230 is performed in two stages, efficient search processing can be performed. In detail, the first search processing in which a search range is the voice operation command group 630 related to the operation screen 230 that has been most recently called is first performed, and in a case where the first search processing does not succeed, the second search processing in which a search range is the voice operation command group 610 related to the other screen 210 is performed. Consequently, search processing in which a search range is the voice operation command group 630 having a higher possibility of being vocalized as a voice for operation, between the two voice operation command groups 610 and 630, is performed earlier, and subsequently, search processing in which a search range is the other voice operation command group 610 is performed. Therefore, efficient search processing can be performed.

In addition, according to the operation of the first embodiment, the following advantages can also be obtained Here, as a technology in which any of a large number of voice operation commands corresponding to all operation keys displayed on the touch panel 45 can be detected in a display state such as that shown in FIG. 6, the following technology (also referred to as "technology related to comparative example") can be considered.

For example, a technique in which a user's voice recognition result is searched for all at once (without distinction of search range) from both of the voice operation command group 610 that is registered by being associated with the basic menu screen 210 and the voice operation command group 630 that is registered by being associated with the magnification ratio setting screen 230 can be used.

However, in a case where the technique is used, when voice operation commands each having the same pronunciation exist respectively in two voice operation command groups related to two respective operation screens, the following problem may arise. Specifically, although both layer screens (two operation screens) 210 and 230 are treated as search ranges, search processing related to both of the layer screens 210 and 230 are executed all at once. Therefore, there is a case where the voice operation command may be recognized as a voice command related to unintended one of the layer screens. In other words, the priority orders of the plurality of voice operation commands included in the two operation screens 210 and 230 cannot be specified, and consequently a search result that differs from user's intention may be obtained.

In detail, between the voice operation command "JIDO (automatic)" that is associated with the "paper" button 214 in the basic menu screen 210 (FIG. 5) and the voice operation command "JIDO (automatic)" that is associated with the automatic button 231 in the magnification ratio setting screen 230 (FIG. 6), one voice operation command (for example, former) that does not agree with user's intention may be first detected, with the result that processing corresponding to the one voice operation command is executed. For example, although the user's intention is that an instruction equivalent to an instruction given by pressing the button 231 in the current layer screen (magnification ratio setting screen) 230 is desired to be given, there is a case where the voice operation command may be misrecognized as an instruction given by pressing the button 214 in the layer screen (basic menu screen) 210 serving as a caller that has called the current layer screen.

In this manner, in a case where voice operation commands each having the same pronunciation exist respectively in two voice operation command groups related to two respective operation screens, there may arise a problem that a voice operation command related to a screen that differs from user's intention is detected by mistake.

In contrast, in the first embodiment, as described above, the operation of searching for a user's voice recognition result not all at once but in two stages is executed.

Specifically, the priority order is given, on a command group basis, to the plurality of voice operation commands that include the first command group M1 (630) and the second command group M2 (610), and search processing in which a search range is each command group is executed according to the priority order given to the corresponding command group. Specifically, search processing (first search processing) of the first order is first executed, and in a case where one voice operation command that agrees with a search target character string has not been detected by the first search processing, search processing (second search processing) of the second order is executed. In particular, the search processing of the first order is executed within a search range of the voice operation command group 630 related to the screen displayed as the highest layer.

Consequently, in a case where voice operation commands each having the same pronunciation are included, respectively, in the search range (the first search range) in the first search processing and the search range (the second search range) in the second search processing, the detection result in the first search processing is employed by priority. In particular, the search processing of the first order is executed within a search range of the command group 630 related to the screen of the logically lowest layer (the screen displayed as the highest layer) 230.

In addition, in general, a user often performs voice operation related to an operation screen (here, the screen 230) that is currently displayed, and that has been most recently called. Therefore, if search processing is executed with the first priority order given to the voice operation command group 630 related to the operation screen 230, there is a high possibility that a voice operation command that agrees with user's intention will be detected. In its turn, it is possible to properly execute voice operation that agrees with user's intention.

Thus, even in a case where voice operation commands each having the same pronunciation exist respectively in two voice operation command groups related to two respective operation screens, it is possible to avoid or suppress misdetection of a voice operation command related to a screen that differs from user's intention (a screen displayed as a non-highest layer (a screen displayed as a lower layer)).

1-4. Detailed Operation

Such operation will be described in detail below with reference to FIG. 4. FIG. 4 is a flowchart illustrating operation of the MFP 10.

When display contents on the touch panel 45 change during a standby state in a standby loop from step S11 to step S21, the process proceeds from step S11 to step S12.

For example, in a case where a display state of FIG. 5 changes to a display state of FIG. 6 according to, for example, pressing of the magnification-ratio setting button 215 (FIG. 5), the MFP 10 obtains not only the command group 610 (voice operation command group related to the basic menu screen 210) that has already been obtained until the change, but also another command group 630 (voice operation command group related to the magnification ratio setting screen 230) (step S12). Consequently, a command group 600 (601) that includes both of the voice operation command groups 610 and 630 is formed (refer to FIGS. 8 and 9). It should be noted that as shown in FIGS. 8 and 9, in a data table that prescribes the voice operation command group 601, "copy basic" is given to operation keys included in the basic menu screen 210 as a field value of a field "screen" (FIG. 8), and "copy magnification ratio" is given to operation keys included in the magnification ratio setting screen 230 as a field value of the field "screen" (FIG. 9). It should be noted that each of the command groups 600, 610, and 630 is a complex composed of, for example, text data (voice operation commands) related to voice operation.

Subsequently, as shown in FIG. 6, when user's voice input is accepted in a state in which the two operation screens 210 and 230 are displayed on the touch panel 45, the process proceeds from step S21 to step S22.

In step S22, the voice recognition processing part 14 of the MFP 10 executes voice recognition processing related to the user's voice input. In addition, the obtaining part 15 of the MFP 10 obtains voice recognition data (text data), which is a processing result of the voice recognition processing, from the voice recognition processing part 14. Here, a voice recognition result related to a user's voice (accepted voice input) that has been vocalized in a state in which the two operation screens 210 and 230 are both displayed on the touch panel 45 is obtained. Moreover, the MFP 10 (determination part 16) determines a search target character string on the basis of voice recognition data. For example, a character string "GENKO GASHITSU (original-document image quality)" of the voice recognition data is determined as a search target character string without any change. Alternatively, "GENKO GASHITSU (original-document image quality)" may be determined as a search target character string by excluding "ETO" (character string registered beforehand as a word having no meaning) from a character string "ETO, GENKO GASHITSU (well, original-document image quality)" of the voice recognition data.

Next, in step S23, the first command group M1, which is a search range of i-th search processing (here i=1) (the first search range), is determined. Specifically, the first command group M1 is obtained on the basis of the command dictionary. Subsequently, a first text dictionary (text dictionary formed by extracting a part of command group (M1) from the command dictionary) is generated, and the first search range is set. Here, the voice operation command group 630 related to the magnification ratio setting screen 230 is determined (set) as the first command group M1 (the first search range).

More specifically, in the voice operation command group 600 (refer to FIGS. 8 and 9), data records (data records corresponding to the magnification ratio setting screen 230), each of which prescribes "copy magnification ratio" as a field value of the field "screen", are extracted (by being narrowed down) from among a plurality of data records (data group in which data of each row is one unit (data record)). Consequently, the voice operation command group 630 of FIG. 9 is extracted as the first command group M1.

Subsequently, the first search processing of searching for a search target character string from the first search range is executed (step S24).

In step S25, a determination is made as to whether or not one voice operation command that agrees with the search target character string has been detected in the first search processing.

In a case where it is determined that one voice operation command that agrees with the search target character string has been detected in the first search processing, the process proceeds to step S30. In step S30, processing corresponding to the one voice operation command is executed.

Meanwhile, in a case where it is determined that one voice operation command that agrees with the search target character string has not been detected in the first search processing, the process proceeds from step S25 to step S26.

In step S26, whether or not further search processing should be executed is determined. For example, on the basis of a state in which the screen 210 that is different from the magnification ratio setting screen 230 corresponding to the first command group M1 is also displayed in the touch panel 45, it is determined that further search processing should be executed. In other words, in a case where the total number of screens of the search target N=2, on the basis of a state in which the value i does not reach the value N, it is determined that further search processing should be executed. Subsequently, the value i is incremented, and the process returns to step S23.

Further, in step S23, the second command group M2, which is a search range of i-th search processing (i=2) (the second search range), is determined. Specifically, the second command group M2 is obtained on the basis of the command dictionary. Subsequently, a second text dictionary (text dictionary formed by extracting a part of command group (M2) from the command dictionary) is generated, and the second search range is set. Here, the voice operation command group 610 related to the basic menu screen 210 is determined (set) as the second command group M2 (the second search range).

More specifically, in the voice operation command group 600 (refer to FIGS. 8 and 9), data records (data records corresponding to the basic menu screen 210), each of which prescribes "copy basic" as a field value of the field "screen", are extracted (by being narrowed down) from among the plurality of data records. Consequently, the voice operation command group 610 of FIG. 8 is extracted as the second command group M2. Alternatively, a remaining command group obtained by excluding the voice operation command group 630 from the voice operation command group 600 may be extracted as the second command group M2.

Subsequently, the second search processing of searching for a search target character string from the second search range is executed (step S24).

In the next step S25, a determination is made as to whether or not one voice operation command that agrees with the search target character string has been detected in the second search processing.

In a case where it is determined that one voice operation command that agrees with the search target character string has been detected in the second search processing, the process proceeds to step S30. In step S30, processing corresponding to the one voice operation command is executed.

Meanwhile, in a case where it is determined that one voice operation command that agrees with the search target character string has not been detected in the second search processing, the process proceeds from step S25 to step S26.

In step S26, this time, on the basis of a state in which no further screen is displayed on the touch panel 45 (the value i has already reached the value N (=2)), it is determined that it is not necessary to execute further search processing. Subsequently, the process proceeds to step S29. In step S29, error processing (for example, processing of displaying a notification that one voice operation command corresponding to the input voice could not be searched for) is executed.

The operation according to the first embodiment is executed in this manner.

It should be noted that in the above-described embodiment, a change to the display state of FIG. 6 is made in response to the operation in which the magnification-ratio setting button 215 in the basic menu screen 210 has been pressed in the display state of FIG. 5. However, the present invention is not limited to the above. For example, a change to the display state of FIG. 6 may be made in response to the operation in which user's voice input "BAIRITSU (magnification ratio)" has been accepted in the display state of FIG. 5. In this case, voice recognition data "BAIRITSU (magnification ratio)" has only to be searched for with only the voice operation command group 610 (FIG. 8) searched as a search target.

In addition, in the above-described embodiment, two-stage (N=2) search processing is executed. However, the present invention is not limited to this. For example, search processing having a larger number of stages (three stages or more) may be performed.

1-5. Another Example Related to Two Operation Screens

<Numeric Keypad Screen>

Figure 12:
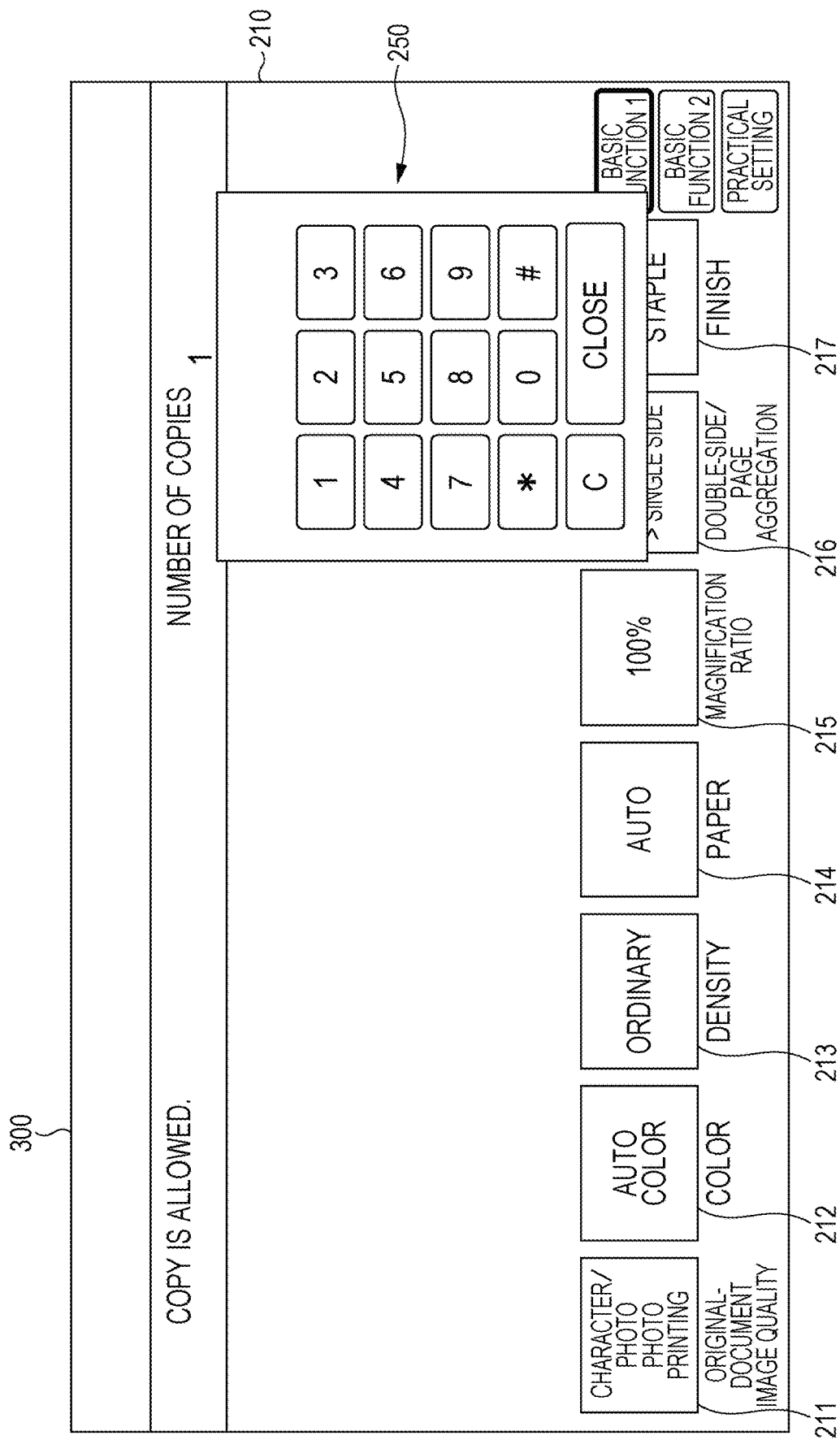
FIG. 12 is a diagram illustrating a state in which a numeric keypad screen is displayed so as to be superimposed with the basic menu screen.

In the above description, the operation after the display state of FIG. 5 has changed to the display state of FIG. 6 is mainly presented. However, the present invention is not limited to the above. The same applies to, for example, the operation after the display state of FIG. 5 has changed to the display state of FIG. 12. In FIG. 12, a numeric keypad screen 250 (sub-screen) called from the basic menu screen 210 (main screen) is displayed on the touch panel 45 together with the basic menu screen 210. In more detail, the numeric keypad screen 250 is displayed so as to be superimposed on a part of the basic menu screen 210 (the numeric keypad screen 250 is displayed on the most frontward side). Incidentally, when the numeric keypad call button 46 (hardware key) is pressed in the display state of FIG. 5 (or when voice input "TENKI (numeric keypad)" is accepted), display contents of the touch panel 45 change to contents such as those shown in FIG. 12.

In such a case as well, operation similar to the above is executed.

Specifically, when the display state of FIG. 5 has changed to the display state of FIG. 12, the MFP 10 obtains not only the command group 610 that has already been obtained until the change (the voice operation command group related to the basic menu screen 210), but also another command group 650 (the voice operation command group related to the numeric keypad screen 250) (refer to FIG. 13) (step S12). Consequently, the command group 600 (602) that includes both of the voice operation command groups 610 and 650 is formed (refer to FIG. 13). Incidentally, as shown in FIG. 13, with respect to the voice operation command group 650 corresponding to the operation keys included in the numeric keypad screen 250, "numeric keypad" is given as a field value of a field "group in screen". Meanwhile, with respect to the voice operation command group 610 corresponding to the operation keys included in the basic menu screen 210, "base screen area" is given as a field value of the field "group in screen".

Subsequently, the MFP 10 obtains voice recognition data, which is a processing result of voice recognition processing related to user's voice input, from the voice recognition processing part 14, and determines a search target character string (for example, "GO (5)") on the basis of the voice recognition data (steps S21, S22).

Next, the voice operation command group 650 related to the numeric keypad screen 250 (refer to FIGS. 13 and 14) is determined as the first command group M1, and the voice operation command group 650 is set as a search range (the first search range) (step S23).

More specifically, in the voice operation command group 602 (refer to FIG. 13), data records (data records corresponding to the numeric keypad screen 250), each of which prescribes "numeric keypad" as a field value of the field "group in screen", are extracted (by being narrowed down) from among the plurality of data records. Consequently, as shown in FIG. 14, the voice operation command group 650 is extracted as the first command group M1. In other words, the voice operation command group 650 related to the numeric keypad screen 250 is set as the first search range.

Subsequently, the first search processing of searching for a search target character string from the first search range is executed (step S24).

In a case where one voice operation command that agrees with the search target character string is detected in the first search processing, processing corresponding to the one voice operation command is executed (steps S25, S30).

Meanwhile, in a case where one voice operation command that agrees with the search target character string is not detected in the first search processing, the voice operation command group 610 related to the basic menu screen 210 (refer to FIG. 13) is determined as the second command group M2, and the voice operation command group 610 is set as a search range (the second search range) (step S23).

More specifically, in the voice operation command group 602 (refer to FIG. 13), data records (data records corresponding to the basic menu screen 210), each of which prescribes "base screen area" as a field value of the field "group in screen", are extracted (by being narrowed down) from among the plurality of data records. Consequently, the voice operation command group 610 of FIG. 13 is extracted as the second command group M2. Alternatively, a remaining command group obtained by excluding the voice operation command group 650 from the voice operation command group 602 may be extracted as the second command group M2.

Subsequently, the second search processing of searching for a search target character string from the second search range is executed (step S24). In a case where one voice operation command that agrees with the search target character string has been detected in the second search processing, processing corresponding to the one voice operation command is executed (step S30).

In this manner, the first priority order is given to the first command group M1 (650), and the second priority order is given to the second command group M2 (610), and subsequently, search processing in which a search range is each command group may be executed according to the priority order given to the corresponding command group.

<Pull-Down>

Figure 15:
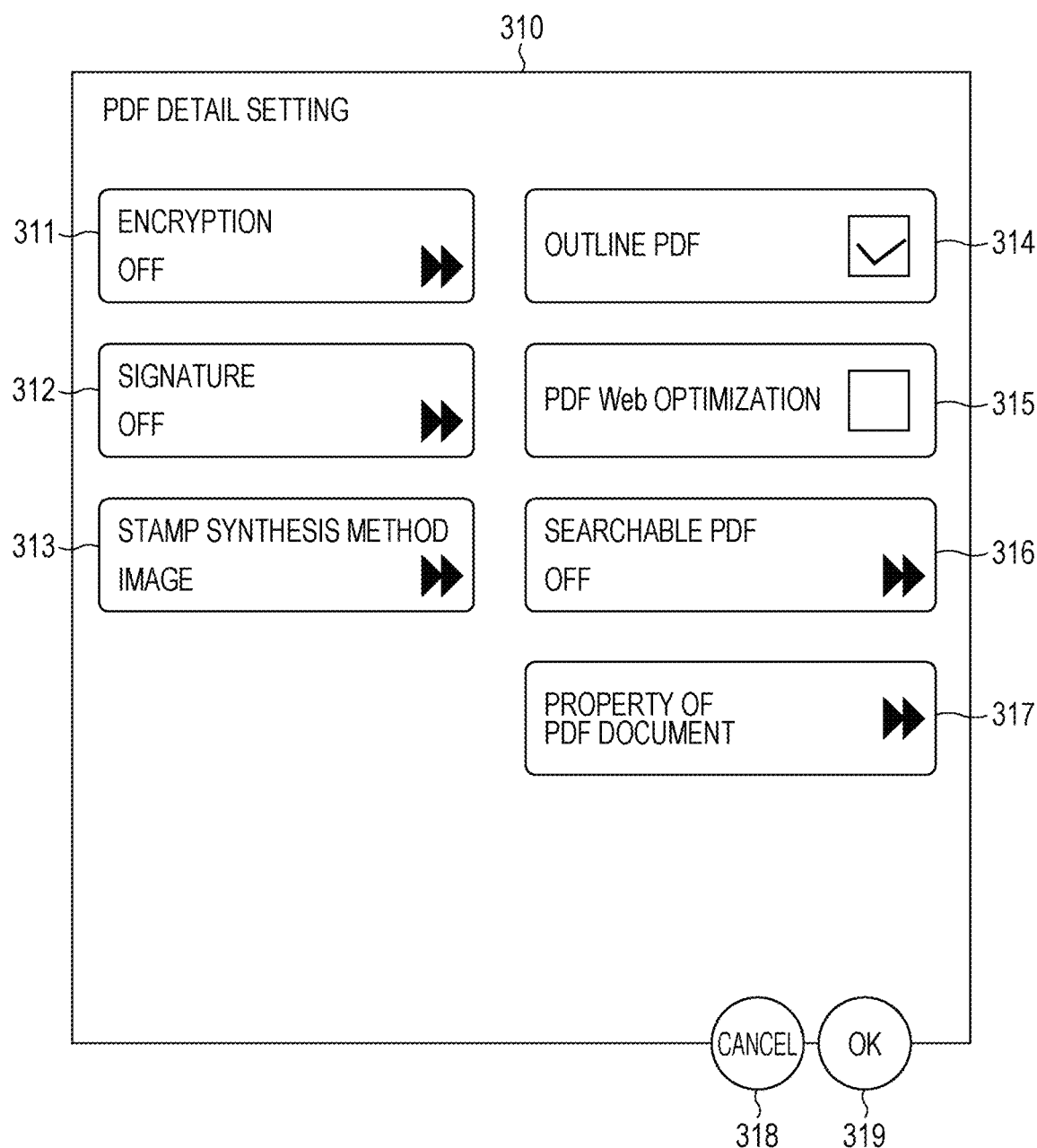
FIG. 15 is a diagram illustrating a file-format detail setting screen related to a scan job.
Figure 16:
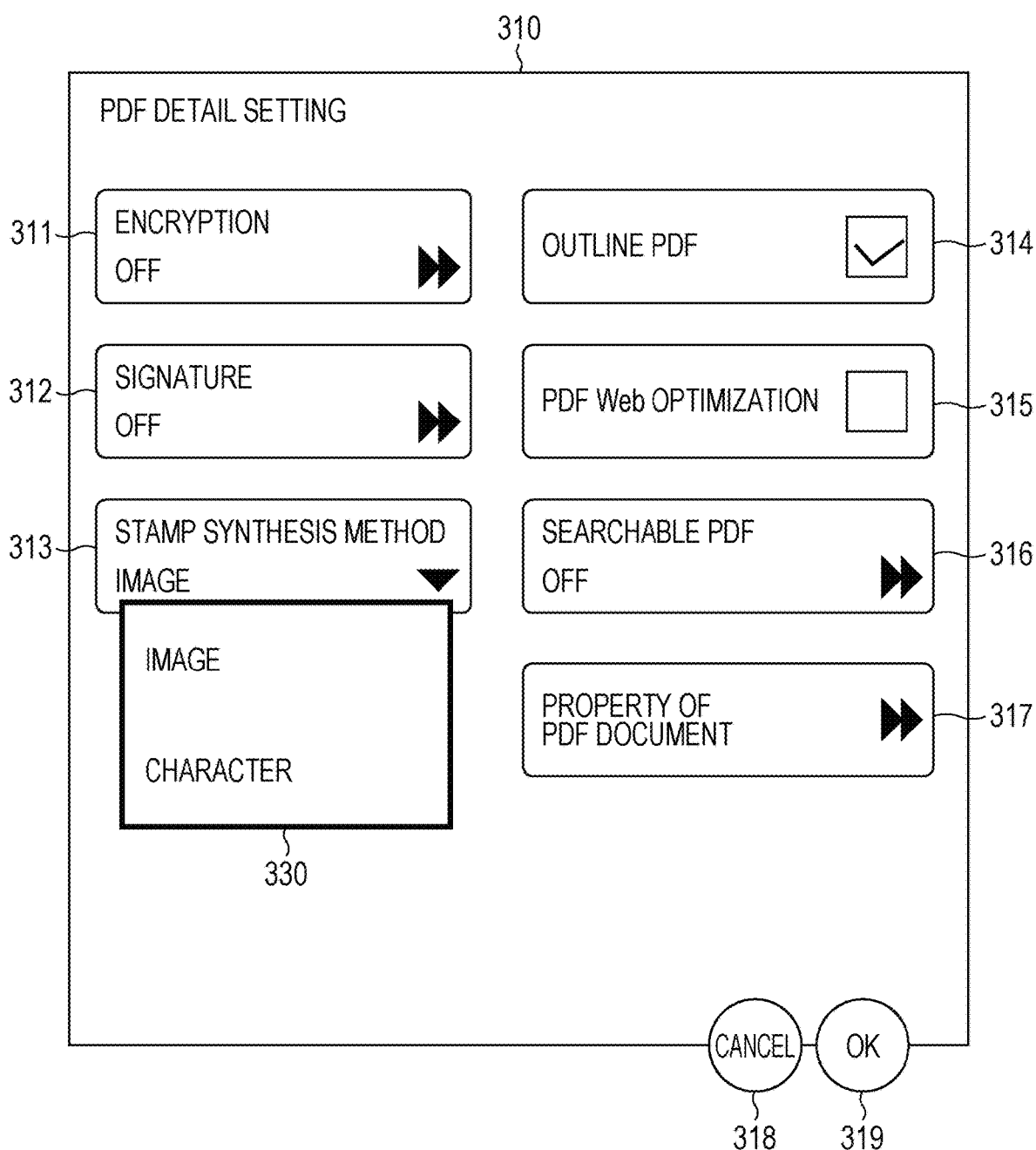
FIG. 16 is a diagram illustrating a state in which a pull-down list is further displayed.

In addition, the same applies to the operation after the display state of FIG. 15 has changed to the display state of FIG. 16. FIG. 15 illustrates a detail setting screen 310 of a file format (PDF format) related to a scan job. As shown in FIG. 15, a plurality of software keys (buttons) 311 to 319 are displayed on the detail setting screen 310. In addition, FIG. 16 illustrates a state in which a "stamp synthesis method" pull-down list (also referred to as "pull-down list screen") 330 is displayed in response to pressing of a "stamp synthesis method" button 313 in the detail setting screen 310 (FIG. 15). The pull-down list 330 displays two options ("image" and "character"). Either of the two options can be set.

In such a case as well, operation similar to the above is executed.

Specifically, when the display state of FIG. 15 has changed to the display state of FIG. 16, the MFP 10 obtains not only a command group 710 that has already been obtained until the change (the voice operation command group related to the detail setting screen 310), but also another command group 730 (the voice operation command group related to the pull-down list 330) (refer to FIG. 17) (step S12). Consequently, the command group 700 (701) that includes both of the voice operation command groups 710 and 730 is formed (refer to FIG. 17).

Incidentally, as shown in FIG. 17, with respect to the voice operation command group 710 corresponding to operation keys included in the detail setting screen 310, "base screen area" is given as a field value of the field "group in screen". Meanwhile, with respect to the voice operation command group 730 corresponding to operation keys included in the pull-down list 330, "pull-down area (stamp synthesis)" is given as a field value of the field "group in screen". In addition, with respect to both of the voice operation command groups 710 and 730, "PDF detail setting" is given as a field value of the field "screen".

Subsequently, the MFP 10 obtains voice recognition data, which is a processing result of voice recognition processing related to user's voice input, from the voice recognition processing part 14, and determines a search target character string (for example, "MOJI (character)") on the basis of the voice recognition data (steps S21, S22).

Next, the voice operation command group 730 related to the pull-down list 330 (also refer to FIG. 18) is determined as the first command group M1, and the voice operation command group 730 is set as a search range (the first search range) (step S23).

Figure 18:
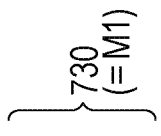
FIG. 18 is a diagram illustrating a voice operation command group related to the pull-down list screen.

More specifically, in the voice operation command group 701 (refer to FIG. 17), data records (data records corresponding to the pull-down list screen 330), each of which prescribes "pull-down area (stamp synthesis)" as a field value of the field "group in screen", are extracted (by being narrowed down) from among the plurality of data records. Consequently, as shown in FIG. 18, the voice operation command group 730 is extracted as the first command group M1. In other words, the voice operation command group 730 related to the pull-down list screen 330 is set as the first search range.

Subsequently, the first search processing of searching for a search target character string from the first search range is executed (step S24).

In a case where one voice operation command that agrees with the search target character string is detected in the first search processing, processing corresponding to the one voice operation command is executed (steps S25, S30).

Meanwhile, in a case where one voice operation command that agrees with the search target character string is not detected in the first search processing (the MFP 10 cannot detect the one voice operation command), the voice operation command group 710 related to the detail setting screen 310 (refer to FIG. 17) is determined as the second command group M2, and the second command group M2 is set as a search range (the second search range) (step S23).

More specifically, in the voice operation command group 701 (refer to FIG. 17), data records (data records corresponding to the detail setting screen 310), each of which prescribes "pull-down area (stamp synthesis)" as a field value of the field "group in screen", are extracted (by being narrowed down) from among the plurality of data records (data group of each row). Alternatively, a remaining command group obtained by excluding the voice operation command group 730 from the voice operation command group 701 may be extracted as the second command group M2. Consequently, as shown in FIG. 17, the voice operation command group 710 is extracted as the second command group M2. In other words, the voice operation command group 730 related to the detail setting screen 310 is set as the second search range.

Subsequently, the second search processing of searching for a search target character string from the second search range is executed (step S24). In a case where one voice operation command that agrees with the search target character string has been detected in the second search processing, processing corresponding to the one voice operation command is executed.

In this manner, the first priority order is given to the first command group M1 (730), and the second priority order is given to the second command group M2 (710), and subsequently, search processing in which a search range is each command group may be executed according to the priority order given to the corresponding command group.

Incidentally, here, a mode in which the voice operation is performed only for the screens of the two layers (two screens), the screen on the most frontward side (the pull-down list 330) and the screen 310 serving as a caller that has called the screen (the pull-down list 330), is presented. However, the present invention is not limited to this. The voice operation may be performed for screens of three or more layers. In this case, priority orders are given, respectively, to voice operation command groups corresponding to the respective screens of three or more layers, and search processing in which a search range is each command group has only to be executed according to the priority order given to the corresponding command group. For example, the first priority order is given to the first command group M1 (730), and the second priority order is given to the second command group M2 (710), in a manner similar to the above. Further, the third priority order has only to be given to the voice operation command group (not illustrated) corresponding to a screen 305 (not illustrated) serving as a caller that has called the detail setting screen 310. In addition, search processing in which a search range is each command group has only to be executed according to the priority order given to the corresponding command group. It should be noted that in FIGS. 15 and 16, illustration of the screen 305 serving as a caller that has called the detail setting screen 310 is omitted.

1-6. Modified Example 1 (Commands are Partially Excluded from a Search Range)

In addition, in the above description, the first search processing is performed by using, as a search target, the voice operation command group (M1) related to a screen displayed on the most frontward side (upper side) (also referred to as "screen area"), and subsequently, the second search processing is performed by using, as a search target, the whole voice operation command group (M2) related to a caller's screen area, the caller having called the screen area displayed on the most frontward side. However, the present invention is not limited to the above. The second search processing may be performed by using, as a search target, a voice operation command group obtained by partially excluding voice operation commands from the voice operation command group M2.

For example, in FIG. 12, some software keys 216 and 217 among the plurality of software keys 211 to 217 in the basic menu screen 210 are covered by the numeric keypad screen 250 (in detail, a part of the numeric keypad screen 250) (hidden by the numeric keypad screen 250). In other words, both of the two operation screens 210 and 250 are displayed on the touch panel 45, and at least a part of the basic menu screen 210 is in a state of being hidden by the numeric keypad screen 250.

In a case where search processing of a voice recognition result related to user's voice (accepted voice input) vocalized in such a state is executed, some voice operation commands corresponding to the some software keys 216 and 217 (for example, "RYOMEN/PEJI SYUYAKU (double-sided/page aggregation)", "SHIAGARI (finish)", "KATAMEN KATAMEN (single-sided single-sided)", "SUTEPURU SHINAI (not staple)") (refer to FIGS. 8 and 13) may be excluded from the voice operation command group M2. In addition, the second search processing may be performed by using, as a search target, a voice operation command group obtained by excluding the some voice operation commands In other words, search processing related to the second command group M2 may be executed in a state in which commands corresponding to operation keys (display elements) hidden by at least a part of the numeric keypad screen 250 are excluded from the second command group M2.

Here, it is considered that a possibility that voice operation related to a button hidden by another screen (in other words, a button that is not seen by a user) will be performed is lower than a certain level. Therefore, excluding a voice operation command corresponding to such a button (key) from a search range enables to reduce unnecessary search, and consequently search efficiency can be enhanced.

However, in consideration of even a possibility that a user who wants to perform voice operation related to a button hidden by another screen may exist, it is preferable to be capable of changing setting of "whether or not to exclude a voice operation command corresponding to a hidden button (key) from a search range (the second search range)" (in particular, on a user basis). In other words, it is preferable to be capable of changing setting of "whether or not to exclude a command corresponding to a display element hidden by the second screen from the second command group corresponding to the first screen when search processing related to the second command group is executed". Specifically, setting has only to be changed according to user's setting operation using a predetermined setting screen (not illustrated). In addition, search processing related to the second command group M2 has only to be executed on the basis of setting contents pertaining to the setting change. Specifically, in a case where "to exclude" is set, search processing related to the second command group M2 has only to be executed in a state in which the command corresponding to the display element hidden by the second screen is excluded. In contrast, in a case where "not to exclude" is set, search processing related to the second command group M2 has only to be executed in a state in which the command corresponding to the display element hidden by the second screen is included.

1-7. Modified Example 2 (Warning is Being Displayed)

In addition, in the above description, when the first search processing ends, the second search processing is immediately executed. However, the present invention is not limited to this. Even when the first search processing ends, in a case where a predetermined condition (for example, "warning screen is being displayed", and the like) is fulfilled, the execution of the second search processing may be adapted to be exceptionally held (not executed).

Figure 19:
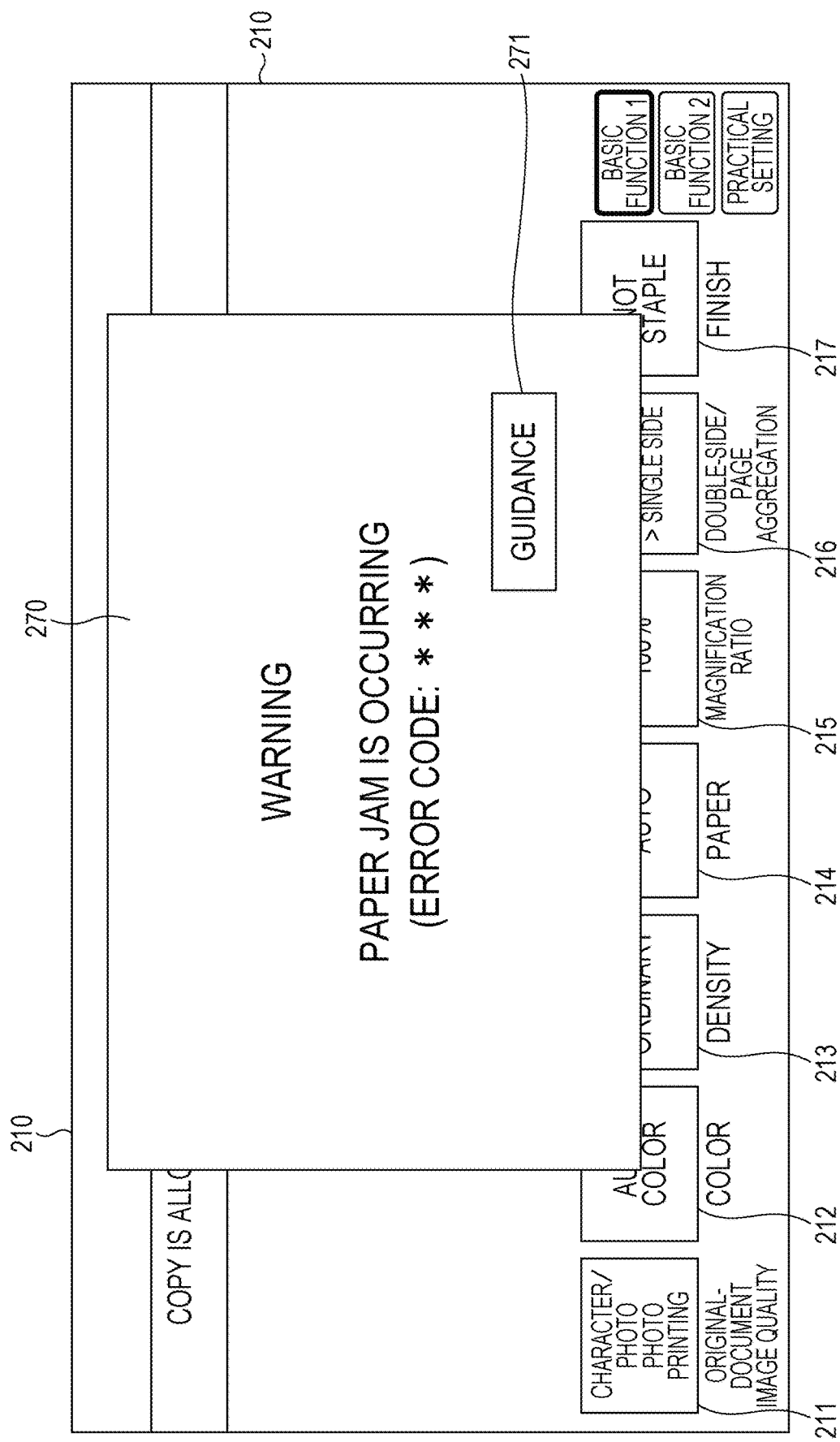
FIG. 19 is a diagram illustrating a state in which a warning screen is displayed so as to be superimposed on the basic menu screen.

For example, as shown in FIG. 19, in a case where a warning screen (a screen that notifies of a warning) 270 is displayed so as to be superimposed on the basic menu screen 210, the second search processing may be prevented from being executed. In a case where a warning is being displayed, it is preferable to give the highest priority to eliminating a cause of the warning, and therefore it is preferable not to accept other operation (operation that does not relate to eliminating the cause of the warning). In consideration of such circumstances, the second search processing may be adapted to be held.

Specifically, in the display state of FIG. 19, the voice operation command group 670 corresponding to the warning screen 270 (here, only "GAIDANSU (guidance)") (FIG. 20) is determined as the first command group M1, and the first search processing is executed. Subsequently, the second search processing may be prevented from being executed until an abnormal state as the cause of the warning is eliminated In other words, even when a search target character string is not detected by the first search processing in which a search range is the voice operation command group 670 (the first command group M1) related to the warning screen 270, the second search processing in which a search range is the second command group M2 (the voice operation command 610 related to the basic menu screen 210) may be prevented from being executed at least until the warning is canceled.

1-8. Modified Example 3 (The Text Dictionary Generation Timing)

Figure 46:
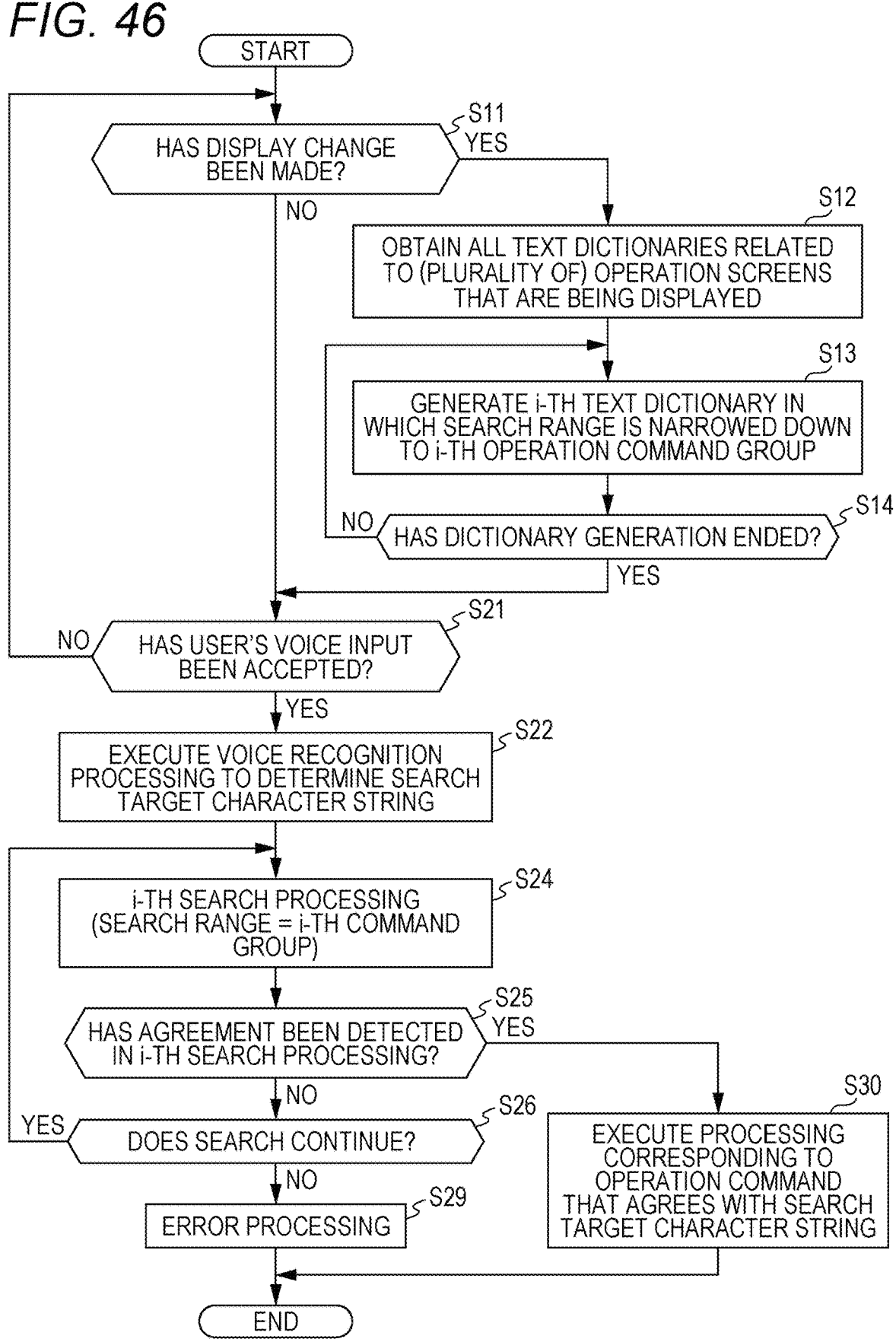
FIG. 46 is a flowchart illustrating operation according to a modified example.

In addition, in the above description, as shown in the flowchart of FIG. 4, the generation processing of generating the i-th text dictionary (step S23) is executed immediately before the i-th search processing (step S24). However, the present invention is not limited to this. For example, as shown in FIG. 46, the generation processing of generating the i-th text dictionary, or the like, may be executed immediately after step S12 (steps S13, S14). FIG. 46 shows that the generation processing of generating the i-th text dictionary is executed in step S13, and when it is not determined, in step S14, that the generation processing of generating the text dictionary should be ended, a value i is incremented, and the process then returns to step S13. By repeating such operation, a plurality of text dictionaries (for example, a first text dictionary and a second text dictionary) may be generated before the search processing is started (step S24) (in more detail, immediately after the display change (immediately after step S11)).

2. Second Embodiment

In the first embodiment described above, in a state in which a plurality of operation screens (for example, two operation screens) are concurrently displayed on the touch panel 45, a voice for operation is vocalized, and voice input is accepted. Subsequently, a plurality of voice operation commands related to the plurality of operation screens is successively set as search targets, and search processing is executed in a plurality of stages. In detail, among the plurality of operation screens that are concurrently displayed on the touch panel 45, a voice operation command group related to a screen that has been most recently called (also referred to as "most recently called screen") is set as the first search target, and the first search processing is first executed. Next, a voice operation command group related to a screen serving as a caller that has called the most recently called screen is set as the second search target, and the second search processing is executed.

In the second embodiment, in a case where the operation screen displayed on the touch panel 45 is switched from one screen (the first screen) to the other screen (the second screen) (in a case where the other screen is displayed on the touch panel 45 "as an alternative to" the one screen), in a state after display switching, a voice for operation is vocalized, and voice input is accepted. In other words, a voice for operation is vocalized in a state in which between the two operation screens successively displayed, the one screen (screen before switching) is not displayed, and the other screen (screen after switching) is displayed. Subsequently, two voice operation command groups related to these two screens are successively set as search targets, and search processing is successively executed in two stages. In other words, among a plurality of operation screens that are displayed on the touch panel 45 by being switched, a voice operation command group related to the other screen (the screen that has been most recently called) is set as the first search target, and the first search processing is first executed. Next, a voice operation command group related to the screen (the one screen) serving as a caller that has called the other screen is set as the second search target, and the second search processing is executed. In the second embodiment, such a mode will be described focusing on points of difference from the first embodiment.

Here, a mode in which an operation screen related to copy setting is displayed in a "map-type display mode" (refer to FIGS. 22 and 23) will be described.

In the "map-type display mode", a plurality of operation screens having respective display ranges that differ from one another are displayed. In the "map-type display mode", among function buttons, the number of which is 24 in total, including seven function buttons 521 to 527 (not illustrated) related to copy basic setting, and 17 function buttons 531 to 547 (refer to FIGS. 22 and 23) related to copy practical setting, eight (or nine) function buttons are displayed on the touch panel 45 at each point of time. It should be noted that 24 function buttons are classified into five function groups ("basic setting", "original document", "layout", "tailoring", "image quality/density"), and are arranged on a function group basis.

Figure 22:
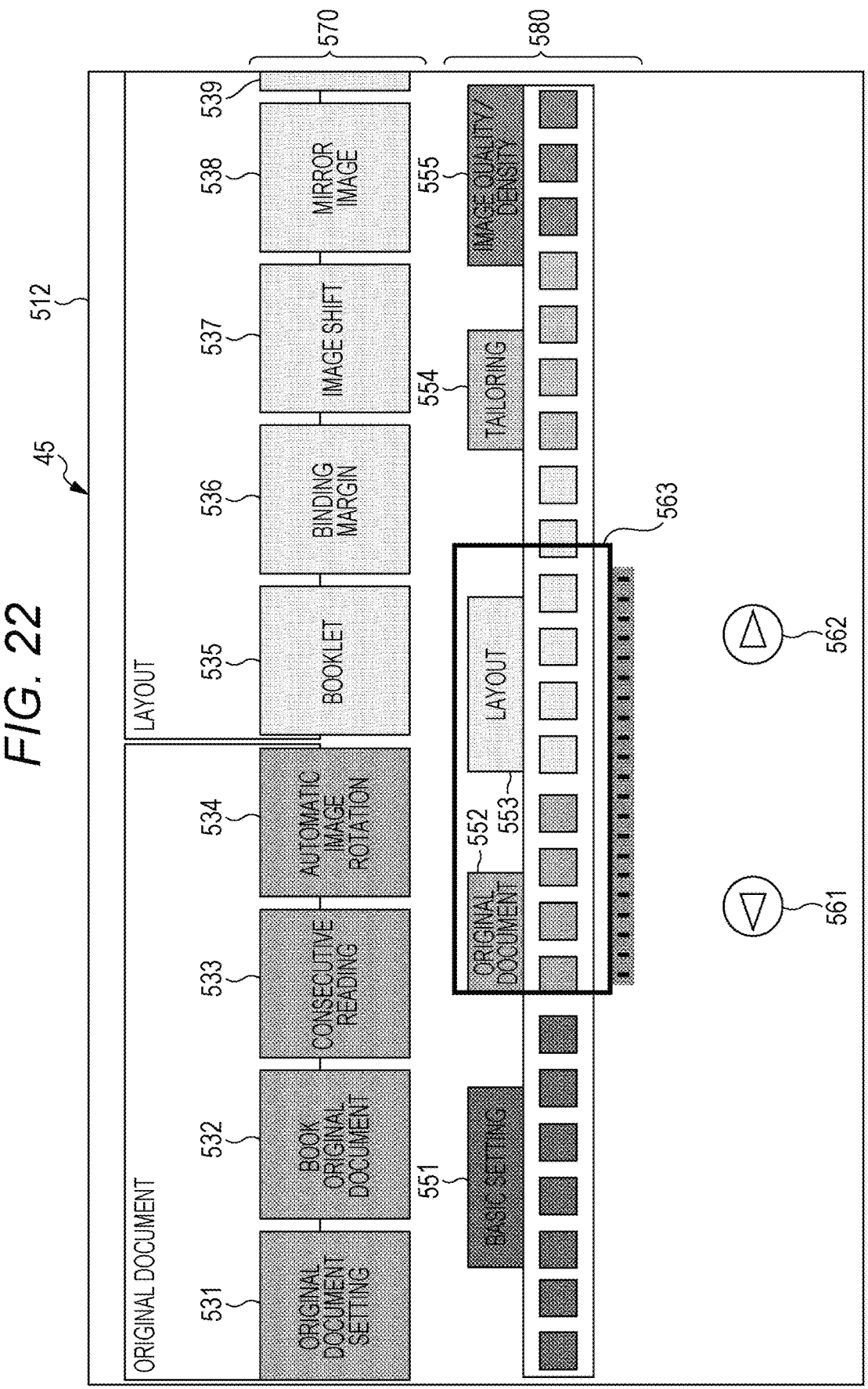
FIG. 22 is a diagram illustrating an operation screen (copy setting) in a map-type display mode.

For example, in an operation screen 512 at a certain point of time (for example, an initial state), eight function buttons 531 to 538 are displayed on the touch panel 45 as shown in FIG. 22. In more detail, four function buttons 531 to 534 belonging to the "original document" group, and four function buttons 535 to 538 belonging to the "layout" group are displayed.

Figure 23:
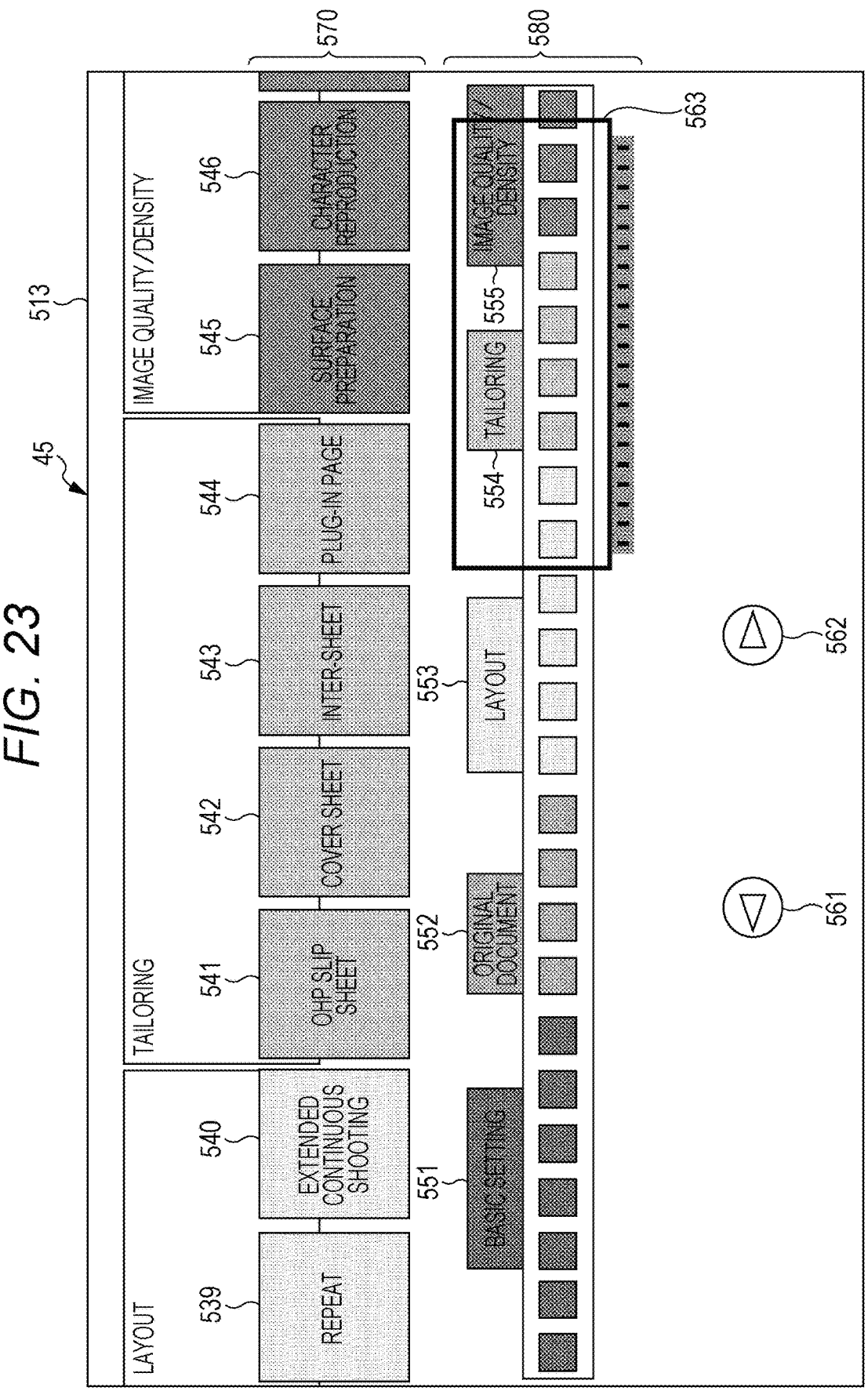
FIG. 23 is a diagram illustrating an operation screen after scrolling in the map-type display mode.

After that, when a rightward scroll button 562 is pressed, the operation screen 512 of the FIG. 22 changes to an operation screen 513 of FIG. 23. In the operation screen (setting screen) 513 of FIG. 23, different eight function buttons 539 to 546 are displayed on the touch panel 45 as an alternative to the eight function buttons 531 to 538. Two function buttons 539 and 540 belonging to the "layout" group, four function buttons 541 to 544 belonging to the "tailoring" group, and two function buttons 545 and 546 belonging to the "image quality/density" group are displayed.

Incidentally, 24 icons are arranged in a line in the horizontal direction in an icon display area 580 in the middle of the screen. The 24 icons (icon column) are icons corresponding to the 24 function buttons described above. Function buttons that are currently displayed in the function button display area 570 in the upper part of the screen are indicated by a relative position of a frame 563 with respect to this icon column Specifically, among the 24 icons, icons corresponding to function buttons that are currently displayed in the function button display area 580 in the upper part of the screen are indicated by being surrounded by the frame 563 having a rectangular shape.

In the second embodiment, when the operation screen 512 of FIG. 22 changes to the operation screen 513 of FIG. 23, a voice operation command group 830 (refer to FIG. 25) corresponding to the function buttons 539 to 546 that are currently displayed is determined as the first command group M1 (the first search range). In addition, a voice operation command group 820 (refer to FIG. 24) corresponding to the function buttons 531 to 548 that are display immediately before the change is determined as the second command group M2 (the second search range). Subsequently, two-stage search processing similar to that of the first embodiment is executed.

Figure 21:
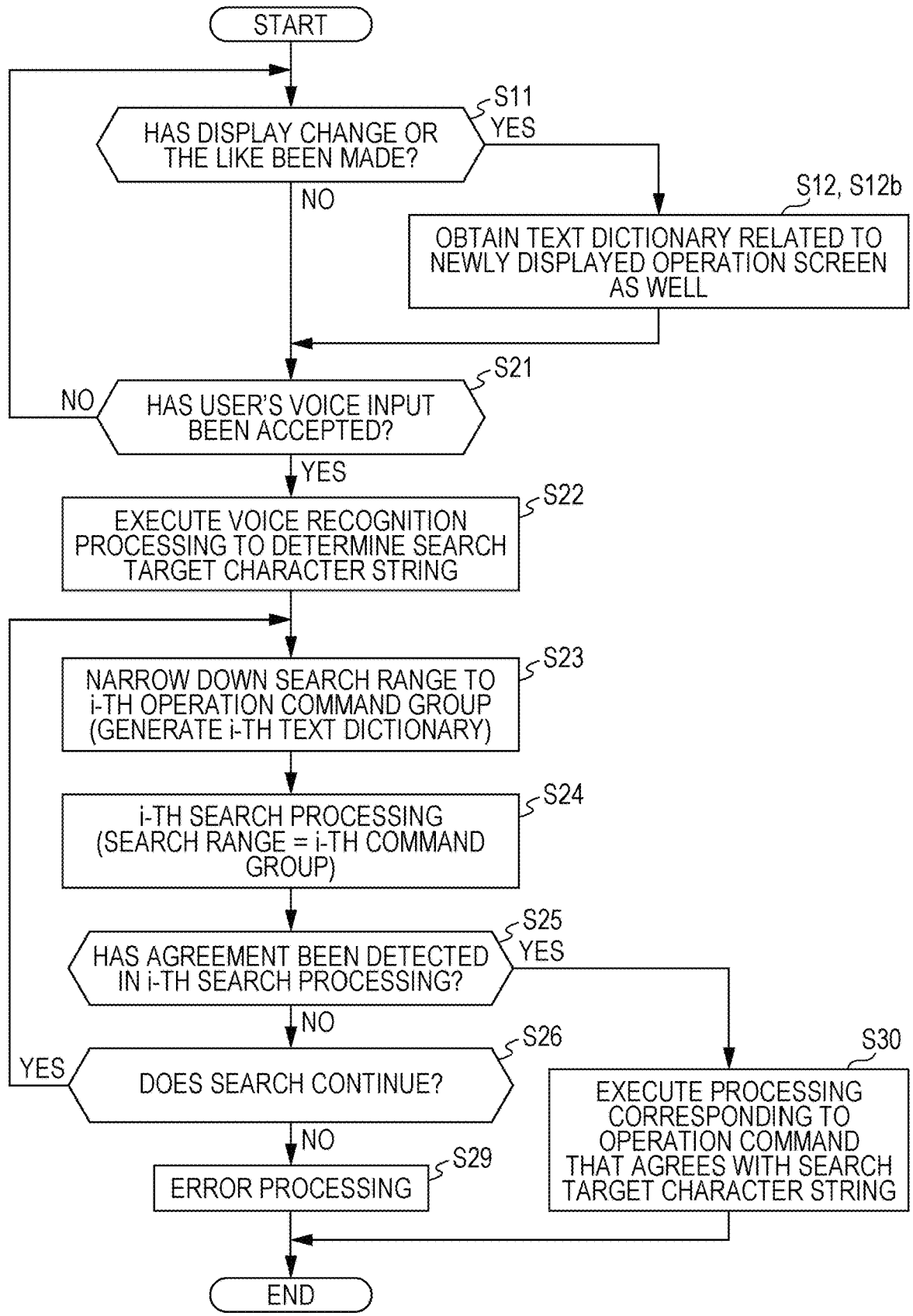
FIG. 21 is a flowchart illustrating operation according to a second embodiment.

FIG. 21 is a flowchart illustrating operation according to the second embodiment. As understood from a comparison between FIG. 21 and FIG. 4, the operation in step S12 mainly differs. The operation will be described below focusing on points of difference.

For example, in a case where the operation screen 512 of FIG. 22 changes to the operation screen 513 of FIG. 23, in step S12 (S12b) according to the second embodiment, not only the command group 820 that has already been obtained until the change (the voice operation command group related to the operation screen 512), but also another command group 830 (the voice operation command group related to the operation screen 513) is obtained (refer to FIGS. 24 and 25). Consequently, the command group 800 (801) that includes both of the voice operation command groups 820 and 830 is formed. Incidentally, as shown in FIG. 24 or the like, with respect to the voice operation command groups 820 and 830 corresponding to operation keys included in the operation screens 512 and 513, an existing position (X-coordinate range in the virtual whole screen over the whole scroll range in the map-type display mode) of each operation key is prescribed as a field value of a field "X-coordinate range". In addition, with respect to both of the voice operation command groups 820 and 830 as well, "copy map display" is given as a field value of the field "screen" of each data record (illustration is omitted in FIGS. 24 and 25).

After that, the voice operation command group 830 related to the operation screen 513 is determined as the first command group M1 (step S23), and search processing (the first search processing) in which a search range is the first command group M1 is executed (step S24).

More specifically, in the voice operation command group 801 (refer to FIG. 25), data records (data records corresponding to the operation screen 513), each of which prescribes an X-coordinate value within a current display range ("1545 to 2344") in the map-type display mode as a field value of the field "X-coordinate range", are extracted (by being narrowed down) from among the plurality of data records. Consequently, as shown in FIG. 25, the voice operation command group 830 is extracted as the first command group M1. In other words, the voice operation command group 830 related to the operation screen 513 is set as the first search range.

Moreover, in step S26, it is determined that further search processing should be executed. In the second embodiment, in a case where a display change from a certain screen (for example, 512) to another screen (for example, 513) has been made, search processing is executed up to search processing related to the immediately preceding display screen (for example, 512).

In addition, this time, the voice operation command group 820 related to the operation screen 512 is determined as the second command group M2 (step S23), and search processing (the second search processing) in which a search range is the second command group M2 is executed (step S24).

More specifically, in the voice operation command group 801 (refer to FIG. 24), data records (data records corresponding to the operation screen 512), each of which prescribes an X-coordinate value within an immediately preceding display range ("745 to 1544") in the map-type display mode as a field value of the field "X-coordinate range", are extracted (by being narrowed down) from among the plurality of data records. Consequently, as shown in FIG. 24, the voice operation command group 820 is extracted as the second command group M2. In other words, the voice operation command group 820 related to the operation screen 512 is set as the second search range. Subsequently, the second search processing is executed.

In the second embodiment, the operation such as that described above is performed.

With respect to the operation according to the second embodiment, in a case where a voice operation command that agrees with a search target character string is not detected by the first search processing in which a search range is the voice operation command group related to the most recent operation screen 513, the second search processing in which a search range is the voice operation command group related to the operation screen 512 serving as a caller is executed. This enables even a voice operation command that agrees with any of voice operation command groups related to the operation screen (the operation screen 512 serving as a caller) other than the operation screen 513 that has been most recently called to be searched for. Therefore, one voice operation command corresponding to a user's voice for operation can be properly detected from among the plurality of voice operation commands related to the plurality of operation screens. In addition, since the search processing related to the two operation screens 513 and 512 is performed in two stages, efficient search processing can be performed.

It should be noted that although a mode in which function buttons are scrolled in units of eight buttons in response to pressing of the scroll button 562 (561) is shown here, the present invention is not limited to this. For example, the function buttons may be scrolled in units of four buttons (or on a function group basis) in response to pressing of the scroll button 562 (561).

In this case, the first command group M1 and the second command group M2 have only to be set in a state in which operation commands are partially overlapped. Alternatively, the second command group M2 after update may be set with the overlapped part between the first command group M1 and the second command group M2 excluded from the second command group M2.

Another Modified Example of Second Embodiment
(Tab Display Mode)

In the above-described embodiment, the mode in which the present invention is applied in a case where one operation screen changes to another operation screen according to the scroll operation in the "map-type display mode" has been described. However, the present invention is not limited to this. For example, the present invention may be applied in a case where one operation screen changes to another operation screen according to tab switching operation in the "tab-type display mode". Such a modified example will be described below.

In the "tab-type display mode", a plurality of operation screens that differ from one another are selectively displayed according to the switching operation using a tab. In the "tab-type display mode", a plurality of function buttons (here, 24 function buttons) are classified into a plurality of groups (a "basic setting" group, an "original document" group, a "layout" group, a "tailoring" group, and an "image quality/density" group). The 24 function buttons include seven function buttons related to copy basic setting 421 to 427, and 17 function buttons 431 to 447 related to copy practical setting (refer to FIGS. 26 and 27).

In addition, when one group is selected from among the plurality of groups according to the operation in a tab specification area 460 (refer to FIG. 26), a function button group belonging to the selected one group is displayed in a function button display area 470 (refer to FIG. 26) in the touch panel 45. It should be noted that a plurality of tabs 451 to 455 that correspond to the plurality of groups respectively are provided in the tab specification area 460.

For example, in an operation screen 412 (FIG. 26) at a certain point of time (for example, an initial state), an original document tab 452 in the tab specification area 460 is selected, and four function buttons 431 to 434 corresponding to the original document tab 452 is displayed in the function button display area 470.

After that, when a layout tab 453 in the tab specification area 460 is selected, a screen change occurs, and a new operation screen 413 (FIG. 27) is displayed. Six function buttons 435 to 440 corresponding to the layout tab 453 are displayed (as an alternative to the four function buttons 431 to 434) in the function button display area 470 of the operation screen 413.

Figure 26:
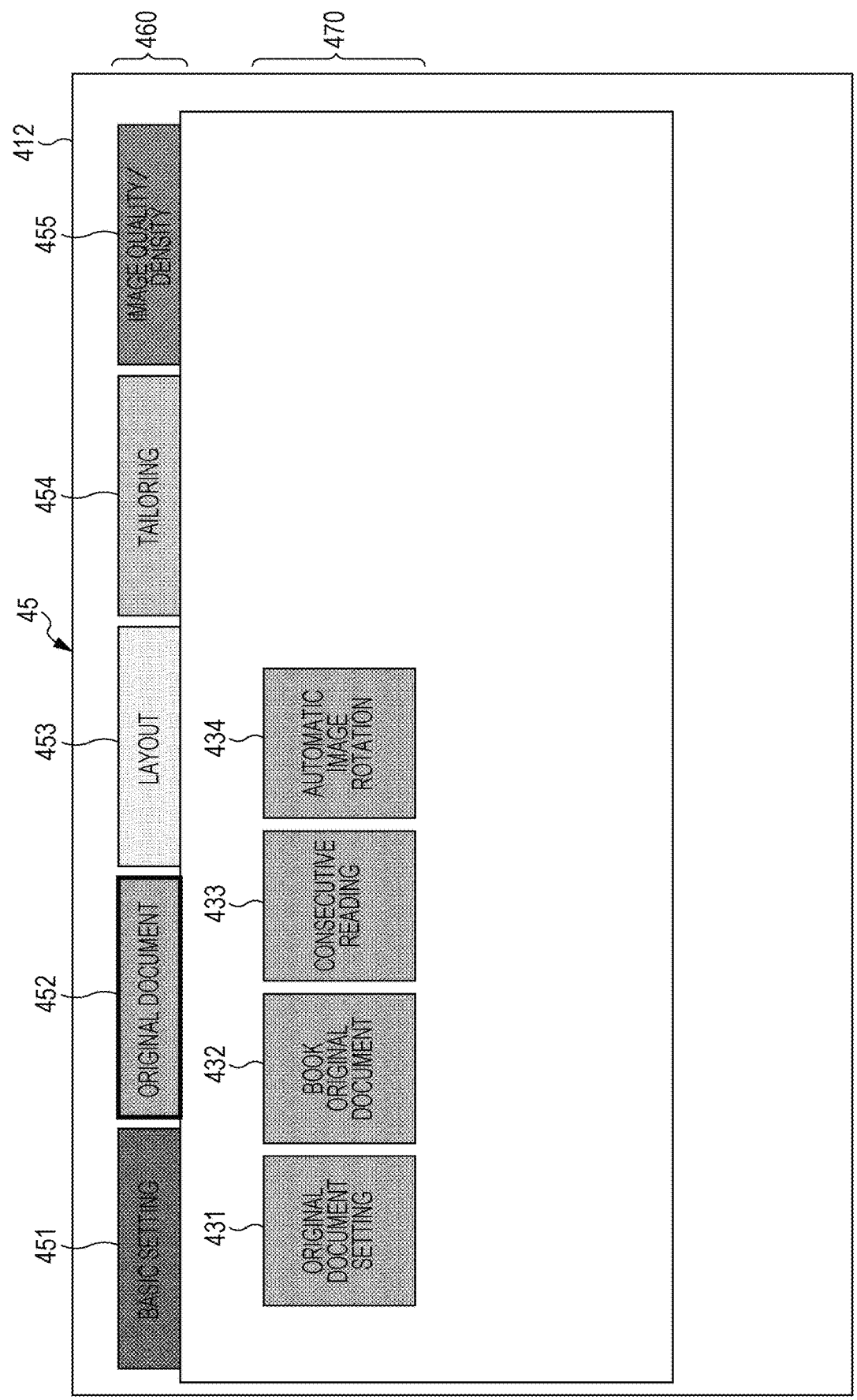
FIG. 26 is a diagram illustrating an operation screen (copy setting) in a tab-type display mode.
Figure 27:
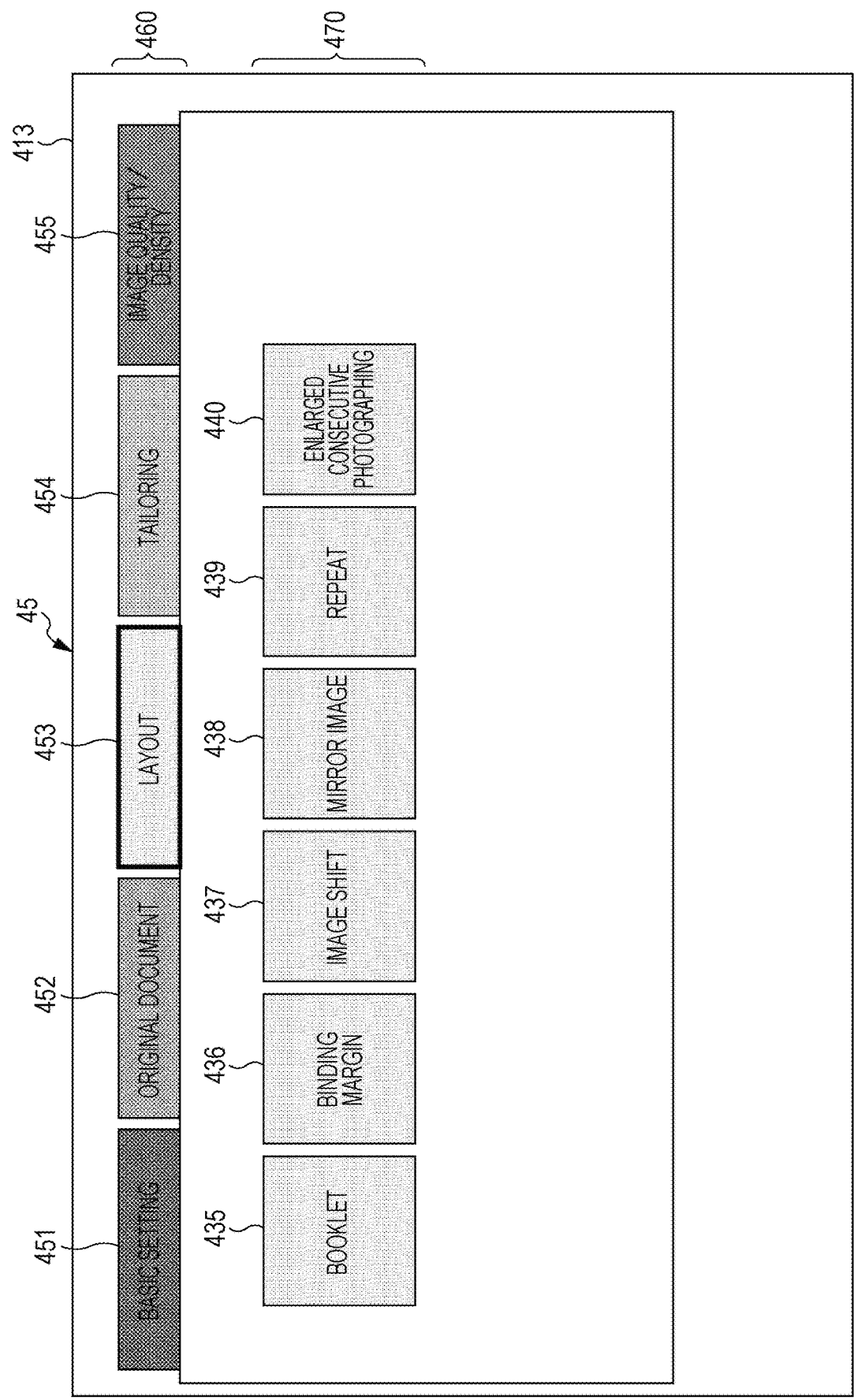
FIG. 27 is a diagram illustrating an operation screen after another tab is selected in the tab-type display mode.

In this modified example, when the operation screen 412 of FIG. 26 changes to the operation screen 413 of FIG. 27, a voice operation command group 880 (refer to FIG. 29) corresponding to the function buttons (function buttons in the operation screen 413 that is currently displayed) 435 to 440 displayed as a current display target is determined as the first command group M1 (the first search range). In addition, a voice operation command group 870 (refer to FIG. 28) corresponding to the function buttons (function buttons in the original operation screen 412) 431 to 434 displayed as a display target immediately before the change is determined as the second command group M2 (the second search range). Subsequently, two-stage search processing similar to that of the first embodiment is executed.

In more detail, in a case where the operation screen 412 of FIG. 26 changes to the operation screen 413 of FIG. 27, in step S12 (S12b) according to the second embodiment, not only the command group 870 that has already been obtained until the change (the voice operation command group related to the operation screen 412), but also another command group 880 (the voice operation command group related to the operation screen 413) is obtained (refer to FIGS. 28 and 29). Consequently, the command group 800 (802) that includes both of the voice operation command groups 870 and 880 is formed.

Incidentally, as shown in FIGS. 28 and 29, with respect to the voice operation command group 870 corresponding to the operation keys included in the operation screen (the original document group screen) 412, "original document" is given as a field value of the field "group in screen". With respect to the voice operation command group 880 corresponding to the operation keys included in the operation screen 413 (the layout group screen), "layout" is given as a field value of the field "group in screen". In addition, with respect to both of the voice operation command groups 870 and 880 as well, "copy tab display" is given as a field value of the field "screen" of each data record (illustration is omitted in FIGS. 28 and 29).

Subsequently, the voice operation command group 880 is determined as the first command group M1 (step S23), and search processing (the first search processing) in which a search range is the first command group M1 is executed (step S24).

More specifically, in the voice operation command group 802 (refer to FIG. 29), data records (data records corresponding to (the layout group screen 413 (FIG. 27))), each of which prescribes "layout" as a field value of the field "group in screen", are extracted (by being narrowed down) from among the plurality of data records. Consequently, as shown in FIG. 29, the voice operation command group 880 is extracted as the first command group M1. In other words, the voice operation command group 880 related to the layout group screen 413 is set as the first search range.

After that, in step S26, it is determined that further search processing should be executed. The process then returns to step S23, and this time, the voice operation command group 870 is determined as the second command group M2. Subsequently, search processing (the second search processing) in which a search range is the second command group M2 is executed (step S24).

More specifically, in the voice operation command group 802 (refer to FIG. 28), data records (data records corresponding to the original document group screen 412), each of which prescribes "original document" as a field value of the field "group in screen", are extracted (by being narrowed down) from among the plurality of data records. Consequently, as shown in FIG. 28, the voice operation command group 870 is extracted as the second command group M2. In other words, the voice operation command group 870 related to the original document group screen 412 is set as the second search range. Subsequently, the second search processing is executed.

The operation such as that described above may be performed.

It should be noted that in the second embodiment or the like, as shown in the flowchart of FIG. 21, although the generation processing of the i-th text dictionary (step S23) is executed immediately before the i-th search processing (step S24), the present invention is not limited to this. For example, the generation processing of the i-th text dictionary may be executed immediately after step S12 (steps S13, S14, and the like (refer to FIG. 46)).

3. Third Embodiment

In the third embodiment, a voice for operation is vocalized in a state in which a first screen between two operation screens that are successively displayed on the touch panel 45 is displayed, and a second screen is not yet displayed. In other words, in a state in which one screen is currently displayed on the touch panel 45, and in a state in which there is a possibility that another screen will be displayed on the touch panel 45, a voice for operation is vocalized. In addition, in such a case, two-stage search processing is executed.

Specifically, a voice operation command group related to the one screen (a screen that has been most recently called among screens that are being displayed (in detail, the first screen that is the screen serving as a caller of the second screen, and that is being displayed when the voice for operation is vocalized)) is set as the first search target, and the first search processing is first executed. Next, a voice operation command group related to the other screen that has a possibility of being called from the one screen (the second screen that is not yet displayed when the voice for operation is vocalized) is set as the second search target, and the second search processing is executed. It should be noted that the voice operation command group related to the other screen is obtained beforehand before the other screen is displayed.

In any of the first to third embodiments, the first command group M1 is a command group related to one screen between the two operation screens that include the first screen related to the MFP 10, and the second screen displayed according to user's operation performed in the first screen (in detail, a screen that has been most recently called among screens that are being displayed). In this respect, the first to third embodiments share the same feature. However, in the first and second embodiments, the voice operation command group related to the second screen is set as the first command group M1, whereas in the third embodiment, the voice operation command group related to the first screen is set as the first command group M1. In the third embodiment, such a mode will be described focusing on points of difference from the first and second embodiments.

A mode in which the concept according to the third embodiment is applied to the "map-type display mode" (refer to FIGS. 22 and 23) will be mainly described below.

For example, at the time at which the operation screen 512 (FIG. 22) having eight function buttons 531 to 538 is displayed on the touch panel 45, the voice operation command group 820 related to the operation screen 512 (refer to FIGS. 24 and 25) is set as the first command group M1, and the first search processing is executed.

Moreover, the MFP 10 reads ahead (reads beforehand in advance) the voice operation command group (830) of a screen having a possibility of being changed from the operation screen 512 (an undisplayed screen having a possibility of becoming a screen called from the operation screen 512) from the storage part 5. Subsequently, the voice operation command group that has been read ahead is set as the second command group M2, and the second search processing is executed. Here, read processing of reading the voice operation command group related to the called screen is performed before the first search processing. However, the present invention is not limited to this. The read processing of reading the voice operation command group may be performed in parallel with the first search processing, or may be performed after the completion of the first search processing.

Figure 30:
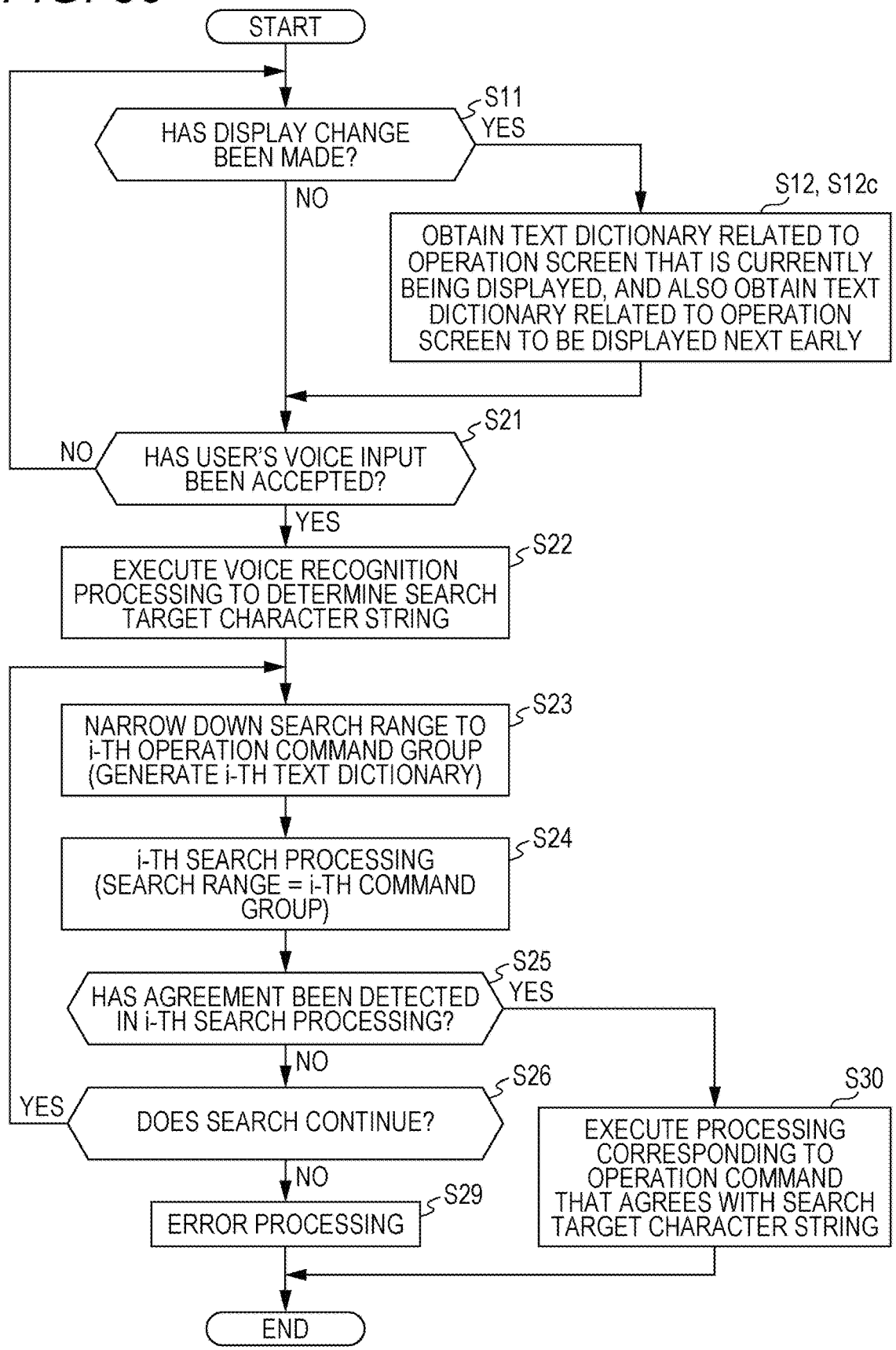
FIG. 30 is a flowchart illustrating operation according to a third embodiment.

FIG. 30 is a flowchart illustrating operation according to the third embodiment. As understood from a comparison between FIG. 30 and FIG. 4 (and FIG. 21), the operation in step S12 mainly differs. The operation will be described below focusing on points of difference.

For example, at the time at which displaying of the operation screen 512 of FIG. 22 is started, the process proceeds from step S11 to step S12 (S12c). Subsequently, in step S12 (S12c), the voice operation command group (text dictionary) 820 related to the operation screen 512 that is currently being displayed (that is being displayed when the voice for operation is vocalized) is obtained, and a voice operation command group related to a screen having a possibility of being displayed next to the operation screen 512 (a screen that is not being displayed when the voice for operation is vocalized) is obtained. Here, as a screen having a possibility of being displayed next to the operation screen 512, the operation screen 513 that is displayed in response to pressing of the scroll button 562 (refer to FIG. 23) is presented. In this case, the voice operation command group 830 related to the operation screen 513 is also obtained.

Subsequently, the voice operation command group 820 related to the operation screen 512 that is currently being displayed is determined as the first command group M1 (step S23), and search processing (the first search processing) in which a search range is the first command group M1 is executed (step S24).

In addition, in step S26, it is determined that further search processing should be executed. The process then returns to step S23. Incidentally, in the third embodiment, in a case where a display change from a certain screen (for example, 512) to another screen (for example, 513) can be made, search processing is executed up to search processing related to the immediately succeeding display screen (for example, 513).

In step S23, the voice operation command group 830 related to the operation screen 513, which has a possibility of being displayed next to the operation screen 512 but is not yet displayed, is determined as the second command group M2. Subsequently, search processing (the second search processing) in which a search range is the second command group M2 is executed (step S24).

In the third embodiment, the operation such as that described above is performed.

According to such operation, not only the voice operation command group related to the screen (the display screen that is being displayed when the voice for operation is vocalized) 512 that is currently being displayed, but also the voice operation command group related to another screen 513 having a possibility of being displayed next, have a possibility of becoming a target of search processing. Therefore, one voice operation command corresponding to a user's voice for operation can be properly detected from among the plurality of voice operation commands related to the plurality of operation screens 512 and 513.

In addition, since the search processing related to the two operation screens 512 and 513 is performed in two stages, efficient search processing can be performed. In detail, the first search processing in which a search range is the voice operation command group 820 related to the most recently called operation screen 512 that is currently being displayed is first performed, and in a case where the first search processing does not succeed, the second search processing in which a search range is the voice operation command group 830 related to the other screen 513 is performed. As the result, search processing in which a search range is the voice operation command group 820 having a relatively high possibility of being vocalized as a voice for operation, between the two voice operation command groups 820 and 830, is performed earlier, and subsequently, search processing in which a search range is the other voice operation command group 830 is performed. Therefore, efficient search processing can be performed.

Figure 31:
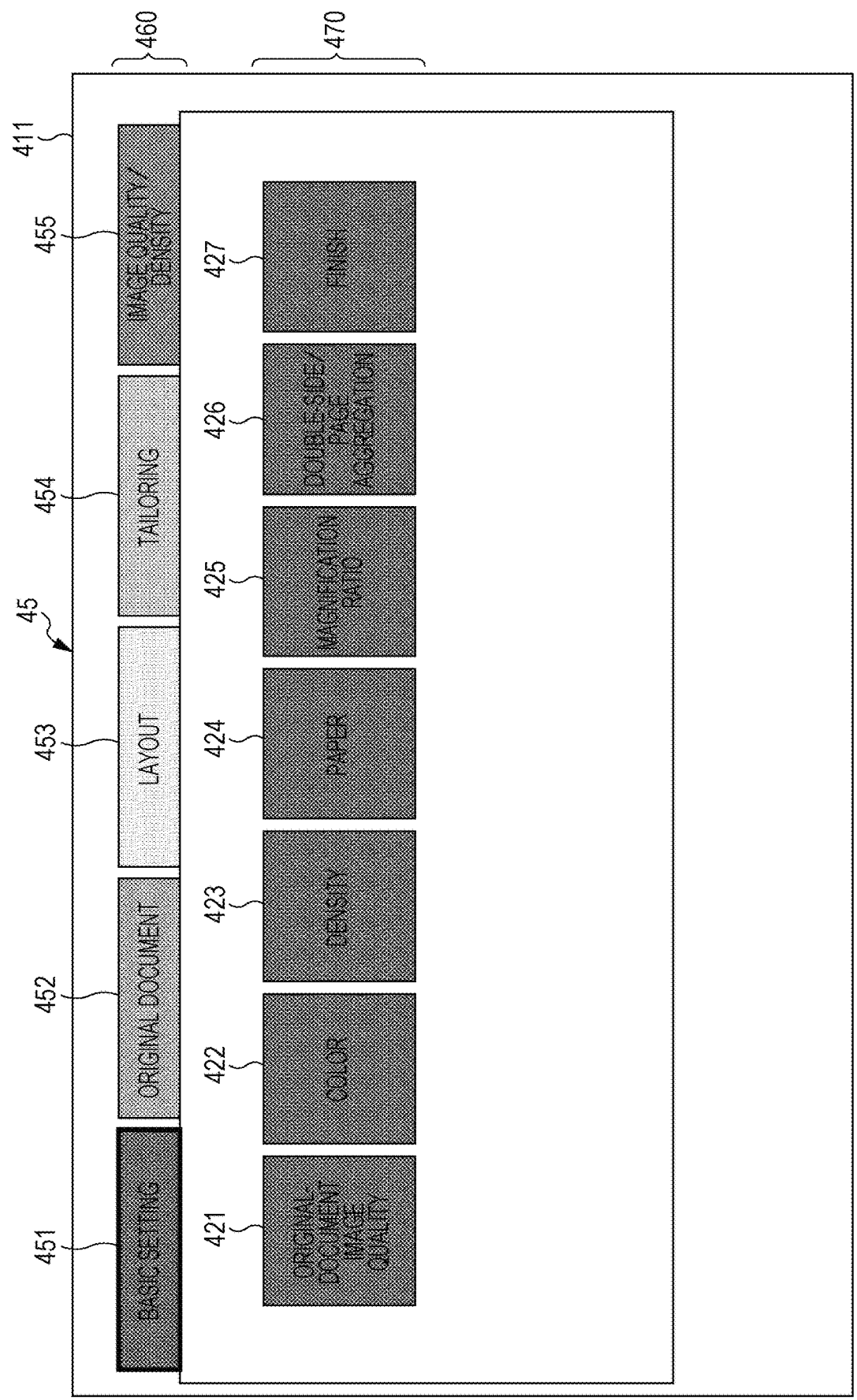
FIG. 31 is a diagram illustrating an operation screen after still another tab is selected in the tab-type display mode.

It should be noted that although the operation screen 513 (refer to FIG. 23) is presented here as a screen (at least one screen) having a possibility of being displayed next to the operation screen 512, the present invention is not limited to this. The screen having a possibility of being displayed next to the operation screen 512 may be, for example, the operation screen 511 (refer to FIG. 31) that is displayed in response to pressing of the scroll button 561 (FIG. 22) in the operation screen 512. Alternatively, screens each having a possibility of being displayed next to the operation screen 512 may be both of the operation screen 511 and the operation screen 513.

Another Modified Example of Third Embodiment

In the above description, the concept according to the third embodiment is applied to the map-type display mode (refer to FIGS. 22, 23, and the like). However, the present invention is not limited to the above.

The concept according to the third embodiment may be applied to, for example, the tab-type display mode (refer to FIGS. 26, 27, and the like). More specifically, a voice for operation may be accepted in a state in which the operation screen 412 of FIG. 26 is displayed, and the voice operation command group 870 (refer to FIG. 28) related to the operation screen 412 may be set as the first command group M1 so as to execute the first search processing. Further, a voice operation command group related to at least one screen among a plurality of screens called from the operation screen 412 may be set as the second command group M2 so as to execute the second search processing. For example, the voice operation command group 880 (refer to FIG. 29) related to the operation screen 413 (refer to FIG. 27) having a possibility of being displayed next to the operation screen 412 may be set as the second command group M2 so as to execute the second search processing.

Alternatively, a voice for operation may be vocalized in a state in which only the main screen 210 is displayed (FIG. 5), and the voice operation command group 610 (refer to FIG. 8) related to the main screen 210 may be set as the first command group M1 so as to execute the first search processing. Further, a voice operation command group related to at least one screen among a plurality of screens called from the operation screen 210 may be set as the second command group M2 so as to execute the second search processing. For example, the sub-screen 250 (refer to FIG. 12) having a numeric keypad may be identified as a screen having a possibility of being displayed next to the operation screen 210, and the voice operation command group 650 (refer to FIG. 13) related to the sub-screen 250 may be set as the second command group M2 so as to execute the second search processing. Alternatively, the sub-screen 230 (refer to FIG. 6) may be identified as a screen having a possibility of being displayed next to the operation screen 210, and the voice operation command group 630 (refer to FIG. 9) related to the operation screen 230 may be set as the second command group M2 so as to execute the second search processing.

Similarly, in a situation in which the main screen 310 is displayed (FIG. 15), the voice operation command group 710 (refer to FIG. 17) related to the main screen 310 may be set as the first command group M1 so as to execute the first search processing. Further, a voice operation command group related to at least one screen among a plurality of screens called from the operation screen 310 may be set as the second command group M2 so as to execute the second search processing. For example, the sub-screen 330 (refer to FIG. 16) having a pull-down menu may be identified as a screen having a possibility of being displayed next to the operation screen 310, and the voice operation command group 730 (refer to FIG. 18) related to the sub-screen 330 may be set as the second command group M2 so as to execute the second search processing. The second command group M2 includes two voice operation commands ("GASHITSU (image quality)" and "MOJI (character)") corresponding to two options (two display elements), 321 ("image"), 322 ("character"), in the pull-down list respectively.

Still Another Modified Example of Third Embodiment

In addition, it is preferable that setting of whether or not to execute the operation of the third embodiment can be changed. Specifically, it is preferable that setting of "whether or not to execute search processing (the second search processing) in which a search range is a command group (the second command group M2) related to a screen that is not yet displayed when the voice for operation is vocalized" can be changed (in particular, on a user basis). Specifically, setting has only to be changed according to user's setting operation using a predetermined setting screen (not illustrated). In addition, whether or not to execute search processing related to the second command group M2 has only to be determined on the basis of setting contents pertaining to the setting change. In detail, on condition that setting is to execute the second search processing in which a search range is the second command group, the second search processing in which a search range is the second command group has only to be executed. It should be noted that in a case where setting is not to execute the second search processing in which a search range is the second command group, the second search processing in which a search range is the second command group is not executed, and search processing has only to be executed up to the first search processing in which a search range is the first command group.

In addition, in the third embodiment or the like, as shown in the flowchart of FIG. 30, although the generation processing of the i-th text dictionary (step S23) is executed immediately before the i-th search processing step S24), the present invention is not limited to this. For example, the generation processing of the i-th text dictionary may be executed immediately after step S12 (steps S13, S14, and the like (refer to FIG. 46)).

4. Fourth Embodiment

In the fourth embodiment, on the basis of an operating state of the MFP 10, a mode in which a search range in each stage of search processing is narrowed down will be described focusing on points of difference from the first embodiment or the like.

In the fourth embodiment, the MFP 10 executes the first search processing (and/or the second search processing) together with exclusion processing of excluding, from the first command group M1 (and/or the second command group M2), an operation command that is determined to be non-executable on the basis of a job execution state of the MFP 10. The exclusion processing has only to be executed in step S23, S25, or the like.

FIG. 32 is a diagram illustrating such exclusion processing. The upper part of FIG. 32 shows a part of the first command group M1 before the execution of the exclusion processing, and the lower stage of FIG. 32 shows a part of the first command group M1 after the execution of the exclusion processing.

Here, it is assumed that a plurality of voice operation commands corresponding to a plurality of hardware keys including the start key (start button) 41, the stop key (stop button) 42, the reset key (reset button) 43, and the home key (home button) 44 are set as a part of the first command group M1. In FIG. 32 (in particular, the upper part), a state in which each voice operation command corresponding to each operation key is executable is indicated in a field "job state". Specifically, it is prescribed that the voice operation commands "RISETTO (reset)" and "HOMU (home)" are executable in "all states" of the MFP 10, the voice operation command "SUTATO (start)" is executable in "job acceptable state", and the voice operation command "SUTOPPU (stop)" is executable in "job executing state".

For example, during a time period during which the MFP 10 is executing a job (a copy job or a scan job) (that is to say, "job executing"), a new job (a copy job and the like) cannot be accepted. In short, a "job executing" state is not a "job acceptable (state)". In consideration of this situation, in a "job executing" state, the voice operation command ("SUTATO (start)") that prescribes a field value "job acceptable (state)" in the field "job state" is excluded from the first command group M1 on the basis of the data table of FIG. 32. In other words, in the "job executing" state, the voice operation command "SUTATO (start)" is determined to be non-executable, and therefore the voice operation command "SUTATO (start)" is excluded from the first command group M1. In the lower stage of FIG. 32, the first command group M1 after excluding the voice operation command "SUTATO (start)" is shown.

Alternatively, exclusion processing such as that shown in FIG. 33 may be performed. The upper part of FIG. 33 shows a part of the first command group M1 before the execution of the exclusion processing, and the lower stage of FIG. 33 shows a part of the first command group M1 after the execution of the exclusion processing.

Specifically, during a time period during which the MFP 10 is not executing a job (a copy job or a scan job) (that is to say, "job non-executing"), an instruction to stop a job cannot be accepted. In short, a "job non-executing" state is not a "job executing" state. In consideration of this situation, in the "job non-executing" state, the voice operation command ("SUTOPPU (stop)") that prescribes a field value "job executing" in the field "job state" is excluded from the first command group M1 on the basis of the data table of FIG. 33. In other words, in the "job non-executing" state, the voice operation command "SUTOPPU (stop)" is determined to be non-executable, and therefore the voice operation command "SUTOPPU (stop)" is excluded from the first command group M1. In the lower stage of FIG. 33, the first command group M1 after excluding the voice operation command "SUTOPPU (stop)" is shown.

It should be noted that although the operation command that is determined to be non-executable on the basis of a job execution state in the MFP 10 is excluded from the first command group M1 here, the present invention is not limited to this. For example, the operation command that is determined to be non-executable on the basis of a job execution state in the MFP 10 may be excluded from the second command group M2. Alternatively, the operation command that is determined to be non-executable on the basis of a job execution state in the MFP 10 may be excluded from both of the first command group M1 and the second command group M2.

Another Modified Example of Fourth Embodiment

Similarly, the first search processing (and/or the second search processing) may be executed together with exclusion processing of excluding, from the first command group M1 (and/or second command group M2), an operation command that is determined to be non-executable on the basis of a user authentication state in the MFP 10.

FIG. 34 is a diagram illustrating such exclusion processing. The upper part of FIG. 34 shows a part of the first command group M1 before the execution of the exclusion processing, and the lower stage of FIG. 34 shows a part of the first command group M1 after the execution of the exclusion processing.

For example, in a user authentication uncompleted state (including being used by a guest user who is not required to perform user authentication), a voice operation command that can be used only after user authentication (after completion of user authentication) cannot be accepted. In consideration of this situation, in the "user authentication uncompleted state", a voice operation command ("YUZA BOKKUSU (user box)") that prescribes a field value "usable only after user authentication" in a field "user authentication state" is excluded from the first command group M1 on the basis of the data table of FIG. 34. In other words, in the "user authentication uncompleted state", the voice operation command "YUZA BOKKUSU (user box)" is determined to be non-executable, and therefore the voice operation command "YUZA BOKKUSU (user box)" is excluded from the first command group M1. In the lower stage of FIG. 34, the first command group M1 after excluding the voice operation command "YUZA BOKKUSU (user box)" is shown.

It should be noted that although the operation command that is determined to be non-executable on the basis of a user authentication state in the MFP 10 is excluded from the first command group M1 here, the present invention is not limited to this. For example, the operation command that is determined to be non-executable on the basis of a user authentication state in the MFP 10 may be excluded from the second command group M2. Alternatively, the operation command that is determined to be non-executable on the basis of a user authentication state in the MFP 10 may be excluded from both of the first command group M1 and the second command group M2.

5. Fifth Embodiment

In each of the embodiments described above, a mode in which the priority order is given among a plurality of search processing related to a plurality of operation screens is presented. This fifth embodiment presents a mode in which even the search order in a search range in search processing of each stage (each of the first search processing and the second search processing) is adjusted on the basis of a predetermined criterion. The fifth embodiment will be described below focusing on points of difference from the first embodiment or the like.

In the fifth embodiment, in search processing for the first command group M1, according to the priority order given to each of two or more operation commands included in the first command group M1 (the first search range), identity determination processing of determining identity between each of the two or more operation commands and a search target character string is successively executed. Subsequently, processing corresponding to one voice operation command that first agrees with the search target character string among the two or more operation commands is executed.

Similarly, in search processing for the second command group M2, according to the priority order given to each of two or more operation commands included in the second command group M2 (the second search range), identity determination processing of determining identity between each of the two or more operation commands and a search target character string is successively executed. Subsequently, processing corresponding to one voice operation command that first agrees with the search target character string among the two or more operation commands is executed.

According to such operation, searching within a search range in search processing of each stage can be more efficiently executed, and responsiveness from the time at which a voice for operation is vocalized until the time at which processing corresponding to the voice for operation is executed can be enhanced.

The search order in search processing of each stage (search order in each search range) is determined on the basis of, for example, a display position of a corresponding operation key in a search target screen in the each stage. In general, the upper left side in a screen easily attracts a person's attention, and thus there is a tendency of important operation keys to be arranged on the upper left side. In other words, important operation keys (for example, operation keys, each of which is frequently used) among a plurality of operation keys in a certain screen are often arranged on the comparative upper left side in the screen.

Figure 35:
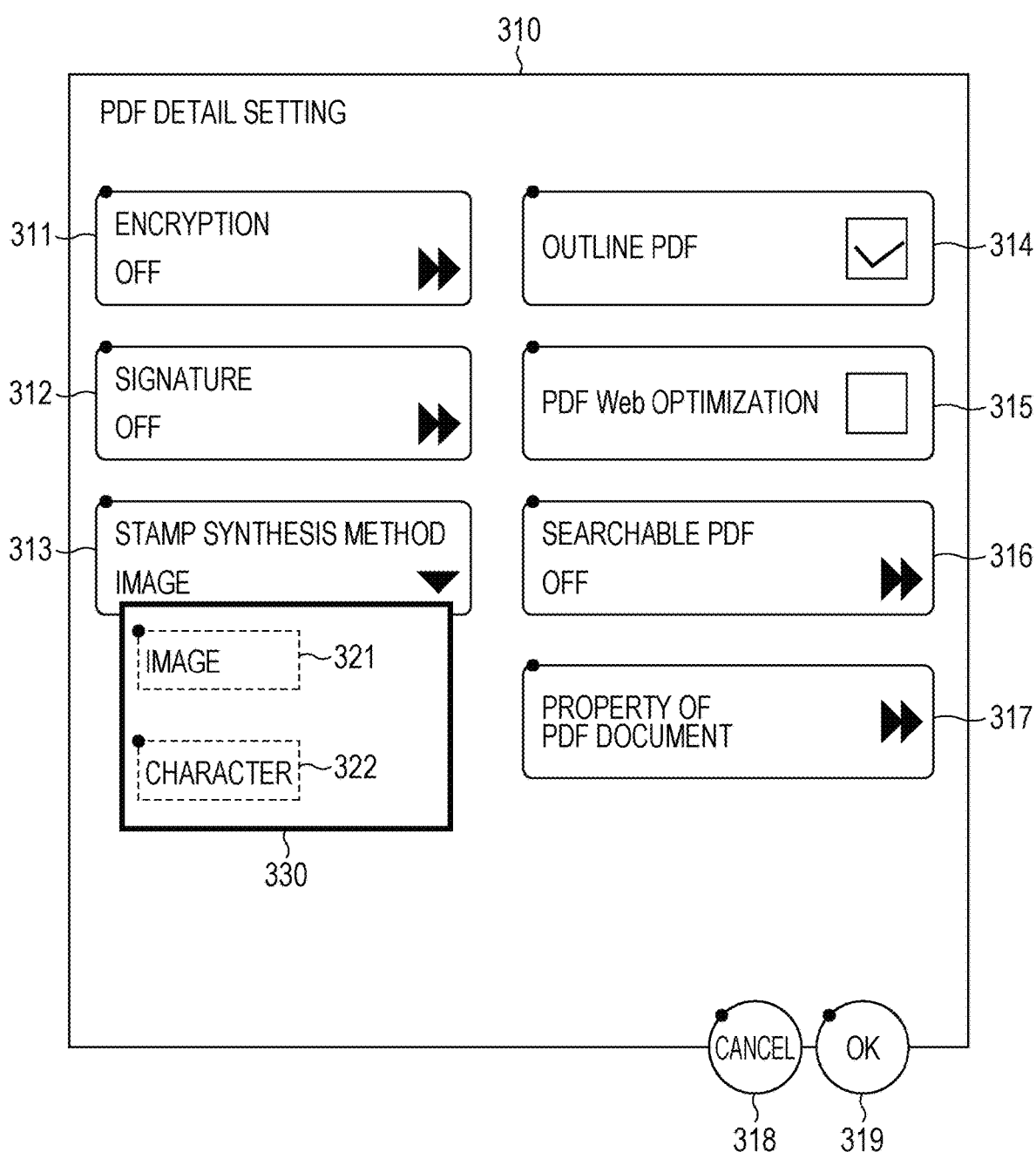
FIG. 35 is a diagram illustrating key arrangement positions that determine the search order in the same search range (fifth embodiment)

In this embodiment, in consideration of such circumstances, an evaluation value F1 (described next) related to a position of a corresponding operation key is calculated for each of a plurality of voice operation commands The evaluation value F1 is a distance (represented by a square root of the sum of the square of X and the square of Y) between coordinate values (X, Y) of a representative point (for example, an upper left point) of each operation key (refer to FIG. 35) and an upper left point (original point) in the screen. In addition, a relatively high priority order is given to a voice operation command having a relatively low evaluation value F1 among the plurality of voice operation commands FIG. 35 shows each representative point (upper left point of each operation key (black small circle in the figure)) of each operation key in the detail setting screen 310 (FIG. 16). In such a detail setting screen 310, identity determination processing of determining identity with a search target character string is executed in succession from an operation key, the representative point of which exists on the relatively upper left side in the screen. In other words, a relatively high priority order is given to an operation key, the representative point of which exists on the relatively upper left side. Specifically, in the detail setting screen 310, identity determination processing of determining identity with a search target character string is executed in order of the operation keys 311, 312, 313, 314, 315, 316, 317, 318, and 319. In detail, first of all, identity determination processing of determining identity between a search target character string and a voice operation command corresponding to the operation key 311 is executed. Next, identity determination processing of determining identity between the search target character string and a voice operation command corresponding to the operation key 312 is executed. Further, identity determination processing of determining identity between the search target character string and a voice operation command corresponding to each operation key 313, 314, . . . is successively executed.

Similarly, in the pull-down list screen 330, identity determination processing of determining identity with a search target character string is executed in order of the operation keys 321 and 322.

For example, in a case where voice input has been accepted in a display state of FIG. 35, the first search processing (search processing of the first stage) in which a search target is the voice operation command group 730 (FIG. 17) in the pull-down list 330 is first performed, and next, the second search processing (search processing of the second stage) in which a search target is the voice operation command group 710 of the detail setting screen 310 is performed. In particular, in search processing of each stage, identity determination processing of determining identity between the search target character string and each of two or more voice operation commands in the voice operation command group related to the each stage is executed in the order described above.

In this manner, in search processing of each stage, the priority order based on a display position of a corresponding operation key in each screen is given to each of a plurality of voice operation commands in the each screen. Subsequently, in search processing of each stage, identity determination processing of determining identity between each of the plurality of voice operation commands and the search target character string is successively executed according to the priority order.

Modified Example 1 of Fifth Embodiment

In the fifth embodiment described above, the search order in search processing of each stage (the priority order in each search range) is determined on the basis of a display position of a corresponding operation key in a search target screen in each stage. However, the present invention is not limited to this.

Specifically, the search order in search processing of each stage may be determined on the basis of the priority order predetermined on the basis of contents of a specific field in the i-th text dictionary that prescribes the i-th voice operation command group.

Figure 36:
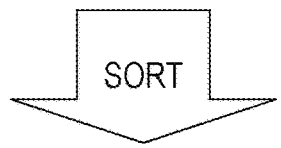
FIG. 36 is a diagram illustrating a state in which voice operation commands in a certain layer are rearranged on the basis of priority corresponding to contents of a field "job state"

For example, as shown in the upper part of FIG. 36, an evaluation value F2 (F21) (also referred to as "priority coefficient") corresponding to each field value related to a field "job state" ("job executing", "job acceptable", "all states") is determined beforehand For example, a relatively low evaluation value F2 (for example, "0.5") is assigned to "all states", and a relatively high evaluation value F2 (for example, "1.0", "0.9") is assigned to other specific states ("job executing" and "job acceptable state"). In addition, a plurality of voice operation commands, which are search targets in a certain stage, are rearranged (sorted) on the basis of the evaluation value F2 (in order of decreasing evaluation value F21 (decreasing order)) (refer to the lower part of FIG. 36). Identity determination processing of determining identity between each of the plurality of voice operation commands and the search target character string is executed in the order after the sorting. Specifically, identity determination processing of determining identity between the voice operation command "SUTOPPU (stop)" having the highest priority coefficient "1.0" and the search target character string is executed with highest priority (first). Subsequently, identity determination processing of determining identity between the voice operation command "SUTATO (start)" having the next highest priority coefficient "0.9" and the search target character string is executed next (second) by priority. After that, identity determination processing of determining identity between, for example, the voice operation command "RISETTO (reset)" having a priority coefficient "0.5" that is the highest next to the above and the search target character string is executed.

Figure 37:
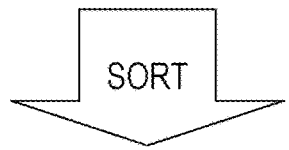
FIG. 37 is a diagram illustrating a state in which voice operation commands in a certain layer are rearranged on the basis of priority corresponding to contents of a field "user authentication state"

Alternatively, as shown in the upper part of FIG. 37, the evaluation value F2 (F22) (priority coefficient) according to each field value related to the field "user authentication state" ("usable only after user authentication", "usable even by public user") may be determined beforehand For example, a relatively high evaluation value F2 (for example, "1.0") is assigned to "usable only after user authentication", and a relatively low evaluation value F2 (for example, "0.5") is assigned to "usable even by public user". In addition, a plurality of voice operation commands, which are search targets in a certain stage, are rearranged (sorted) on the basis of the evaluation value F2 (in decreasing order of the evaluation value F22) (refer to the lower part of FIG. 37). Identity determination processing of determining identity between each of the plurality of voice operation commands and the search target character string is executed in the order after the sorting. Specifically, identity determination processing of determining identity between the voice operation command "YUZA BOKKUSU (user box)" having the highest priority coefficient "1.0" and the search target character string is executed with highest priority (first).

Subsequently, identity determination processing of determining identity between the voice operation command "PABURIKKU BOKKUSU (public box)" having the next highest priority coefficient "0.5" and the search target character string is executed next (second) by priority. Subsequently, identity determination processing of determining identity between, for example, each of other voice operation commands and the search target character string is executed in order of decreasing priority coefficient of the each other voice operation command In addition, not an evaluation value corresponding to a field value related to a single field, but an evaluation value corresponding to field values related to a plurality of fields, may be employed as the evaluation value F2 (F23 and the like). For example, in a case where the field "job state" and the field "user authentication state" are considered as the plurality of fields, the product of an evaluation value F21 corresponding to each field value related to the field "job state" and an evaluation value F22 corresponding to each field value related to the field "user authentication state" has only to be determined as the evaluation value F2 (F23). In addition, on the basis of the evaluation value F2 (F23) corresponding to the field values related to the plurality of fields, a plurality of voice operation commands, which are search targets in a certain stage, are rearranged (sorted) (in decreasing order of the evaluation value F23), and identity determination processing of determining identity between each of the plurality of voice operation commands and the search target character string may be successively executed in the order after the sorting.

Modified Example 2 of Fifth Embodiment

Alternatively, the search order in search processing of each stage (search order in each search range) may be determined on the basis of a state (execution state of a job) of the MFP 10.

Specifically, as shown in FIG. 38, the priority order (search order) of each voice operation command may be changed from the default order (the upper part of FIG. 38) to the order after sorting (the lower part of FIG. 38) on the basis of an execution state of a job (irrespective of the above-described evaluation value F2).

In detail, on the basis of a "job executing" state of the MFP 10, as shown in the lower part of FIG. 38, sorting is performed in such a manner that the highest priority order is given to the voice operation command "SUTOPPU (stop)" corresponding to the stop button (stop key).

Subsequently, according to the priority order in which the job execution state of the MFP 10 is reflected, identity determination processing of determining identity between each of the plurality of voice operation commands of each stage and a search target character string is successively executed, thereby search processing related to the voice operation command group of the each stage is executed.

As the result, whether or not a "stop" instruction that requires high speed reaction during job execution has been given is determined in early stage. In other words, among two or more voice operation commands included in a search range of the i-th search processing, identity determination processing of determining identity with a voice operation command that should be determined in early stage as the result of reflecting the job execution state of the MFP 10 is executed by priority. Therefore, the search time can be shortened to enhance the responsiveness.

Modified Example 3 of Fifth Embodiment

Alternatively, the search order in search processing of each stage (search order in each search range) may be determined on the basis of user authentication state in the MFP 10.

Specifically, as shown in FIG. 39, the priority order (search order) of each voice operation command may be changed from the default order (the upper part of FIG. 39) to the order after sorting (the lower part of FIG. 39) on the basis of a user authentication completed state (irrespective of the above-described evaluation value F2).

After user authentication, as shown in the lower part of FIG. 39, sorting is performed in such a manner that the highest priority order is given to the voice operation command "YUZA BOKKUSU (user box)" corresponding to the "user box" button (not illustrated).

Subsequently, according to the priority order in which the user authentication state of the MFP 10 is reflected, identity determination processing of determining identity between each of the plurality of voice operation commands of each stage and a search target character string is successively executed, thereby search processing related to the voice operation command group of the each stage is executed.

As the result, after user authentication, identity determination processing of determining identity with the voice operation command "user box" in which a possibility of being accepted as a voice for operation is higher than that before the user authentication is executed in a stage earlier than identity determination processing of determining identity with the other voice operation commands In other words, among two or more voice operation commands included in a search range of the i-th search processing, identity determination processing of determining identity with a voice operation command that should be determined in early stage as the result of reflecting the user authentication state in the MFP 10 is executed by priority. Therefore, the search time can be shortened to enhance the responsiveness.

Modified Example 4 of Fifth Embodiment

Figure 40:
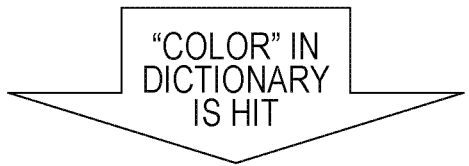
FIG. 40 is a diagram illustrating a state in which a use history table is updated.

Alternatively, the search order in search processing of each stage (search order in each search range) may be determined on the basis of a past use count (use history) of each voice operation command FIG. 40 is a diagram illustrating a use history table that stores a past use count of each voice operation command As shown in FIG. 40, the use count of each voice operation command in the use history table (the upper part of FIG. 40) is updated to the use count of the each voice operation command after updating the use history (the lower part of FIG. 40) according to the use of the voice operation command "KARA (color)". In FIG. 40, the use count of the voice operation command "KARA (color)" is updated from "10" times (the upper part) to "11" times (the lower part). The use count of each voice operation command has only to be used as an evaluation value F2 (F24).

Subsequently, a plurality of voice operation commands, which are search targets in a certain stage after updating the use history, are rearranged (sorted) (in decreasing order of the evaluation value F24) on the basis of the evaluation value F24 (the use count of each voice operation command) Subsequently, in the order after the sorting, identity determination processing of determining identity between each of the plurality of voice operation commands and the search target character string has only to be successively executed.

Consequently, among two or more voice operation commands included in a search range of the i-th search processing, identity determination processing of determining identity with a voice operation command that should be determined in early stage as the result of reflecting the use history of each voice operation command is executed by priority. Therefore, the search time can be shortened to enhance the responsiveness.

It should be noted that although the evaluation value F2 (F24) in which only the use count of the voice operation command itself is reflected is used here, the present invention is not limited to this. The evaluation value F2 (F25) in which only the use count of the operation key (212 and the like (refer to, for example, FIG. 5)) corresponding to each voice operation command ("KARA (color)" and the like) is reflected may be used. Alternatively, an evaluation value F2 (F26) in which both the use count of each voice operation command and the use count of an operation key corresponding to the each voice operation command are reflected may be used.

Modified Example 5 of Fifth Embodiment

In addition, in a case where it is determined that a load of the MFP 10 is at a constant level or higher (the MFP 10 is in a high load state), low priority commands (voice operation commands each having a priority lower than a predetermined level) are excluded from operation commands of each stage (for example, the first command group M1), and subsequently search processing of each stage (the first search processing related to the first command group M1 and the like) may be executed.

For example, in a case where a print engine (the print output part 3 and the like) of the MFP 10 is being operated, it is determined that a load of the MFP 10 is at a constant level or higher (the MFP 10 is in a high load state). In this case, exclusion processing in which low priority commands are excluded from the first command group M1 is performed, and subsequently the first search processing related to the first command group M1 after the exclusion processing has only to be executed.

Figure 41:
FIG. 41 is a diagram illustrating a state in which in a case where it is determined that a load of a MFP is at a certain level or higher, a low priority command is excluded from operation commands at each stage.

Incidentally, a determination as to whether or not each voice operation command is a low priority command has only to be made on the basis of, for example, priority (evaluation value F2 (F27)) predetermined as shown in FIG. 41. In FIG. 41, priorities ("1.0", "0.6", "0.4", "0.3", . . . ) are predetermined for voice operation commands ("SUTOPPU (stop)", "PUROGURAMU (program)", "KARA (color)", "BAIRITSU (magnification ratio)", . . . ) respectively. In addition, a voice operation command, the priority (F27) of which is a predetermined value TH1 (here, 0.3) or lower, is determined to be a low priority command In contrast, a voice operation command, the priority (F27) of which is higher than the predetermined value, is determined not to be a low priority command Alternatively, a determination as to whether or not each voice operation command is a low priority command may be made on the basis of the above-described various evaluation values F2 or the like (refer to FIG. 35 to FIG. 41).

In addition, in the above description, in a case where the print engine of the MFP 10 is being operated, it is determined that the MFP 10 is in a high load state. However, the present invention is not limited to this. For example, in a case where character recognition processing for a scanned image or the like is being executed in the MFP 10, or even in a case where PDF-format file generation processing based on a scanned image or the like is being executed in the MFP 10, it may be determined that the MFP 10 is in a high load state.

6. Sixth Embodiment

In each of the embodiments described above, by using a command dictionary in which each voice operation command group for each screen is registered beforehand, a voice operation command group (i-th text dictionary) for each screen is obtained. However, the present invention is not limited to this. For example, a voice operation command group (i-th text dictionary) for each screen may be obtained (generated) by executing, for example, character recognition processing (OCR processing) of recognizing characters included in an image of each operation screen.

Specifically, a plurality of button images (images that represent operation buttons (operation keys)) are extracted by image processing (in detail, button image extraction processing) for each screen, and character strings in the plurality of button images are recognized by character recognition processing of recognizing the character strings in the plurality of button images. Subsequently, for example, the recognized character strings are extracted as a voice operation command group for the button images, thereby generating a text dictionary. In this case, coordinate values of a representative point (for example, the central point of a button image) of a button image corresponding to each voice operation command are assigned to the each voice operation command The two screens (the first screen and the second screen) in each of the above-described embodiments are each subjected to the series of processing. The text dictionary (i-th text dictionary) related to each screen may be generated in this manner. It should be noted that the generation processing of generating the i-th text dictionary has only to be executed in step S23 of FIG. 4, step S13 of FIG. 46, or the like.

In detail, first of all, in a state in which only the first screen (for example, the basic menu screen 210) is displayed on the touch panel 45 (refer to FIGS. 5 and 42), the first screen is subjected to the button image extraction processing and the OCR processing.

Figure 42:
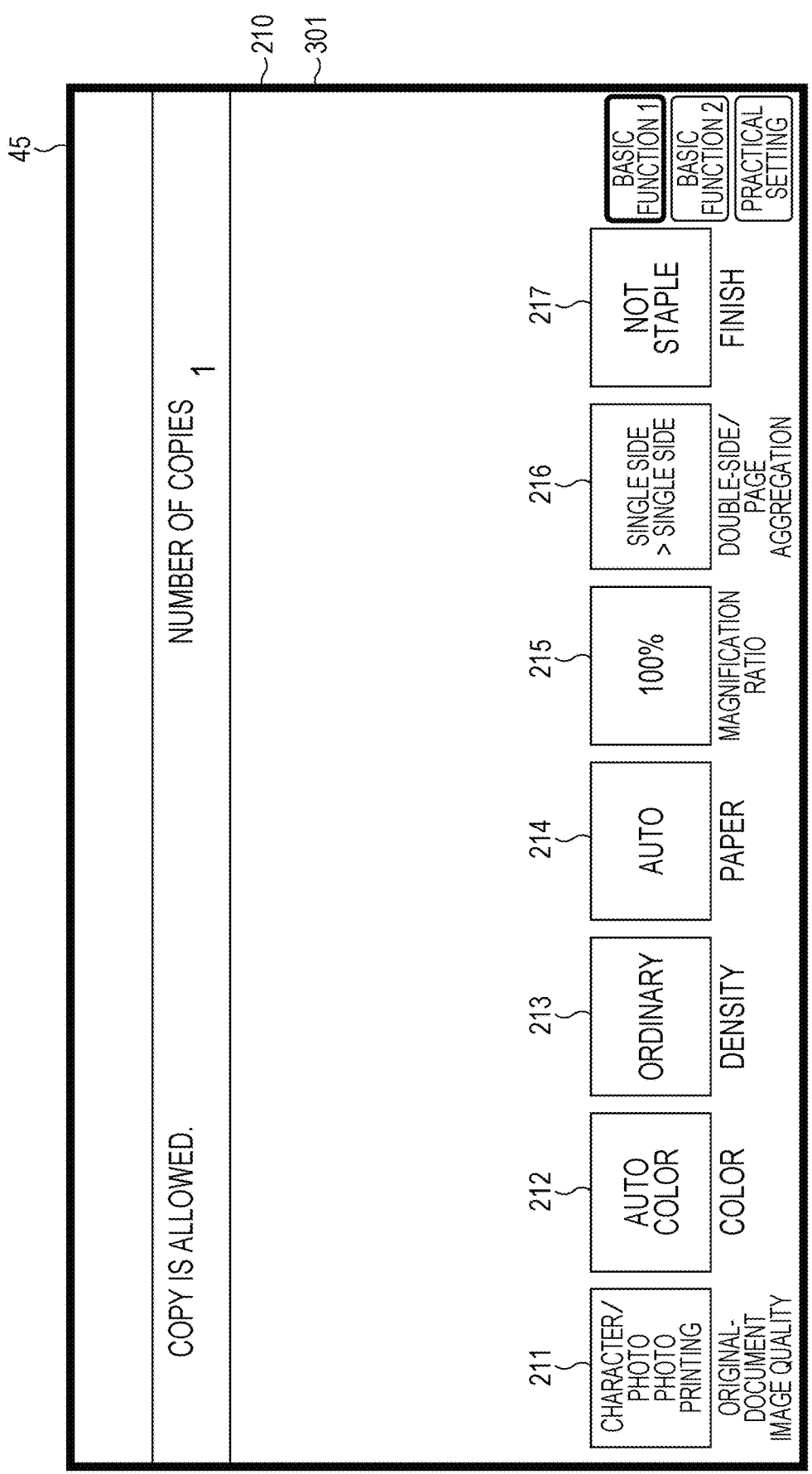
FIG. 42 is a diagram illustrating a state in which the whole basic menu screen is subjected to OCR processing (sixth embodiment)

For example, as shown in FIG. 42, the whole image 301 (images of all display areas) of the touch panel 45 (an area surrounded by an extra-thick line), which is a processing target, is subjected to the button image extraction processing and the OCR processing. Consequently, a plurality of button images in the basic menu screen 210 are extracted, and character strings in the plurality of button images are recognized In other words, in the first display state of displaying the first image 301 (FIG. 42) that includes the first screen (the basic menu screen 210), and that does not include the second screen (refer to the numeric keypad screen 250 (FIGS. 6 and 43)), the first image 301 is subjected to OCR processing or the like.

Further, a character string in each button image is determined to be a voice operation command corresponding to the each button image, and a text dictionary such as that shown in FIG. 44 is generated. The text dictionary is provided with the voice operation command group 610 in the basic menu screen 210. Coordinate values of a button image corresponding to each voice operation command (for example, coordinate values of the central position of the corresponding button image) are assigned to the each voice operation command For example, coordinate values of the central position P61 of the "original-document image quality" button (button image) 211 are assigned to the voice operation command "GENKO GASHITSU (original-document image quality)". The same applies to the other voice operation commands Next, the second screen (for example, the numeric keypad screen 250 (refer to FIGS. 6 and 43)) is called from the first screen (for example, the basic menu screen 210 (refer to FIGS. 5 and 42)) according to user's operation for the first screen, and the numeric keypad screen 250 is displayed so as to be superimposed on the basic menu screen 210. In other words, the touch panel 45 changes to the second display state of displaying the second image 302 that includes the first screen, and that also includes the second screen. In addition, the MFP 10 executes operation such as that described below.

Figure 43:
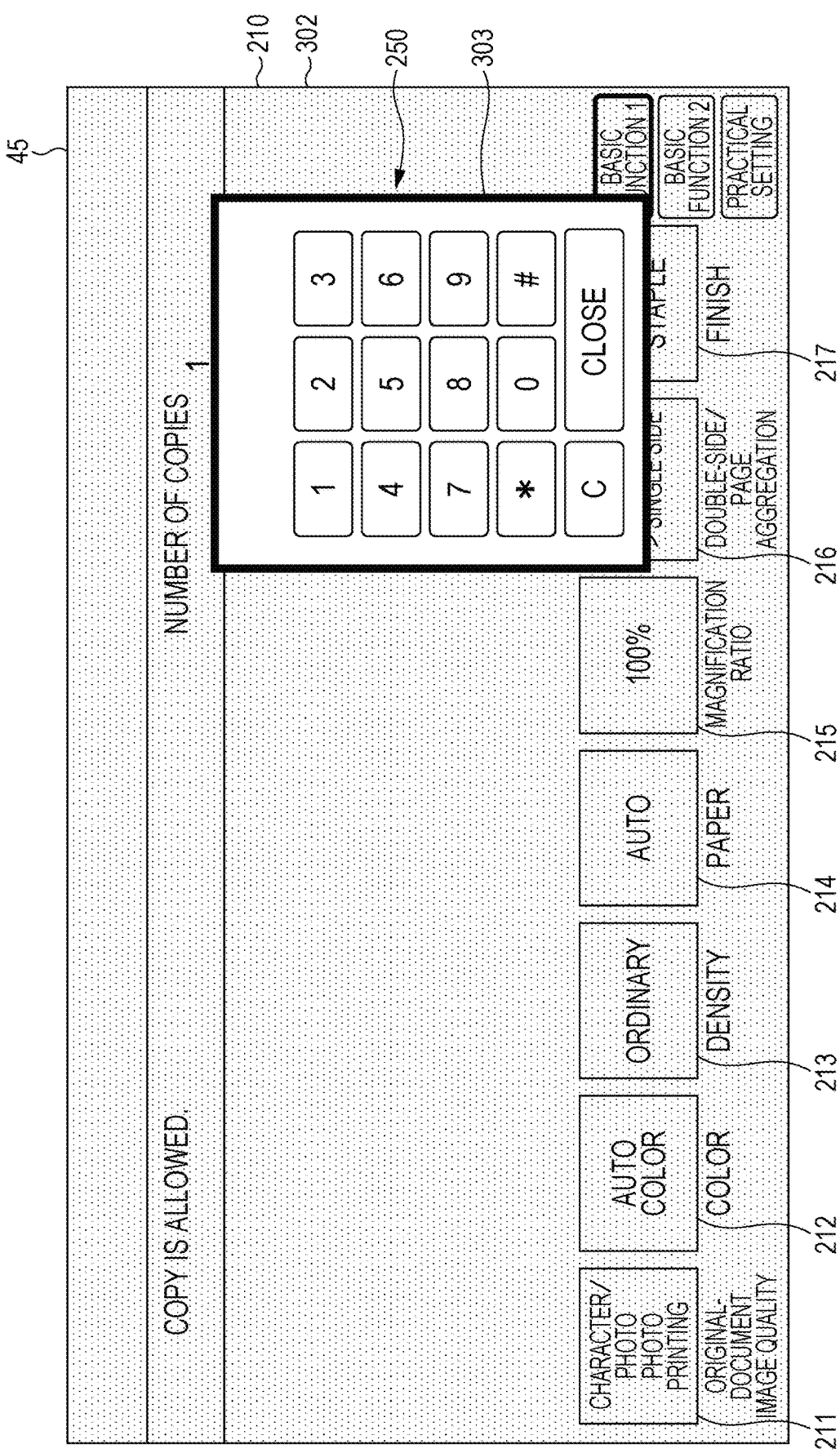
FIG. 43 is a diagram illustrating a state in which a called numeric keypad screen is extracted as a difference image, and only the difference image is subjected to OCR processing.

First of all, the MFP 10 generates (obtains) a difference image 303 (FIG. 43) between the whole image 302 (FIG. 43) of the touch panel 45 after the change and the whole image 301 (FIG. 42) of the touch panel 45 before the change. The difference image 303 is obtained as an image having display contents of the second screen. Subsequently, the difference image 303 (in other words, the second screen (for example, the numeric keypad screen 250)), which is a processing target, is subjected to the button image extraction processing and the OCR processing. FIG. 43 shows a state in which the called numeric keypad screen 250 is extracted as a difference image (an area surrounded by a thick line), and only the difference image is subjected to the OCR processing.

Consequently, a plurality of button images in the numeric keypad screen 250 are extracted, and character strings in the plurality of button images are recognized Further, a character string in each button image is determined to be a voice operation command corresponding to the each button image, and a text dictionary that is a part surrounded by a thick line frame of FIG. 45 is additionally generated. The text dictionary is provided with the voice operation command group 650 (refer to FIG. 45) in the numeric keypad screen 250. In this manner, the command group 650 related to the second screen 250 is identified on the basis of a processing result of character recognition processing for the difference image 303. In addition, coordinate values of a button image corresponding to each voice operation command (for example, coordinate values of the central position of the corresponding button image) are assigned to the each voice operation command For example, coordinate values of the central position of a "2" button (button image) in the numeric keypad screen 250 are assigned to a voice operation command "NI (2)". The same applies to the other voice operation commands Subsequently, search processing similar to that in each of the above-described embodiments is executed. In short, search processing in a plurality of stages are successively executed. As the result, when it is determined that a search target character string (voice recognition data) agrees with a voice operation command corresponding to any of button images, it is determined that a representative point of the button image has been pressed. Subsequently, processing is executed.

Specifically, in a case where it is determined that a search target character string (voice recognition data) agrees with a voice operation command "NI (2)" assigned to the button image "2", it is determined that a position corresponding to coordinate values (600, 200) of a representative point of the button image has been pressed. Subsequently, processing is executed. Specifically, the MFP 10 changes the number of copies to "2".

Alternatively, in a case where it is determined that a search target character string (voice recognition data) agrees with a voice operation command "BAIRITSU (magnification ratio)" assigned to the button image "magnification ratio", it is determined that a position corresponding to coordinate values (450, 400) of a representative point of the button image has been pressed. Subsequently, processing (call processing of the magnification ratio setting screen 230) is executed. Specifically, the MFP 10 causes the numeric keypad screen 250 to be hidden, and displays the magnification ratio setting screen 230 so as to be superimposed on the basic menu screen 210 (refer to FIG. 6).

According to the operation such as that described above, the voice operation command group related to each screen is obtained by OCR processing, the first command group M1 and the second command group M2 are identified on the basis of, for example, a processing result of the OCR, and each search processing (the first search processing and the second search processing) is executed. Therefore, it is not necessary to register a voice operation command group related to each screen beforehand, which enables the trouble of registration to be reduced.

In addition, the voice operation command group 650 related to the numeric keypad screen 250 is obtained not by OCR processing or the like for all parts of the whole image 302 (FIG. 43) of the touch panel 45 after screen change, but by OCR processing or the like for the difference image 303 that is a part of the whole image 302. Therefore, duplicated recognition processing can be avoided, which enables to achieve efficiency in processing.

It should be noted that when a difference image between the whole image of the touch panel 45 after screen change and the whole image of the touch panel 45 before the screen change ranges the whole display area of the touch panel 45, it may be determined that the screen has changed to a totally different kind of screen. In addition, the text dictionary generated until that point of time is deleted, and a new text dictionary that includes a voice operation command group related to the whole area may be generated on the basis of OCR processing for the image related to the whole area.

7. Seventh Embodiment

In each of the embodiments described above, search processing of each stage is based on the assumption that a voice operation command that first agrees with a search target character string is determined to be a voice operation command desired by a user. However, the present invention is not limited to the above.

For example, in search processing of each stage, irrespective of whether or not to agree with the search target character string, all voice operation commands included in a text dictionary (i-th text dictionary) of each stage may be subjected to identity determination processing in succession. Consequently, in a case where two or more voice operation commands, among the all voice operation commands, each agree with the search target character string, the two or more voice operation commands can be extracted without omission. In the seventh embodiment, such a mode will be described.

In this manner, in search processing of each stage, in a case where two or more voice operation commands that each agree with a search target character string are detected from among the i-th text dictionary of the stage, which of the two or more voice operation commands is a voice operation command desired by a user has only to be determined on the basis of, for example, operation input (here, voice operation) from the user. Specifically, a user's selection of a desired option from among a plurality of options corresponding to the two or more voice operation commands has only to be accepted.

Figure 47:
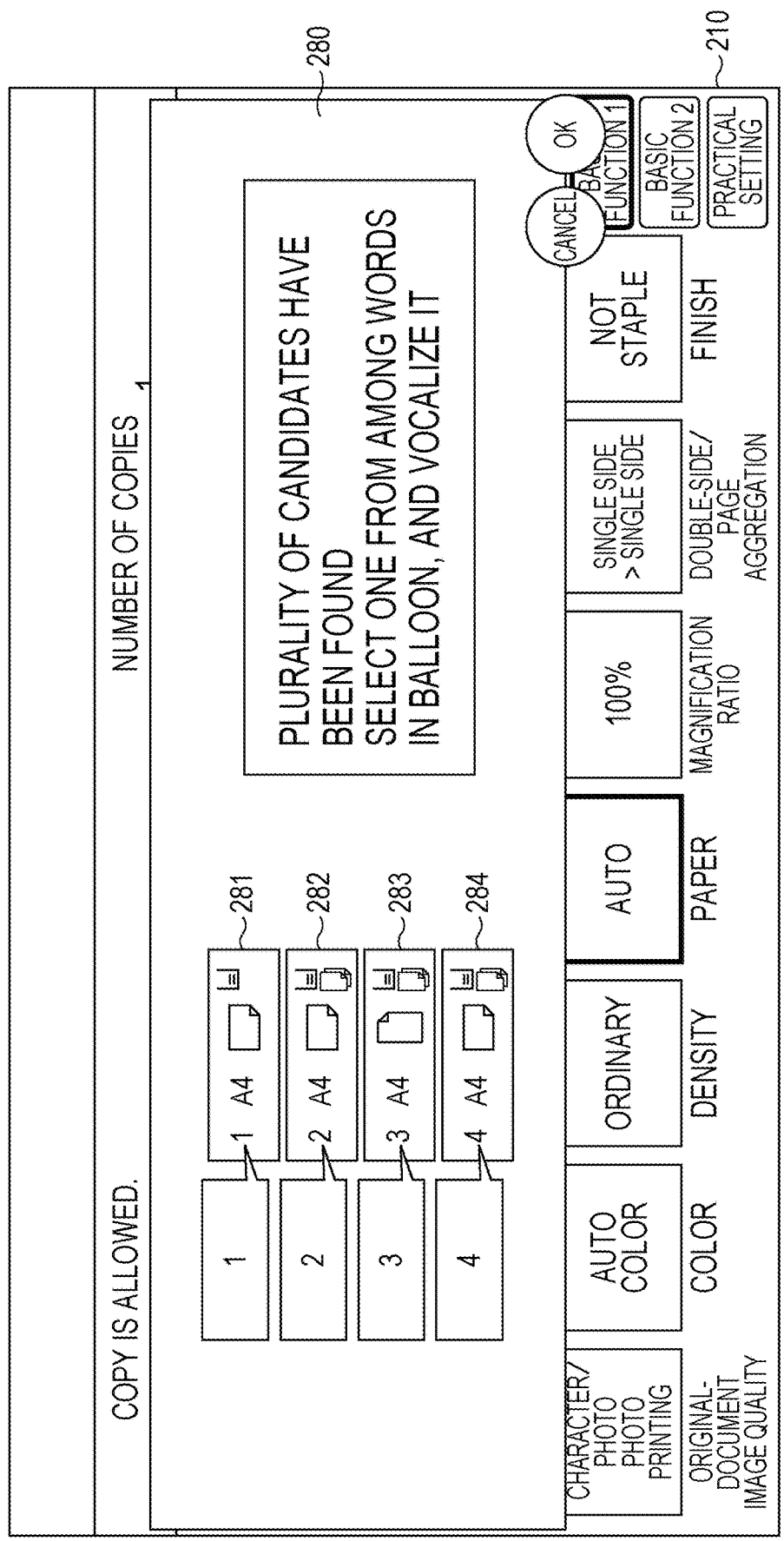
FIG. 47 is a diagram illustrating a display example obtained in a case where a plurality of candidates is detected (seventh embodiment)

In FIG. 47, a detail setting screen 280 related to paper is displayed so as to be superimposed on the basic menu screen 210. In such a display situation, when a voice for operation "EYON (A4)" is vocalized by a user to execute search operation (two-stage search operation) of searching for a voice operation command corresponding to the vocalized contents (voice input), four options (voice operation commands) "EYON (A4)" corresponding to four respective operation keys 281 to 284 are detected. Subsequently, as shown in FIG. 47, balloon images are displayed by being associated with the four respective operation keys 281 to 284. Numbers (identifiers) used to identify one another are given to the plurality of balloon images respectively. Specifically, "1" is given to the operation key 281, "2" is given to the operation key 282, "3" is given to the operation key 283, and "4" is given to the operation key 284.

When the user further vocalizes the number (for example, "SAN (3)") corresponding to a desired option from among these options, the MFP 10 recognizes the vocalized contents (voice recognition). Consequently, a user's selection (specification) of a desired option (for example, the operation key 283) from among the plurality of options corresponding to the two or more voice operation commands is accepted. The MFP 10 determines the one voice operation command on the basis of the specified option (accepted desired option), and executes processing corresponding to the one voice operation command

8. Modified Example or the Like

Although embodiments of the present invention have been described above, the present invention is not limited to the contents described above.

For example, in each of the embodiments described above, in search processing of each stage, a voice recognition result, a search processing result and the like, each relating to a voice vocalized by a user, are not displayed. However, the present invention is not limited to this. The voice recognition result and the like related to the vocalized voice may be displayed.

Figure 48:
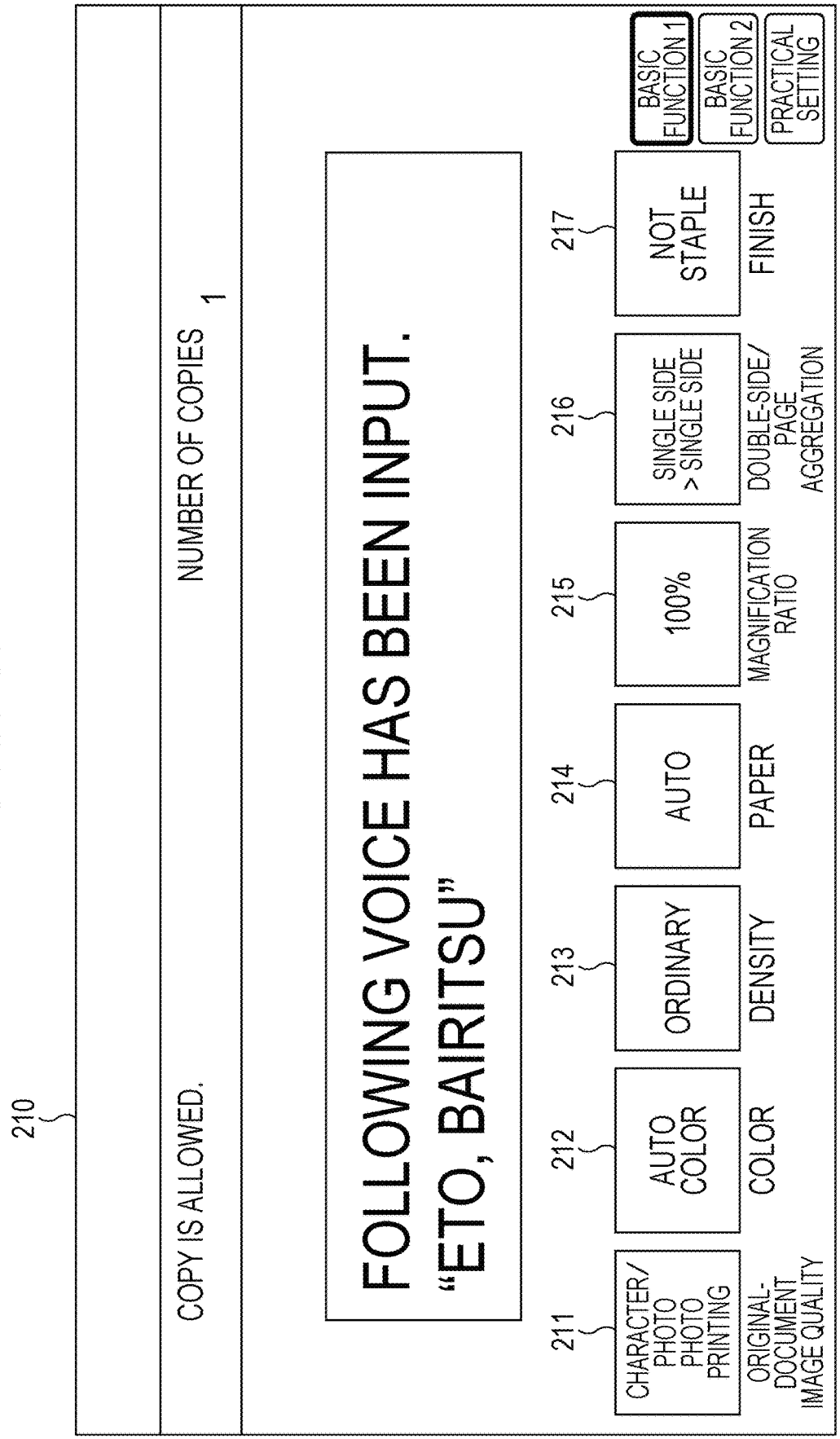
FIG. 48 is a diagram illustrating a screen on which a voice recognition result is displayed.

Specifically, in a case where a voice "ETO BAIRITSU (well, magnification ratio)" is vocalized (input) in a situation in which the basic menu screen 210 is displayed, contents such as those shown in FIG. 48 have only to be displayed on the touch panel 45 as a voice recognition result. In FIG. 48, a character string "The following voice has been input. 'ETO BAIRITSU (well, magnification ratio)'" is displayed at the center of the touch panel 45. "ETO BAIRITSU (well, magnification ratio" is shown as the character string of the voice recognition result.

Figure 49:
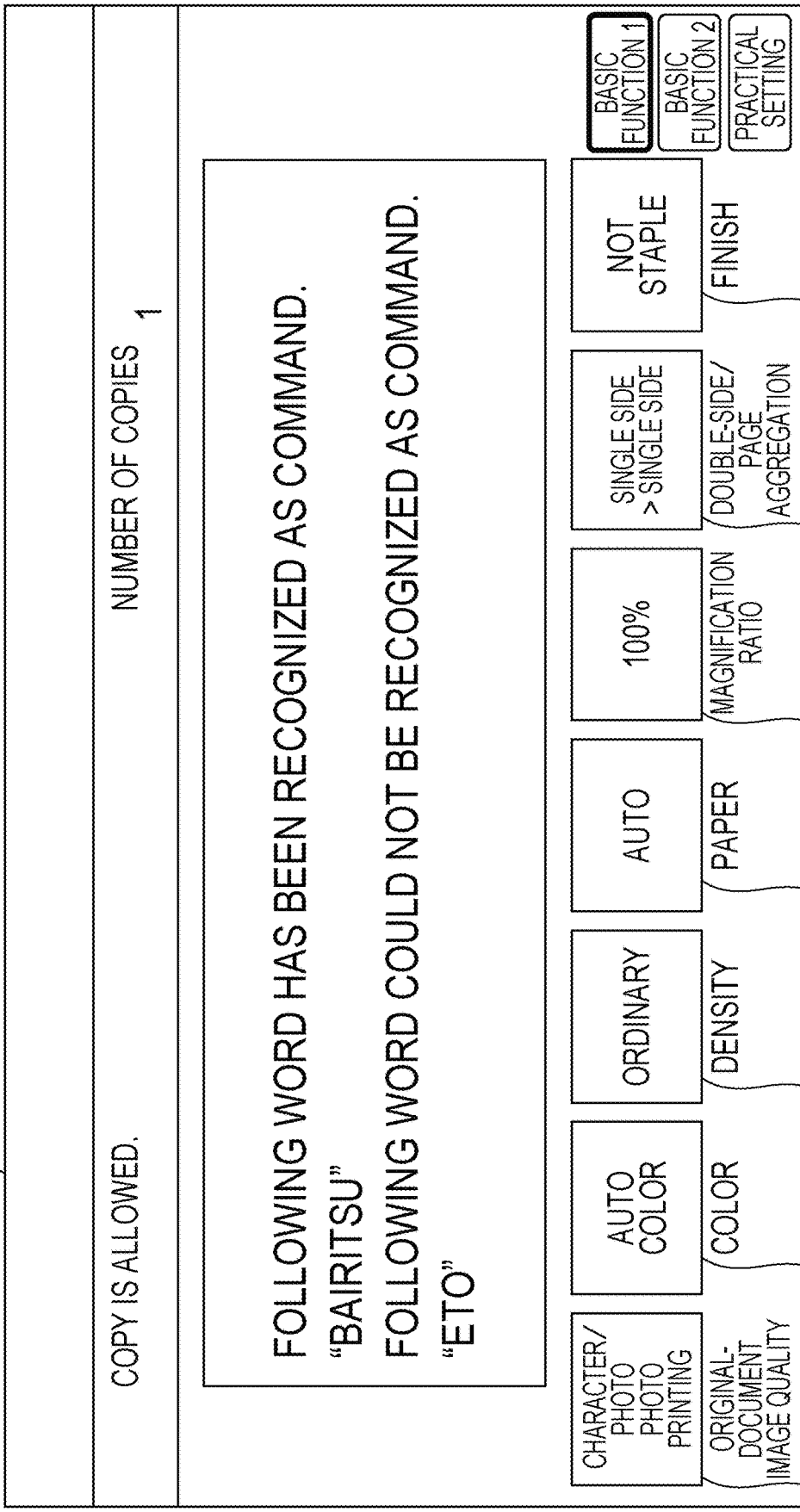
FIG. 49 is a diagram illustrating a screen on which a result of search processing is displayed.

Alternatively, contents such as those shown in FIG. 49 may be displayed as a (part of) processing result of the search processing.

In FIG. 49, among voice recognition results related to voice input, a character string that has been recognized as a voice operation command (in other words, as the result of search processing, a character string that has been searched for (detected) as a character string that agrees with one voice operation command, among character strings included in voice recognition data) is shown. Specifically, the wording "The following word has been recognized as a command 'BAIRITSU (magnification ratio)'" indicates that voice input "BAIRITSU (magnification ratio)" has been recognized as a voice operation command.

Moreover, among voice recognition results related to voice input, a character string that has not been recognized as a voice operation command (in other words, as the result of search processing, a character string that has agreed with none of the plurality of voice operation commands (a character string that has not been searched for (detected) by the search processing)) is shown. Specifically, the wording "The following word has not been recognized as a command 'ETO (well)'" indicates that voice input "ETO (well)" has not been recognized as a voice operation command.

Figure 50:
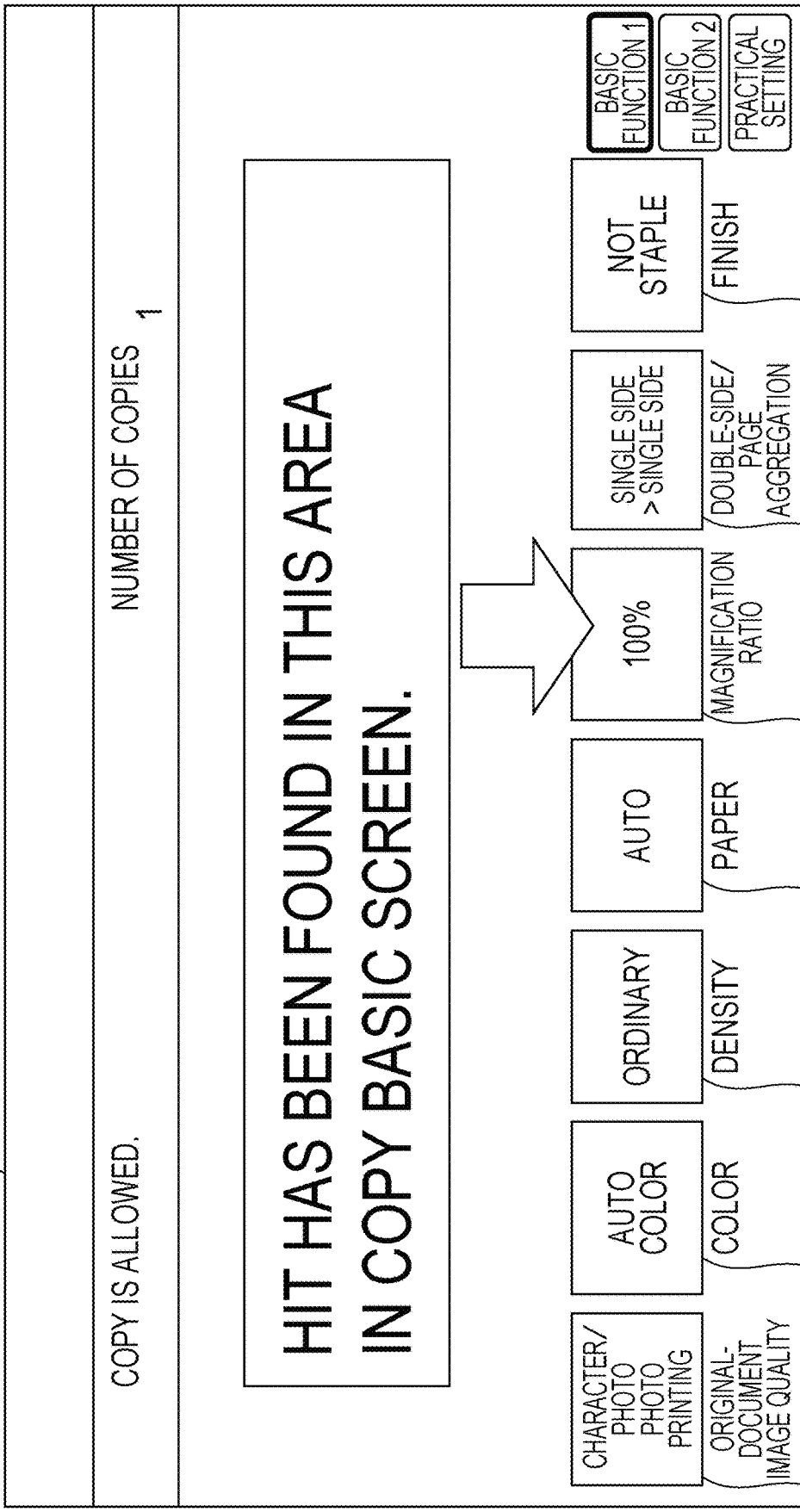
FIG. 50 is a diagram illustrating a display screen on which an in-screen position of an operation key corresponding to a command detected by search processing is clearly stated.

In addition, as shown in FIG. 50, an in-screen position of a display element (an operation key and the like) corresponding to one voice operation command detected by search processing may be shown. In FIG. 50, the wording "A hit has been found in this area in the basic menu screen" is displayed in the central area of the touch panel 45, and a position of the operation key 215 corresponding to the one voice operation command is indicated with a void arrow. According to a display mode such as that shown FIG. 50, according to voice operation by vocalizing a voice "BAIRITSU (magnification ratio)", a user is able to check that an instruction equivalent to an instruction by pressing the "magnification ratio" key 215 has been accepted by the MFP 10.

Alternatively, in the third embodiment, in a state in which the operation screen 512 of FIG. 22 is displayed, in a case where "SHITAJI CYOSEI (surface preparation)" (a voice operation command corresponding to the operation key 545 in the operation screen 513 (FIG. 23) that is not displayed) has been vocalized, an original operating procedure (operating procedure at the time of manual pressing operation) until the operation key 545 corresponding to the voice operation command is eventually operated may be obtained (identified), and a screen change or the like based on the operating procedure may be reproduced.

Specifically, after two-stage search processing such as that described in each of the above-described embodiments is performed, when one voice operation command "SHITAJI CYOSEI (surface preparation)" that agrees with a search target character string "SHITAJI CYOSEI" is detected, first of all, the MFP 10 identifies the operation key 545 corresponding to the one voice operation command "SHITAJI CYOSEI (surface preparation)". In addition, by pressing the scroll key 562 in the current display screen 512 once to make a screen change (by causing the operation screen 513 to be displayed), the MFP 10 also identifies the operation key 545 as being displayable. In other words, the MFP 10 obtains operating procedures including the operation of pressing the scroll key 562, and the operation of pressing the operation key 545 that is displayed after the screen change caused by the operation of pressing the scroll key 562. Incidentally, the operation of pressing the scroll key 562 in the operation screen 512 is operation of causing the operation screen 513 to be displayed. Therefore, the scroll key 562 is also expressed as an operation key used to perform operation of causing the operation screen 513 to be displayed.

In addition, the MFP 10 causes such operating procedures to be displayed on the touch panel 45 (as an animation) in a moving image mode.

Figure 51:
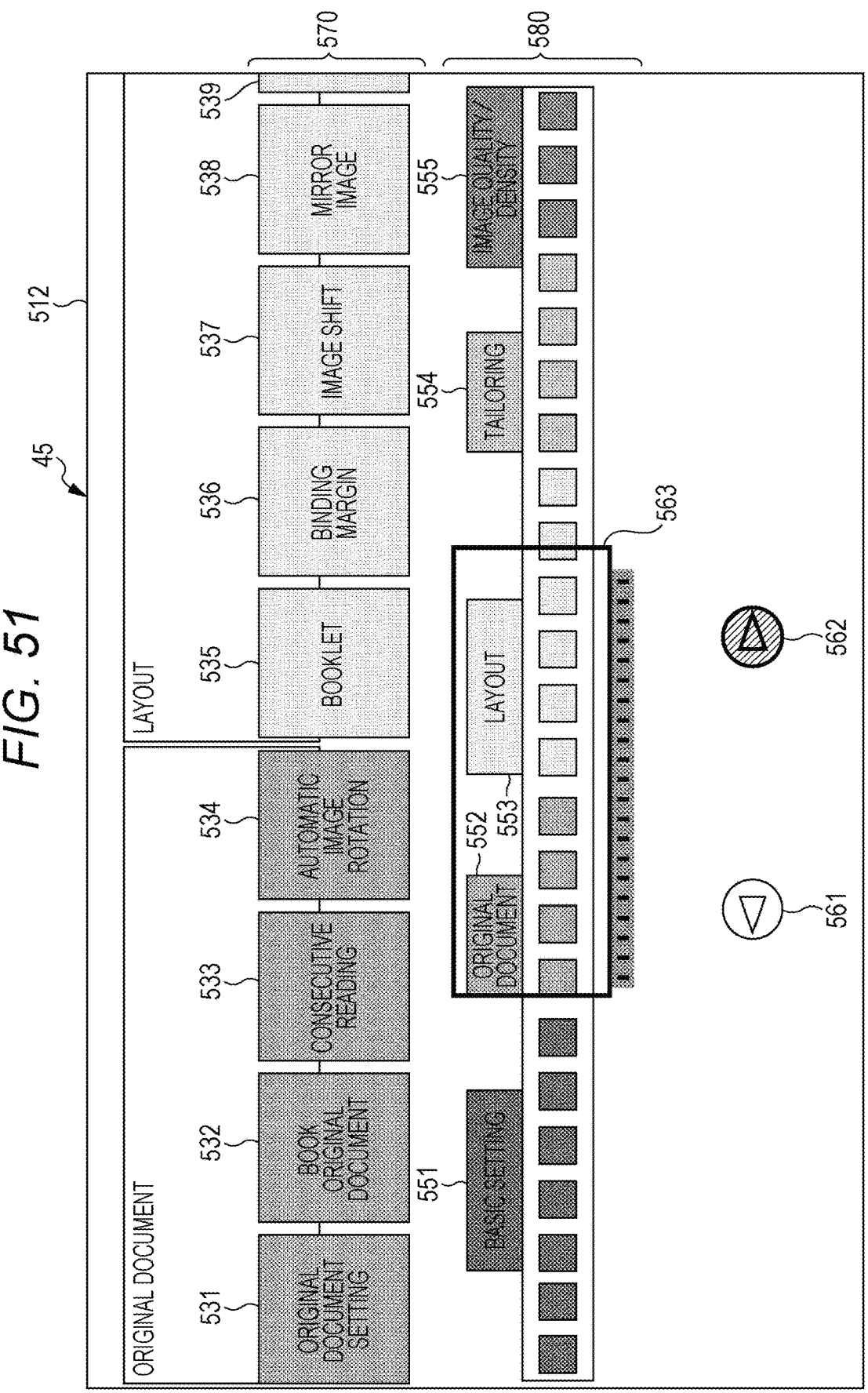
FIG. 51 is a diagram illustrating a screen change made when a voice operation command corresponding to a non-displayed operation key is vocalized.

In detail, first of all, the MFP 10 highlights the scroll button 562 for a predetermined time period (for example, one second), thereby indicating that the same operation as that at the time of selecting the scroll button 562 in the operation screen 512 is being performed (refer to FIG. 51).

After that, the MFP 10 (spuriously) causes the same event as that at the time of pressing the scroll button 562 in the operation screen 512, in other words, an operation event of the scroll button 562 (an internal event indicating that a representative position of the scroll button 562 has been pressed) to occur.

Figure 52:
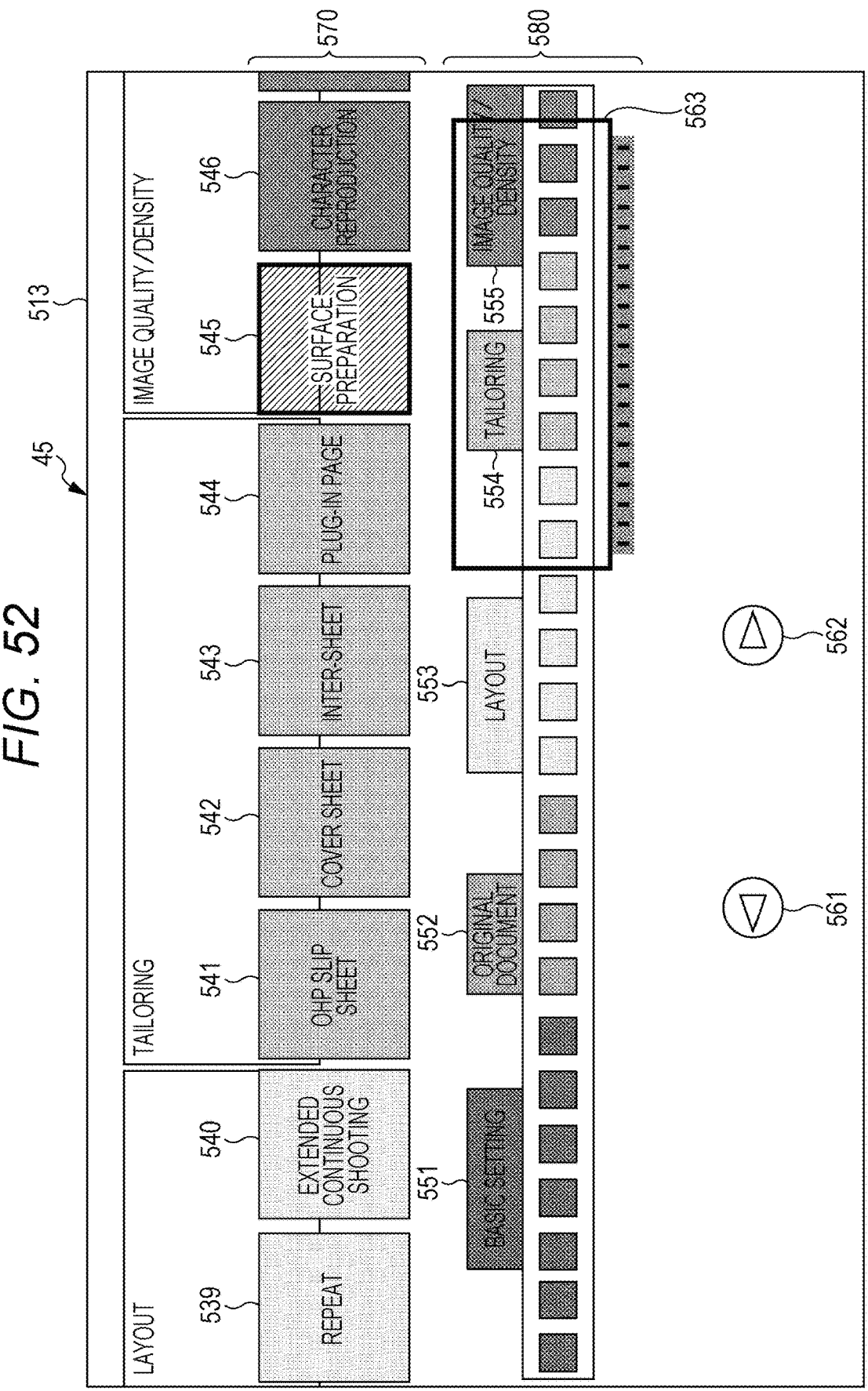
FIG. 52 is a diagram illustrating a screen change made when a voice operation command corresponding to a non-displayed operation key is vocalized.

Further, according to the occurrence of the internal event, the MFP 10 executes a screen change from the operation screen 512 (FIG. 51) to the operation screen 513 (refer to FIGS. 23 and 52). It should be noted that this screen change is preferably performed in a mode in which display contents gradually scroll and change during the change.

On completion of this screen change, the MFP 10 highlights the function button 545 (displaying in a specific color, and/or blinking, and the like) for a predetermined time period (for example, one second) this time, thereby indicating that the same operation as that at the time of selecting the function button (surface preparation button) 545 in the operation screen 513 is being performed (refer to FIG. 52).

After that, the MFP 10 (spuriously) causes an operation event of the function button 545 (an internal event or the like indicating that a representative position of the function button 545 has been pressed) to occur.

Further, according to the occurrence of the internal event, the MFP 10 displays a detail display screen (not illustrated), which is displayed according to pressing of the function button 545, so as to be superimposed on the operation screen 513.

In this manner, while causing an event of pressing an operation key corresponding to a voice operation command that has been searched for to occur, displaying in the moving image mode may be performed.

Figure 53:
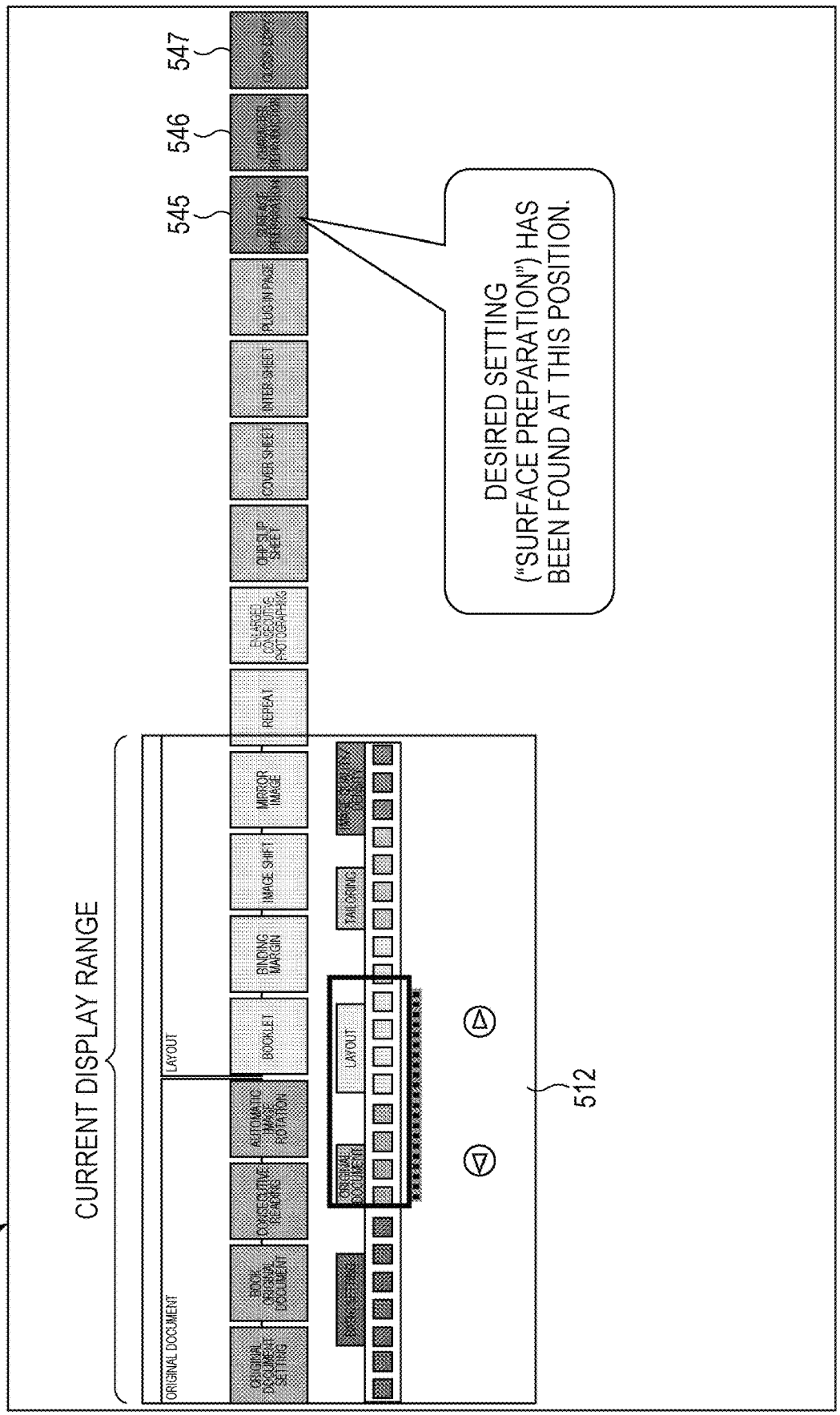
FIG. 53 is a diagram illustrating a display screen on which an in-screen position of an operation key corresponding to a command detected by search processing (operation key that is not displayed when the voice operation command is vocalized) is clearly stated.

Alternatively, in a case where "SHITAJI CYOSEI (surface preparation)" has been vocalized in a situation in which the operation screen 512 of FIG. 22 is displayed (refer to the third embodiment), a result of search processing may be indicated by displaying a display image of FIG. 53 on the touch panel 45. In FIG. 53, a large number of function buttons 539 to 547 including the function buttons 531 to 538 displayed in the operation screen 512 (FIG. 22), and the function buttons 539 to 546 displayed in the operation screen 513 (FIG. 23), are arranged in a line in the horizontal direction. It should be noted that in the display image of FIG. 53, in order to display the large number of function buttons in a line, an area corresponding to the operation screen 512 is displayed by being scaled down in comparison with FIG. 22.

In FIG. 53, in a function button line in which the large number of function buttons are arranged in a line in the horizontal direction, the operation key 545 corresponding to a character string that has been searched for by search processing is clearly expressed as an operation target key by voice operation. Specifically, a balloon image that includes the wording "desired setting ('surface preparation') has been found at this position" is displayed while a position of the operation key 545 in the function button line is indicated.

In addition, in each of the embodiments described above, the MFP 10 executes voice recognition processing, and obtains a processing result of the voice recognition processing from the MFP 10 itself. However, the present invention is not limited to this. For example, the voice recognition processing is executed by a portable information terminal (or an external server) that cooperates with the MFP 10, and the MFP 10 may obtain a processing result of the voice recognition processing from the portable information terminal or the like.

Although embodiments of the present invention have been described and illustrated in detail, the disclosed embodiments are made for purposes of illustration and example only and not limitation The scope of the present invention should be interpreted by terms of the appended claims

What is claimed is:

1. An image processing device for receiving an operation instruction by a voice, comprising:
a display; and
a hardware processor that is configured to:
determine a search target command from input voice information,
perform a search by setting, to a first priority level, a first voice operation command group related to a first screen displayed on the display at the time of an utterance of the voice and setting, to a second priority level, a second voice operation command group related to a second screen different to the first screen, and
execute a process corresponding to the first voice operation command if a voice operation command corresponding to the search target command is in the first voice operation command group, and execute a process corresponding to the second voice operation command if the voice operation command is not in the first voice operation command group and is in the second voice operation command group.

2. The image processing device of claim 1, wherein the first screen is a screen displayed in accordance with a user operation for the second screen, and is a screen displayed at the time of an utterance of the voice.

3. The image processing device of claim 2, wherein the two screens are screens of mutually different layers, and
the hardware processor determines a search target command from the voice information uttered in a state where both of the two operation screens are displayed on the display means.

4. The image processing device of claim 3, wherein
the hardware processor is configured to:
determine a search target command from the voice information uttered in a state where a part of the second screen is displayed by being concealed by the first screen, and
search the second command group in a state where excluding, from the second command group, a command corresponding to a display element concealed by the first screen.

5. The image processing device of claim 2, wherein
the two screens are screens of mutually different layers, and
the hardware processor is configured to determine a search target command from the voice information uttered in a state where the second screen is not displayed and the first screen is displayed from within the two operation screens.

6. The image processing device of claim 1, wherein
the second screen is a screen displayed in accordance with a user operation for the first screen, and
the hardware processor is configured to determine a search target command from the voice information uttered in a state where the first screen is displayed and the second screen is not yet displayed.

7. The image processing device of claim 6, wherein
the hardware processor is configured to, in the case where a voice operation command corresponding to the search target command is detected from within the second voice operation command group, cause the second screen to be displayed.

8. The image processing device of claim 1, wherein
the hardware processor is configured to, in the case where the first screen is a warning screen for notifying a warning, prohibit execution of a process based on the second voice operation command, even in the case where a voice operation command corresponding to the search target command is not discovered from the first voice operation command group.

9. The image processing device of claim 1, wherein
the hardware processor is configured to perform a search by excluding, from the first voice operation command group and/or the second voice operation command group, a voice operation command determined to be incapable of being executed based on a job execution state of the image processing device.

10. The image processing device of claim 1, wherein
the hardware processor is configured to perform a search by excluding, from the first voice operation command group and/or the second voice operation command group, a voice operation command determined to be incapable of being executed based on a user authentication state in the image processing device.

11. The image processing device of claim 1, wherein
the hardware processor is configured to:
sequentially execute an identity determination process of the search target command, in accordance with a priority level provided for each of two or more voice operation commands included in the first voice operation command group, and execute a process corresponding to a voice operation commands initially agreeing with the search target command.

12. The image processing device of claim 1, wherein
the hardware processor is configured to, in the case where two or more commands agreeing with the search target command are detected from within the first voice operation command group, receive a selection by a user from within a plurality of selections corresponding to the two or more commands, and execute a process corresponding to a selected selection.

13. The image processing device of claim 1, further comprising:
a character recognition means for executing a character recognition process to recognize characters included in an image of the operation screen, wherein
the hardware processor is configured to specify the first voice operation command group and the second voice operation command group, based on a processing result of a character recognition process related to each of the first screen and the second screen.

14. An image processing device for receiving an operation instruction by a voice, comprising:
a display; and
a hardware processor that is configured to:
determine a search target command from input voice information,
perform a search by setting, to a first priority level, a first voice operation command group associated with an operation key included in a first screen displayed at the time of an utterance of the voice and setting, to a second priority level, a second voice operation command group associated with an operation key included in a second screen different to the first screen, and
execute an action at the time of pressing for an operation key associated with the first voice operation command if a voice operation command corresponding to the search target command is in the first voice operation command group, and execute an action at the time of pressing for an operation key associated with the second voice operation command if the voice operation command is not in the first voice operation command group and is in the second voice operation command group.

15. The image processing device of claim 14, wherein
the first screen is a screen displayed in accordance with a user operation for the second screen, and is a screen displayed at the time of an utterance of the voice.

16. The image processing device of claim 15, wherein
the two screens are screens of mutually different layers, and
the hardware processor is configured to determine a search target command from the voice information uttered in a state where both of the two operation screens are displayed on the display means.

17. The image processing device of claim 15, wherein
the two screens are screens of mutually different layers, and
the hardware processor is configured to determine a search target command from the voice information uttered in a state where the second screen is not displayed and the first screen is displayed from within the two operation screens.

18. The image processing device of claim 14, wherein
the second screen is a screen displayed in accordance with a user operation for the first screen, and
the hardware processor is configured to determine a search target command from the voice information uttered in a state where the first screen is displayed and the second screen is not yet displayed.

19. The image processing device of claim 14, wherein
the hardware processor is configured to, in the case where the first screen is a warning screen for notifying a warning, not execute a pressing action of an operation key associated with the second voice operation command, even in the case where a voice operation command corresponding to the search target command is not discovered from the first voice operation command group.

20. A control method of an image processing device for receiving an operation instruction by a voice, comprising:

determining a search target command from input voice information;

performing a search by setting, to a first priority level, a first voice operation command group related to a first screen displayed on the display at the time of an utterance of the voice and setting, to a second priority level, a second voice operation command group related to a second screen different to the first screen; and executing a process corresponding to the first voice operation command if a voice operation command corresponding to the search target command is in the first voice operation command group, and executing a process corresponding to the second voice operation command if the voice operation command is not in the first voice operation command group and is in the second voice operation command group.

* * * * *